US010364534B2

(12) United States Patent
Coe

(10) Patent No.: US 10,364,534 B2
(45) Date of Patent: Jul. 30, 2019

(54) PAVEMENT REPAIR SYSTEM

(71) Applicant: William B. Coe, Wrightwood, CA (US)

(72) Inventor: William B. Coe, Wrightwood, CA (US)

(*) Notice: Subject to any disclaimer, the term of this patent is extended or adjusted under 35 U.S.C. 154(b) by 153 days.

(21) Appl. No.: 15/490,434

(22) Filed: Apr. 18, 2017

(65) Prior Publication Data
US 2017/0218574 A1  Aug. 3, 2017

Related U.S. Application Data

(63) Continuation of application No. 15/428,088, filed on Feb. 8, 2017, now Pat. No. 9,637,870, which is a
(Continued)

(51) Int. Cl.
E01C 11/00 (2006.01)
C09D 119/00 (2006.01)
(Continued)

(52) U.S. Cl.
CPC .............. E01C 11/005 (2013.01); B32B 5/02 (2013.01); B32B 7/12 (2013.01); B32B 18/00 (2013.01); B32B 37/12 (2013.01); B32B 37/16 (2013.01); C08L 95/005 (2013.01); C09D 119/003 (2013.01); C09J 119/003 (2013.01); C09J 195/005 (2013.01); E01C 7/187 (2013.01); E01C 7/26 (2013.01); E01C 7/358 (2013.01);
(Continued)

(58) Field of Classification Search
USPC .......................................... 156/71
See application file for complete search history.

(56) References Cited

U.S. PATENT DOCUMENTS 2,704,967 A    3/1955  Rostler
3,066,582 A   12/1962  Cutler
(Continued)

FOREIGN PATENT DOCUMENTS

CN    101058970 A    10/2007
DE       3631121      4/1987
(Continued)

OTHER PUBLICATIONS

PCT International Search Report and Written Opinion of the International Searching Authority for PCT International Application No. PCT/US2014/026755 with International Filing Date Mar. 13, 2014.

Primary Examiner — Sing P Chan
(74) Attorney, Agent, or Firm — Knobbe Martens Olson & Bear, LLP

(57) ABSTRACT

A pavement repair system is provided utilizing solid phase auto regenerative cohesion and homogenization by liquid asphalt oligopolymerization technologies. The system is suitable for use in repairing asphalt pavement, including pavement exhibiting a high degree of deterioration (as manifested in the presence of potholes, cracks, ruts, or the like) as well as pavement that has been subject to previous repair and may comprise a substantial amount of dirt and other debris (e.g., chipped road paint or other damaged or disturbed surfacing materials). A system utilizing homogenization by liquid asphalt oligopolymerization is suitable for rejuvenating or repairing aged asphalt, thereby improving properties of the paving material.

23 Claims, 16 Drawing Sheets

Related U.S. Application Data continuation of application No. 15/363,858, filed on Nov. 29, 2016, now Pat. No. 9,624,625, which is a continuation of application No. 15/148,998, filed on May 6, 2016, now Pat. No. 9,551,114, which is a continuation of application No. 14/702,610, filed on May 1, 2015, now Pat. No. 9,347,187, which is a continuation of application No. 14/373,889, filed as application No. PCT/US2014/026755 on Mar. 13, 2014, now Pat. No. 9,057,163, which is a continuation-in-part of application No. 13/842,640, filed on Mar. 15, 2013, now Pat. No. 8,992,118.

(60) Provisional application No. 61/799,515, filed on Mar. 15, 2013.

(51) Int. Cl.

| | | |
|---|---|---|
| E01D 19/08 | (2006.01) | |
| E01D 22/00 | (2006.01) | |
| E02D 31/06 | (2006.01) | |
| B32B 5/02 | (2006.01) | |
| B32B 7/12 | (2006.01) | |
| B32B 18/00 | (2006.01) | |
| B32B 37/12 | (2006.01) | |
| B32B 37/16 | (2006.01) | |
| E01C 19/48 | (2006.01) | |
| E01C 23/03 | (2006.01) | |
| E01C 19/15 | (2006.01) | |
| C08L 95/00 | (2006.01) | |
| E01C 7/35 | (2006.01) | |
| E01C 23/14 | (2006.01) | |
| C09J 195/00 | (2006.01) | |
| E04B 1/66 | (2006.01) | |
| E01C 7/26 | (2006.01) | |
| E01C 23/06 | (2006.01) | |
| E01C 7/18 | (2006.01) | |
| C09J 119/00 | (2006.01) | |

(52) U.S. Cl.
CPC ............ *E01C 19/15* (2013.01); *E01C 19/48* (2013.01); *E01C 19/4853* (2013.01); *E01C 23/03* (2013.01); *E01C 23/06* (2013.01); *E01C 23/14* (2013.01); *E01D 19/08* (2013.01); *E01D 22/00* (2013.01); *E02D 31/06* (2013.01); *E04B 1/66* (2013.01); *B32B 2037/1253* (2013.01); *B32B 2255/26* (2013.01); *B32B 2272/00* (2013.01); *B32B 2310/0806* (2013.01); *B32B 2315/06* (2013.01); *B32B 2419/00* (2013.01); *C08L 2205/03* (2013.01); *C08L 2555/84* (2013.01); *C08L 2555/86* (2013.01); *E01C 2301/10* (2013.01)

(56) References Cited

U.S. PATENT DOCUMENTS

| | | | |
|---|---|---|---|
| 3,262,375 A | 7/1966 | Eigenmann | |
| 3,513,005 A | 5/1970 | Bradshaw et al. | |
| 3,801,212 A | 4/1974 | Cutler | |
| 3,807,886 A | 4/1974 | Cutler | |
| 3,964,183 A | 6/1976 | Mouat | |
| 4,021,393 A | 5/1977 | McDonald | |
| 4,085,078 A | 4/1978 | McDonald | |
| 4,113,401 A | 9/1978 | McDonald | |
| 4,261,669 A | 4/1981 | Edo | |
| 4,319,856 A | 3/1982 | Jepson | |
| 4,358,554 A | 11/1982 | Yan et al. | |
| 4,594,022 A | 6/1986 | Jeppson | |
| 4,601,605 A | 7/1986 | Damp | |
| 4,749,303 A | 6/1988 | Keizer et al. | |
| 4,765,772 A | 8/1988 | Benedetti et al. | |
| 4,849,020 A | 7/1989 | Osborne et al. | |
| 4,854,771 A | 8/1989 | Corbin, Jr. et al. | |
| 4,863,309 A | 9/1989 | Corbin, Jr. et al. | |
| 4,969,772 A | 11/1990 | Chiba et al. | |
| 4,994,508 A | 2/1991 | Shiraki et al. | |
| 5,092,706 A | 3/1992 | Bowen et al. | |
| 5,099,900 A * | 3/1992 | Gomberg | B29C 73/163 152/503 |
| 5,110,629 A * | 5/1992 | Gomberg | B05D 3/10 156/331.7 |
| 5,114,284 A | 5/1992 | Keizer et al. | |
| 5,242,493 A | 9/1993 | Glynn, Jr. et al. | |
| 5,248,407 A | 9/1993 | Bardet et al. | |
| 5,251,999 A | 10/1993 | McCracken | |
| 5,344,485 A | 9/1994 | Glynn, Jr. | |
| 5,385,426 A | 1/1995 | Omann | |
| 5,397,199 A | 3/1995 | Frampton et al. | |
| 5,397,389 A | 3/1995 | Glynn, Jr. | |
| 5,445,473 A | 8/1995 | Chaverot et al. | |
| 5,556,225 A | 9/1996 | Marino | |
| 5,599,133 A | 2/1997 | Costello et al. | |
| 5,599,134 A | 2/1997 | Macku | |
| 5,911,817 A | 6/1999 | Hayner | |
| 5,925,695 A | 7/1999 | Ohtsuka et al. | |
| 6,012,870 A | 1/2000 | Dillingham | |
| 6,217,252 B1 | 4/2001 | Tolliver et al. | |
| 6,346,561 B1 | 2/2002 | Osborn | |
| 6,414,056 B1 | 7/2002 | Puzic et al. | |
| 6,439,806 B1 | 8/2002 | Dillingham | |
| 6,492,439 B2 | 12/2002 | Wollum et al. | |
| 6,554,531 B2 | 4/2003 | Bodish | |
| 6,669,467 B2 | 12/2003 | Kieswetter | |
| 6,759,453 B2 | 7/2004 | Jelling et al. | |
| 6,805,738 B2 | 10/2004 | Tasaki | |
| 6,872,072 B2 | 3/2005 | Kieswetter | |
| 7,220,455 B2 * | 5/2007 | Bennett | B05D 5/00 427/140 |
| 7,316,521 B2 | 1/2008 | Shiomoto et al. | |
| 7,402,619 B2 | 7/2008 | Stephens | |
| 7,517,934 B2 | 4/2009 | Deeter et al. | |
| 7,534,068 B2 | 5/2009 | Brouillette et al. | |
| 7,569,625 B2 * | 8/2009 | Keller | B29C 73/163 427/387 |
| 7,696,267 B2 | 4/2010 | Sasagawa et al. | |
| 7,985,787 B2 | 7/2011 | Martin | |
| 8,119,202 B2 | 2/2012 | Wiley | |
| 8,138,242 B2 | 3/2012 | Reinke et al. | |
| 8,808,445 B2 | 9/2014 | Coe | |
| 8,926,742 B2 | 1/2015 | Coe | |
| 8,962,730 B2 * | 2/2015 | Mruk | C08K 3/08 152/502 |
| 8,992,118 B2 * | 3/2015 | Coe | E01C 23/10 404/77 |
| 9,057,163 B1 * | 6/2015 | Coe | E01C 23/00 |
| 9,074,328 B1 * | 7/2015 | Coe | E01C 23/10 |
| 9,127,413 B2 * | 9/2015 | Coe | E01C 23/10 |
| 9,169,606 B2 * | 10/2015 | Coe | E01C 23/10 |
| 9,346,931 B2 * | 5/2016 | Odriozola | C08G 65/326 |
| 9,347,187 B2 * | 5/2016 | Coe | E01C 23/00 |
| 9,415,575 B2 * | 8/2016 | Beiermann | B32B 27/18 |
| 9,481,967 B2 * | 11/2016 | Coe | E01C 23/10 |
| 9,551,114 B2 * | 1/2017 | Coe | E01C 23/00 |
| 9,551,117 B2 * | 1/2017 | Coe | E01C 23/10 |
| 9,624,625 B2 * | 4/2017 | Coe | E01C 23/00 |
| 9,637,870 B1 * | 5/2017 | Coe | E01C 7/187 |
| 9,963,840 B2 | 5/2018 | Hills | |
| 10,081,920 B2 * | 9/2018 | Coe | E01C 23/10 |
| 10,160,835 B2 * | 12/2018 | Wang | A61L 24/0031 |
| 10,179,846 B1 * | 1/2019 | Crall | C08K 3/16 |
| 2003/0026653 A1 | 2/2003 | Crupi | |
| 2004/0057794 A1 | 3/2004 | Corcoran | |
| 2004/0240939 A1 | 12/2004 | Hays et al. | |
| 2005/0004273 A1 | 1/2005 | Chun et al. | |
| 2006/0229390 A1 | 10/2006 | Chun et al. | |
| 2006/0241218 A1 | 10/2006 | Kim et al. | |

(56) References Cited

U.S. PATENT DOCUMENTS

| | | | |
|---|---|---|---|
| 2006/0269678 A1* | 11/2006 | Bennett | B05D 5/00 427/402 |
| 2007/0282059 A1* | 12/2007 | Keller | B29C 73/163 524/588 |
| 2009/0087262 A1 | 4/2009 | Tucker et al. | |
| 2009/0226254 A1 | 9/2009 | Jones | |
| 2009/0247694 A1* | 10/2009 | Kritzer | B29C 73/163 524/556 |
| 2011/0034594 A1 | 2/2011 | Scholten et al. | |
| 2011/0129296 A1 | 6/2011 | Van Velsor | |
| 2011/0143066 A1 | 6/2011 | Roddy | |
| 2011/0243661 A1 | 10/2011 | Baumgardner et al. | |
| 2011/0250016 A1 | 10/2011 | Giles | |
| 2011/0274487 A1 | 11/2011 | Sylvester | |
| 2012/0213584 A1 | 8/2012 | Reinke et al. | |
| 2012/0301222 A1 | 11/2012 | Laffey | |
| 2013/0104776 A1 | 5/2013 | Vaidya | |
| 2014/0148555 A1* | 5/2014 | Mruk | C08L 19/006 525/332.3 |
| 2014/0270955 A1* | 9/2014 | Coe | E01C 23/10 404/77 |
| 2014/0329267 A1* | 11/2014 | Odriozola | C08G 65/326 435/29 |
| 2015/0071707 A1 | 3/2015 | Kephart | |
| 2015/0080504 A1 | 3/2015 | Coe | |
| 2015/0167252 A1* | 6/2015 | Coe | E01C 23/10 404/77 |
| 2015/0167253 A1* | 6/2015 | Coe | E01C 23/10 404/75 |
| 2015/0176228 A1* | 6/2015 | Coe | E01C 23/10 404/100 |
| 2015/0233067 A1* | 8/2015 | Coe | E01C 23/00 404/77 |
| 2015/0267360 A1* | 9/2015 | Coe | E01C 23/10 404/77 |
| 2015/0284916 A1 | 10/2015 | Dworsky | |
| 2015/0345085 A1 | 12/2015 | Frank | |
| 2016/0010291 A1* | 1/2016 | Coe | E01C 23/10 404/77 |
| 2016/0251808 A1* | 9/2016 | Coe | E01C 23/00 404/77 |
| 2016/0320803 A1* | 11/2016 | Oh | G06F 1/1652 |
| 2017/0058468 A1* | 3/2017 | Coe | E01C 23/10 |
| 2017/0081804 A1* | 3/2017 | Coe | E01C 23/00 |
| 2017/0130408 A1 | 5/2017 | Zhang | |
| 2017/0145640 A1* | 5/2017 | Coe | E01C 7/187 |
| 2017/0174842 A1* | 6/2017 | Wang | A61L 24/0031 |
| 2017/0218574 A1* | 8/2017 | Coe | E01C 7/187 |
| 2018/0002544 A1* | 1/2018 | Gao | C09D 5/00 |
| 2019/0017233 A1* | 1/2019 | Coe | E01C 23/10 |
| 2019/0033189 A1 | 1/2019 | Coe et al. | |
| 2019/0040258 A1 | 2/2019 | Coe | |
| 2019/0055383 A1 | 2/2019 | Coe | |

FOREIGN PATENT DOCUMENTS

| | | |
|---|---|---|
| JP | 05-148815 A | 6/1993 |
| JP | 10-147766 | 6/1998 |
| JP | 2000-144629 | 5/2000 |
| JP | 2002-161509 | 6/2002 |
| JP | 2006-036962 | 2/2006 |
| JP | 2006026962 | 2/2006 |
| KR | 10-20020078688 | 10/2002 |
| KR | 10-0599492 | 7/2006 |
| KR | 10-0697032 | 3/2007 |
| KR | 10-0831238 B1 | 4/2008 |
| KR | 10-0993406 | 11/2010 |
| KR | 10-1253598 | 4/2013 |
| KR | 10-1254955 | 4/2013 |
| KR | 10-1254956 | 4/2013 |
| WO | WO 85/05388 A1 | 12/1985 |

* cited by examiner

| ITEM | Emitter | Chip Seal | Type III - Micro Slurry | 1" Overlay with Petromat |
|---|---|---|---|---|
| Cost | $3.70-7.50/yd$^2$ | $2.50-5.00/yd$^2$ | $2.25-2.75/yd$^2$ | $8.00-12.00/yd$^2$ |
| Maintenance Cycle | 12 - 15 yrs | 5 - 8 yrs | 6 - 7 yrs (over pavement in good cond.) | 6 - 7 yrs |
| Old Cracks Telegraph | None | 2-3 yrs | 6 months | 1-2 yrs |
| Rate | 0-8 lb/yd$^2$ | 15-20 lb/yd$^2$ | 15-20 lb/yd$^2$ | Tack: 0.20-0.30 gal/yd$^2$ AC: 90-100 lb/yd$^2$ |
| Pavement Condition | Distressed marginally structural | Structurally Sound Only | Structurally Sound Only | Distressed but structurally sound |
| Required Surface Preparation | - Dirt, Debris, Potholes | - Crack & Pothole Repair<br>- Repair > 1/2" Rutting | - Crack & Pothole Repair<br>- Repair > 1/2" Rutting | - Crack Repair and/or surface milling<br>- Repair Sub-grade failures<br>- Repair Joints |
| Restores deep pavement deflection value per CT 356 FWD test | YES | Negligible | Negligible | Negligible |
| Passes Hamburg WTD @ 25,000 cycles/50°C | YES | NO | NO | NO |
| Carbon Footprint | Neutral | $CO_2$ Contributor | $CO_2$ Contributor | $CO_2$ Contributor |

FIG. 11

PAVEMENT REPAIR SYSTEM

INCORPORATION BY REFERENCE TO RELATED APPLICATIONS

Any and all priority claims identified in the Application Data Sheet, or any correction thereto, are hereby incorporated by reference under 37 CFR 1.57. This application is a continuation of U.S. application Ser. No. 15/428,088, filed Feb. 8, 2017, which is a continuation of U.S. application Ser. No. 15/363,858, filed Nov. 29, 2016, now U.S. Pat. No. 9,624,625, which is a continuation of U.S. application Ser. No. 15/148,998, filed May 6, 2016, now U.S. Pat. No. 9,551,114, which is a continuation of U.S. application Ser. No. 14/702,610, filed May 1, 2015, now U.S. Pat. No. 9,347,187, which is a continuation of U.S. application Ser. No. 14/373,889, filed Jul. 22, 2014, now U.S. Pat. No. 9,057,163, which is the national phase under 35 U.S.C. § 371 of PCT International Application No. PCT/US2014/026755, filed Mar. 13, 2014, which is a continuation-in-part of U.S. application Ser. No. 13/842,640 filed Mar. 15, 2013, now U.S. Pat. No. 8,992,118, and which claims the benefit of U.S. Provisional Application No. 61/799,515 filed Mar. 15, 2013, U.S. Provisional Application No. 61/799,576 filed Mar. 15, 2013, U.S. Provisional Application No. 61/798,090 filed Mar. 15, 2013, U.S. Provisional Application No. 61/794,751 filed Mar. 15, 2013, and U.S. Provisional Application No. 61/798,469 filed Mar. 15, 2013. Each of the aforementioned applications is incorporated by reference herein in its entirety, and each is hereby expressly made a part of this specification.

FIELD OF THE INVENTION

A pavement repair system is provided utilizing solid phase auto regenerative cohesion and homogenization by liquid asphalt oligopolymerization technologies. The system is suitable for use in repairing asphalt pavement, including pavement exhibiting a high degree of deterioration (as manifested in the presence of potholes, cracks, ruts, or the like) as well as pavement that has been subject to previous repair and may comprise a substantial amount of dirt and other debris (e.g., chipped road paint or other damaged or disturbed surfacing materials). A system utilizing homogenization by liquid asphalt oligopolymerization is suitable for rejuvenating or repairing aged asphalt, thereby improving properties of the paving material.

BACKGROUND OF THE INVENTION

Repair and maintenance of the civil infrastructure, including roads and highways of the United States present great technical and financial challenges. The American Association of State Highway Transportation Officials (AASHTO) issued a bottom line report in 2010 stating that $160 billion a year must be spent to maintain infrastructure; however, only about $80 billion is being spent. The result is a rapidly failing infrastructure. New methods of maintaining existing roads and new methods of constructing roads that would extend the useful life for the same budget dollar are needed to meet the challenges of addressing our failing infrastructure.

In the United States alone there are approximately 4.4 million center lane miles of asphalt concrete, with a center lane comprising a 24 foot wide pavement surface having a lane in each direction. Asphalt concrete paving surfaces are typically prepared by heating aggregate to 400° F., and applying liquid asphalt (e.g., by spraying into a pug mill or drum coating) to yield a mixture of 95% aggregate and 5% asphalt. If a temperature of approximately 350° F. is maintained for the mixture, it is considered hot mix asphalt and does not stick to itself as long as the temperature is maintained. The hot mix asphalt is typically placed in a transfer truck, which hauls it to the job site, where it is placed on either a gravel road base or onto an old road surface that has been previously primed. A paving apparatus receives the hot mix asphalt from the transfer truck and spreads it out uniformly across the base surface, and as the material progressively cools below 250° F. degrees it is compacted with a roller. The hot mix asphalt is rolled to a uniform density, and after approximately one to three days of cooling and aging the surface can be opened to traffic.

After such asphalt pavement has been in place for several years, the pavement progressively ages. Water works its way into the pavement. It begins to lose its integrity on the surface, causing aggregate at the surface of the pavement to be lost. The pavement surface roughens as aggregate is lost, and cracks begin to form. Conventional pavement repair techniques at this stage in the deterioration process include: pouring hot rubber asphalt into the cracks, using cold patch (a cold mix asphalt that can be applied to a damaged road surface, e.g., placed in a pothole, under ambient temperature conditions using hand tools). Another technique for repairing pavement exhibiting minimal damage involves application of a liquid asphalt emulsion to the pavement surface so as to provide a degree of waterproofing to slow the aging process, or, for surfaces exhibiting more deterioration, application of a thin layer of a slurry of aggregate and asphalt emulsion over the top of the pavement.

Preparing and installing hot asphalt pavement involves running aggregate through a heat tube (typically at around 400° F.) where moisture is driven off to prevent boil over when the rock contacts molten asphalt. The aggregate is added to asphalt, optionally containing a rubber polymer. The aggregate is sent through a mill having high velocity tines that rolls the aggregate through a spray of asphalt. The resulting mixture of aggregate with baked-on asphalt typically comprises 95% aggregate and 5% asphalt (optionally with rubber polymer). The mixture exits the mill at about 350° F. and is transported into waiting trucks (e.g., a belly dump truck) which are driven to the job site. New pavement is laid down over an earthen base covered with gravel that has been graded and compacted. Typically, the new road is not laid in a single pass. Instead, a first 2-3 inch lift of loose hot asphalt is laid down and partially compacted, and then a second lift is laid over the first and compacted. The temperature of the asphalt concrete pavement at this stage is typically about 140° F. Additional lifts can be added as desired, e.g., to a depth of approximately 12 inches, depending upon the expected usage conditions for the road (heavy or light transportation, the velocity of traffic, desired lifetime). Primer or additional material is typically not put between layers of lift in new construction, as the fresh pavement exhibits good adherence to itself in new construction. New construction design typically never requires any primer or additional material between the subsequent lifts.

After approximately fifteen years of exposure to the elements, it becomes cost prohibitive to attempt to maintain asphalt pavement via conventional cold patching, waterproofing, and slurry techniques. The conventional approach at this stage in the deterioration of the pavement typically involves priming the damages surface and applying a layer of hot mix asphalt. For pavement too deteriorated for application priming and application of a layer of hot mix asphalt, a cold-in-place recycling process can be employed. In cold-in-place recycling, typically the topmost 2 to 5 inches of the damaged road surface is pulverized down to a specific aggregate size and mixed with an asphalt emulsion, and then re-installed to pave the same road from which the old paving material has been removed.

Existing pavement (asphalt or concrete) is typically repaired by use of an overlay, e.g., a mixture of aggregate and asphalt such as described above for new road construction. In the case of repaving over the top of rigid concrete, some type of primer is typically applied, e.g., as a spray resulting in application of approximately 10 gallons of primer per 1,000 square feet of pavement. The primer can be an asphalt emulsion that provides a tacky surface for the new overlay. A single layer of overlay can be applied, or multiple layers, typically two or more.

Cracks and stresses in a repaired underlying road bed will quickly imprint themselves on new overlays of paving material, due to the malleability of the new asphalt under rolling loads. As the underlying road bed undergoes expansion and contraction under ambient condition, cracks can be telegraphed up through as much as three inches of overlying asphalt. A conventional method for achieving some resistance to the telegraphing of old defects in the underlying road bed is to put down a hot tack coat of asphalt, lay a polypropylene mat (similar in appearance to spun-bond polypropylene, typically ¼-½ inches in thickness, available as Petromat® from Nilex, Inc. of Centennial, Colo.) over the hot tack coat of asphalt, followed by a layer of new hot asphalt concrete which is then compacted over the existing surface. This will inhibit the rate of telegraphing of cracks to a limited extent, such that instead of taking place from 6 months to 2 years after repair, the cracks do not telegraph for from to 1 year to 3 years after repair. This telegraphing phenomenon by the defects in an existing aged roadbed manifest surface defects in a new pavement overlay about three times sooner than is common to a fresh asphalt concrete pavement placed on a compacted earthen and gravel base; as is the practice in new construction.

Deterioration mechanisms of new highways have been investigated over a 20 year life cycle. Overlays are typically applied between the twelfth and fifteenth year. Typically, no significant deterioration is observed over the first five years of a well-built highway. Within the first five years, cracks or potholes typically do not appear unless there is acute damage to the pavement, or loose material underneath the pavement. After the first five years, physical symptoms of deterioration are observed, including lateral and longitudinal cracks due to shrinkage of the pavement mass through the loss of binder and embrittlement of the asphalt. Cracks ultimately result in creation of a pothole. Raveling is a mechanism wherein the effects of exposure to water and sun break down the adhesion between the rock on the top surface of the pavement and the underlying aggregate, such that small and then larger rock is released from the pavement. A stress fracture is where the pavement, for one reason or another, may not have been thick enough to withstand exposure to an extremely heavy load, moisture, or poor compaction underneath. When combined with shrinkage of the asphalt itself as it goes through heating and cooling cycles, and application of oxidative stress, stress fractures can also result. Stress fractures are characterized by extending in different directions (unlike the lateral or longitudinal cracking as described above).

The macro-texture of a pavement refers to the visible roughness of the pavement surface as a whole. The primary function of the macro-texture is to help maintain adequate skid resistance to vehicles travelling at high speeds. It also provides paths for water to escape which helps to prevent wheels of motor vehicles from hydroplaning. This optionally may be accomplished through cutting or forming grooves in existing or new pavements. Micro-textures refer to the roughness of the surface of the individual stones within the asphalt concrete pavement. It is the fine texture that occurs on chippings and other exposed parts of the surfacing. For concrete pavement this is usually the sand and fine aggregates present at the surface layer and for asphalt it is usually associated with the type of aggregates used. Micro-texture creates frictional properties for vehicles travelling at low speeds. The wet skid resistant nature of a road is dependent on the interaction of the tire and the combined macro-texture and micro-texture of the road surface.

Conventional repair of shallow surface fissures and raveling uses various methods. Re-saturants are materials that soften old asphalt. They are typically mixed with an emulsion and sprayed onto the surface of the old pavement. The material penetrates into the uppermost 20 or 30 mils of the pavement and softens the asphalt, imparting flexibility. Thermally fluidized hot asphalt can also be sprayed directly onto the surface, which hardens and provides waterproofing. A fog seal is typically sprayed on the surface, and can be provided with a sand blotter to improve the friction coefficient. In a chip seal, a rubberized emulsion can also be sprayed onto the aged pavement, and then stone is broadcast into the rubberized emulsion which then hardens, bonding the stone. Slurry seal employs a cold aggregate/asphalt mixture prepared in a pug mill and placed on the aged pavement surface, but is applied in a much thinner layer, e.g., 0.25-0.75 inches. Once the pavement surface is repaired, any safety markings can be repainted.

The Federal Highway Administration, through the National Academy of Sciences, has done research into pavement durability. A 20-year long-term paving program (LTPP) was initiated in 1984 in an attempt to understand the failure mechanisms of paving. At the end of the 20-year program and after five years of data analysis, better ways have been developed for measuring pavement failure, the most noteworthy being the Strategic Highway Research Program (SHRP) grading system. The SHRP system can be used to determine the physical qualities of an asphalt product and its potential for long-term service. Subsequently, mechanical testing was developed to determine when the ductility and flexibility of the pavement was diminished, which correlates with end of its useful life as well as the chemical changes in the asphalt itself over time were studied. The presence of carbonyl groups and sulfoxides that are generated over the life of the pavement cross-section was discovered to be associated with asphalt embrittlement. This discovery now enables prediction of useful life. Accelerated weathering chambers also can be employed to determine the rate of formation of these telltale carbonyl groups and sulfoxides in a new binder system, binder/aggregate combination, or other paving material thereby predicting an expected useful life. In terms of the chemistry of deterioration, study data indicate that asphalt pavement fails because it becomes brittle. Embrittlement leads to mass loss, which leads to shrinkage, which produces cracks. Cracks become potholes, the pavement stops flexing, and aggregate becomes dislodged.

Deterioration of asphalt binder is generally associated with asphalt beyond the first 100 microns covering the rock surface. An asphalt layer on aggregate at depths within 100 microns of the asphalt/rock interface was found by the 20 year LTDP study to have not experienced the presence of sulfoxides and carbonyl groups that are associated with embrittlement. Therefore the properties of that asphalt were similar to those of virgin asphalt initially placed on the rock. While not wishing to be bound by theory, it is believed that the tight bond of the asphalt within the first 100 microns of the rock surface exhibited a high degree of intimacy. This intimacy inhibits the movement of scavenging oxidizers into the asphalt structure, thereby minimizing deterioration. Accordingly, it is believed that in an aged paving material averaging 95% aggregate and 5% asphalt, a 100 micron layer of good asphalt surrounds each aggregate particle, with embrittled asphalt in between. It is this "embrittlement zone" where ductility is lost and failure takes place. Air gaps in the cross-section of the pavement can allow water and air to gain access to the asphalt rock interface. Over a period of time, the asphalt goes from being flexible to becoming brittle. The chemistries associated with the embrittlement are related to the formation of sulfoxide or hydroxyl groups, and typically there is a loss of a hydrogen atom on the carbon (oxidation) which causes the key molecular structures to become shorter, thereby less flexible. Once that happens, the pavement becomes inflexible, cracks open up, the pavement loses mass, and rolling loads break up the pavement, causing cracking, potholes, running, ravelling, and block cracking, each resulting in a loss of the pavement integrity.

The conventional methods for repair of surface defects inclusive of rejuvenators and fog seals typically do not exhibit a desirable lifespan. The most durable conventional repair, a slurry seal or a chip seal, may last only 7 or 8 years. An analysis of pavement failure mechanisms provides an explanation for the poor lifespan observed for new asphalt pavement and subsequent repairs. The primary factor is that the repairs do not remedy the underlying embrittlement of the asphalt binder deep within the pavement cross-section. The embrittlement results from the scissioning of the polymer chains present in the asphalt under the influence of free radicals associated principally with water. Water penetrates the pavement, and sunlight and traffic over the pavement surface provides energy for reaction with oxygen and other pavement components, yielding sulfoxide and carboxylate reaction products and reduced polymer chain length through reaction with the resulting free radicals. Loss of polymeric molecular weight impacts the ability of the pavement to stretch and flex. A secondary failure mechanism is loss of rock itself due to hydrolytic attack of the asphalt-rock interface. Rocks typically comprise metal oxides (e.g., calcium oxide, silicon dioxide, lithium oxide, potassium oxide, sodium oxide). Hydroxide groups can form upon exposure to water, resulting in oxidative reactions that impair the adhesion of asphalt to the rock surface, a process referred to as stripping.

Loss of waterproofing typically is a top down mechanism. The asphalt breaks down from exposure to heavy load and the sun, causing water to penetrate between the asphalt and rock. The asphalt can lose its hydrophobicity, with paraffinic components being broken down into more hydrophilic components, which in turn accelerate the process of water adsorption. Raveling occurs, resulting in a loss of macrotexture. Ultimately, the microtexture of the surface is lost due to abrasion of tires across the surface rubbing off the asphalt and polishing the rock surface, whereby the coefficient of friction drops to unacceptable levels. Typically, a brand new pavement will have a coefficient of friction of between 0.6 and 0.7. Over time, loss of microtexture and ultimately macrotexture results in the coefficient of friction dropping to below about 0.35, at which point the pavement becomes inherently unsafe in terms of steer resistance in the presence of water. Even if a pavement surface does not have raveling or cracking, it can still be unsafe to drive on due to loss of adequate surface texture. Microtexture and macrotexture mechanisms function at different speeds. Typically, up to about 45 mph the microtexture controls stopping distance. Between 45 and 50 the macrotexture begins to have a greater effect on stopping distance, and above 50 mph the macrotexture is the principal determining factor in stopping distance.

Accordingly, there are a variety of maintenance techniques that can be employed on damaged asphalt pavement, some of them more successful than others in preserving and extending the useful life of the pavement. It is known that for pavement that is timely and properly maintained, and repaired in the early stages of deterioration, the typical useful life can be extended out to 19 or 20 years. However, in the current economic environment, the conventional approach to road maintenance is to fix the most often traveled pavement first, and then repair, as budgets allow, progressively the better pavement, such that a useful life closer to 12 or 13 years is typically observed.

SUMMARY OF THE INVENTION

A method for repairing asphalt pavement, such as alligatored asphalt pavement, is desirable that is both inexpensive when compared to conventional techniques, while yielding a paving surface having an equally long or longer useful life when compared to asphalt pavement repaired by conventional techniques. A method is also provided for rejuvenating aged asphalt so as to bring its paving properties closer to that of virgin pavement.

A composition and method for repairing pavement, that exhibits an improved lifespan when compared to conventional methods is desirable. Such a composition can result in improved binding between the asphalt and rock. Such a composition can also impart improved resistance to mechanical stress and shearing (e.g., from rolling loads that operate at an angle of incidence). The compositions are configured to modulate the failure mechanisms of the pavement, so as to impart improved waterproofing, maintenance of microtexture, maintenance of macrotexture, resistance to embrittlement, resistance to delamination, and resistance to mechanical stress. These improved properties greatly extend the lifetime of the pavement beyond that which would be observed for a conventional new pavement or a conventional repair method on existing pavement.

In addition to pavement compositions, coatings and paints comprising elastomers cured with terahertz radiation are also provided that exhibit superior properties of useful lifetime, durability, strength, and flexibility. Construction materials and coatings for use in bridges and building foundations, and methods of making same are provided. Materials configured to resist ballistic forces and methods of making same are provided. Lightweight concrete blocks and other construction materials, and methods of making same are provided. Fire-resistant coatings and construction materials, and methods of making same are provided. Also provided are binders and elastomers substantially as described herein, an emitter apparatus substantially as described herein, a system for repairing pavement substantially as described herein, and related methods.

In a generally applicable first aspect (i.e. independently combinable with any of the aspects or embodiments identified herein), a method for repairing asphalt, is provided comprising: passing an emitter over the asphalt, wherein the emitter radiates terahertz energy into the asphalt to a depth of at least 2 inches, wherein a temperature differential throughout a top two inches of asphalt is 100° F. or less, wherein a highest temperature in the top two inches of asphalt does not exceed 300° F., and wherein a minimum temperature in the top two inches of asphalt is at least 200° F., whereby voids and interstices in the asphalt are disturbed without dehydrogenation of the asphalt, and whereby oligomers present in the asphalt are linked together into longer polymer chains, whereby ductility of the asphalt is improved.

In an embodiment of the first aspect, which is generally applicable (i.e., independently combinable with any of the aspects or embodiments identified herein), the asphalt is in a form of asphalt pavement.

In an embodiment of the first aspect, which is generally applicable (i.e., independently combinable with any of the aspects or embodiments identified herein), the asphalt pavement is damaged asphalt pavement, and the method further comprises, before passing an emitter over the asphalt: preparing a surface of the damaged asphalt pavement comprising aged asphalt by filling in deviations from a uniform surface plane with dry aggregate and compacting the dry aggregate; and applying a reactive asphalt emulsion to the prepared surface, whereby the reactive emulsion penetrates into cracks and crevices in the damaged asphalt pavement and into areas filled with the dry aggregate, wherein the reactive asphalt emulsion comprises butyl rubber, a diene modified asphalt, and an environmentally hardened bioresin, and wherein the reactive asphalt emulsion contains less than 1% perflurocarbons as volatile components.

In an embodiment of the first aspect, which is generally applicable (i.e., independently combinable with any of the aspects or embodiments identified herein), the method further comprises removing road reflectors, thermoplastic imprinting, and safety devices by mechanically removing prior to filling in deviations.

In an embodiment of the first aspect, which is generally applicable (i.e., independently combinable with any of the aspects or embodiments identified herein), the reactive asphalt emulsion further comprises a medium to high molecular weight polyisobutylene.

In an embodiment of the first aspect, which is generally applicable (i.e., independently combinable with any of the aspects or embodiments identified herein), the dry aggregate is pre-coated with an elastomeric composition, and wherein the reactive asphalt emulsion is at least partially cured so as to yield dry, free-flowing coated asphalt.

In an embodiment of the first aspect, which is generally applicable (i.e., independently combinable with any of the aspects or embodiments identified herein), a temperature differential throughout a top two inches of asphalt pavement is 50° F. or less.

In an embodiment of the first aspect, which is generally applicable (i.e., independently combinable with any of the aspects or embodiments identified herein), the terahertz energy comprises wavelengths of from 1 nm to 5 mm.

In an embodiment of the first aspect, which is generally applicable (i.e., independently combinable with any of the aspects or embodiments identified herein), the terahertz energy comprises wavelengths of from 1-5 mm.

In an embodiment of the first aspect, which is generally applicable (i.e., independently combinable with any of the aspects or embodiments identified herein), the terahertz energy comprises wavelengths of from 2-5 mm.

In an embodiment of the first aspect, which is generally applicable (i.e., independently combinable with any of the aspects or embodiments identified herein), the asphalt pavement comprises granite rock and is further exposed to electromagnetic radiation that has a peak wavelength of from 3000 to 5000 nm.

In an embodiment of the first aspect, which is generally applicable (i.e., independently combinable with any of the aspects or embodiments identified herein), the asphalt pavement comprises sand and is further exposed to electromagnetic radiation that has a peak wavelength of 3000 nm or from 5000 to 8000 nm.

In an embodiment of the first aspect, which is generally applicable (i.e., independently combinable with any of the aspects or embodiments identified herein), the asphalt pavement comprises limestone and is further exposed to electromagnetic radiation that has a peak wavelength of from 3000 to 4000 nm.

In an embodiment of the first aspect, which is generally applicable (i.e., independently combinable with any of the aspects or embodiments identified herein), the asphalt pavement comprises maltene asphalt and is further exposed to electromagnetic radiation that has a peak wavelength of from 2000 to 8000 nm.

In an embodiment of the first aspect, which is generally applicable (i.e., independently combinable with any of the aspects or embodiments identified herein), the asphalt pavement comprises asphaltene asphalt and is further exposed to electromagnetic radiation that has a peak wavelength of from 2000 to 4000 nm.

In an embodiment of the first aspect, which is generally applicable (i.e., independently combinable with any of the aspects or embodiments identified herein), the emitter is a panel comprising a serpentine wire and a micaceous material through which energy generated by the emitter passes, and wherein the emitter produces energy with a power density of from 3 to 15 W/in$^2$.

In an embodiment of the first aspect, which is generally applicable (i.e., independently combinable with any of the aspects or embodiments identified herein), the oligomers possess 2-150 repeating units.

In an embodiment of the first aspect, which is generally applicable (i.e., independently combinable with any of the aspects or embodiments identified herein), the method further comprises, after passing an emitter over the asphalt: allowing the pavement to cool to below 190° F.; and applying a compacting roller to the asphalt pavement to minimize voids and surface irregularities, wherein the asphalt is at a temperature no lower than 150° F., whereby a density of the compacted asphalt pavement is similar to that of virgin asphalt pavement.

In a generally applicable second aspect (i.e. independently combinable with any of the aspects or embodiments identified herein), an emitter system is provided for repairing asphalt pavement, comprising: a structural frame; and one or more emitter panels situated within the structural frame and pointing downward, wherein the metal frame is insulated with a layer of a high-density ceramic, wherein each emitter panel comprises a serpentine wire positioned between the high-density ceramic and a sheet of a micaceous material exhibiting biaxial birefringence, wherein each emitter panels is configured such that, in use, energy generated by each emitter panel passes through the sheet of micaceous material and impinges on an asphalt pavement, wherein each emitter panel is configured to produce energy with a power density of from 3 to 15 W/in$^2$.

In an embodiment of the second aspect, which is generally applicable (i.e., independently combinable with any of the aspects or embodiments identified herein), the structural frame is a metal frame comprising one or more beams attached to one or more wheels, and wherein the structural frame is configured to prevent bending, sagging, or twisting even while traversing uneven terrain.

In an embodiment of the second aspect, which is generally applicable (i.e., independently combinable with any of the aspects or embodiments identified herein), the emitter system further comprises a power source configured to supply electrical power to the one or more emitter panels, wherein the power source is a portable generator.

In an embodiment of the second aspect, which is generally applicable (i.e., independently combinable with any of the aspects or embodiments identified herein), the portable generator is a diesel generator configured to deliver at least 250 kW.

In an embodiment of the second aspect, which is generally applicable (i.e., independently combinable with any of the aspects or embodiments identified herein), the emitter system further comprises a power interrupting mechanism and a positioning system.

In an embodiment of the second aspect, which is generally applicable (i.e., independently combinable with any of the aspects or embodiments identified herein), the emitter system further comprises a power distribution device disposed on at least part of the one or more emitter panels and on at least part of the frame, wherein the power distribution device comprises one or more circuit breakers or other power interrupting mechanisms.

In an embodiment of the second aspect, which is generally applicable (i.e., independently combinable with any of the aspects or embodiments identified herein), the system is sized so as to irradiate a standard lane width of asphalt pavement in a single pass.

In an embodiment of the second aspect, which is generally applicable (i.e., independently combinable with any of the aspects or embodiments identified herein), each emitter panel is in a shape of a square or a rectangle having dimensions of approximately 12 inches by approximately 24 inches, and wherein the emitter panels are arranged in an array wherein each emitter panel abuts an adjacent emitter panel, and wherein each emitter panel is connected in parallel or in serial with other emitter panels.

In an embodiment of the second aspect, which is generally applicable (i.e., independently combinable with any of the aspects or embodiments identified herein), the array is approximately 12 feet wide, 8 feet long, and approximately 2 feet high.

In an embodiment of the second aspect, which is generally applicable (i.e., independently combinable with any of the aspects or embodiments identified herein), the emitter system further comprises a vehicle configured to pull the array and the power source over an asphalt pavement.

In a generally applicable third aspect (i.e. independently combinable with any of the aspects or embodiments identified herein), a method is provided for repairing an asphalt pavement, comprising: passing the emitter system of the second aspect over an asphalt pavement in need of repair, wherein the emitter system radiates terahertz energy into the asphalt pavement to a depth of at least 2 inches, wherein a temperature differential throughout a top two inches of the asphalt pavement is 100° F. or less, wherein a highest temperature in the top two inches of the asphalt pavement does not exceed 300° F., and wherein a minimum temperature in the top two inches of the asphalt pavement is at least 200° F., whereby voids and interstices in the asphalt pavement are disturbed without dehydrogenation of the asphalt in the asphalt pavement, and whereby oligomers present in the asphalt of the asphalt pavement are linked together into longer polymer chains, whereby ductility of the asphalt is improved.

In an embodiment of the third aspect, which is generally applicable (i.e., independently combinable with any of the aspects or embodiments identified herein), the asphalt pavement is damaged asphalt pavement, the method further comprising, before passing an emitter over the asphalt: preparing a surface of the damaged asphalt pavement comprising aged asphalt by filling in deviations from a uniform surface plane with dry aggregate and compacting the dry aggregate; and applying a reactive asphalt emulsion to the prepared surface, whereby the reactive emulsion penetrates into cracks and crevices in the damaged asphalt pavement and into areas filled with the dry aggregate, wherein the reactive asphalt emulsion comprises butyl rubber, a diene modified asphalt, and an environmentally hardened bioresin, and wherein the reactive asphalt emulsion contains less than 1% perflurocarbons as volatile components.

In an embodiment of the third aspect, which is generally applicable (i.e., independently combinable with any of the aspects or embodiments identified herein), the method further comprises removing road reflectors, thermoplastic imprinting, and safety devices by mechanically removing prior to filling in deviations.

In an embodiment of the third aspect, which is generally applicable (i.e., independently combinable with any of the aspects or embodiments identified herein), the reactive asphalt emulsion further comprises a 10,000 to 100,000 molecular weight grafted or ungrafted polyisobutylene and a 10,000 to 100,000 molecular weight grafted or ungrafted styrene-butadiene-styrene.

In an embodiment of the third aspect, which is generally applicable (i.e., independently combinable with any of the aspects or embodiments identified herein), the dry aggregate is pre-coated with an elastomeric composition, and wherein the reactive asphalt emulsion is at least partially cured so as to yield dry, free-flowing coated asphalt.

In an embodiment of the third aspect, which is generally applicable (i.e., independently combinable with any of the aspects or embodiments identified herein), a temperature differential throughout a top two inches of asphalt pavement is 100° F. or less.

In an embodiment of the third aspect, which is generally applicable (i.e., independently combinable with any of the aspects or embodiments identified herein), the terahertz energy comprises wavelengths of from 1 nm to 5 mm.

In an embodiment of the third aspect, which is generally applicable (i.e., independently combinable with any of the aspects or embodiments identified herein), the terahertz energy comprises wavelengths of from 2 nm to 5 mm.

In an embodiment of the third aspect, which is generally applicable (i.e., independently combinable with any of the aspects or embodiments identified herein), the oligomers possess 2-150 repeating units.

In an embodiment of the third aspect, which is generally applicable (i.e., independently combinable with any of the aspects or embodiments identified herein), the method further comprises, after passing the emitter system over the asphalt: allowing the pavement to cool to below 240° F.; and applying a compacting roller to the asphalt pavement to minimize voids and surface irregularities, wherein the asphalt is at a temperature no lower than 150° F., whereby a density of the compacted asphalt pavement is similar to that of virgin asphalt pavement.

In an embodiment of the third aspect, which is generally applicable (i.e., independently combinable with any of the aspects or embodiments identified herein), the step of applying a reactive asphalt emulsion further comprises heating the asphalt pavement; wherein the asphalt pavement comprises granite rock and is exposed to electromagnetic radiation that has a peak wavelength of from 3000 to 5000 nm in order to heat the asphalt pavement.

In an embodiment of the third aspect, which is generally applicable (i.e., independently combinable with any of the aspects or embodiments identified herein), the step of applying a reactive asphalt emulsion further comprises heating the asphalt pavement; wherein the asphalt pavement comprises sand is further exposed to electromagnetic radiation that has a peak wavelength of 3000 nm or from 5000 to 8000 nm in order to heat the asphalt pavement.

In an embodiment of the third aspect, which is generally applicable (i.e., independently combinable with any of the aspects or embodiments identified herein), the step of applying a reactive asphalt emulsion further comprises heating the asphalt pavement; wherein the asphalt pavement comprises limestone and is exposed to electromagnetic radiation that has a peak wavelength of from 3000 to 4000 nm in order to heat the asphalt pavement.

In an embodiment of the third aspect, which is generally applicable (i.e., independently combinable with any of the aspects or embodiments identified herein), the step of applying a reactive asphalt emulsion further comprises heating the asphalt pavement; wherein the asphalt pavement comprises maltene asphalt and is exposed to electromagnetic radiation that has a peak wavelength of from 1000 to 10,000 nm in order to heat the asphalt pavement.

In an embodiment of the third aspect, which is generally applicable (i.e., independently combinable with any of the aspects or embodiments identified herein), the step of applying a reactive asphalt emulsion further comprises heating the asphalt pavement; wherein the asphalt pavement comprises asphaltene asphalt and is exposed to electromagnetic radiation that has a peak wavelength of from 1000 to 4000 nm in order to heat the asphalt pavement.

Any of the features of an embodiment of the first through third aspects is applicable to all aspects and embodiments identified herein. Moreover, any of the features of an embodiment of the first through third aspects is independently combinable, partly or wholly with other embodiments described herein in any way, e.g., one, two, or three or more embodiments may be combinable in whole or in part. Further, any of the features of an embodiment of the first through third aspects may be made optional to other aspects or embodiments. Any aspect or embodiment of a method can be performed by a system or apparatus of another aspect or embodiment, and any aspect or embodiment of a system can be configured to perform a method of another aspect or embodiment.

DESCRIPTION OF THE DRAWINGS

FIG. 11 provides a comparison of attributes of emitter technology versus conventional pavement rejuvenation technologies.

DETAILED DESCRIPTION OF THE PREFERRED EMBODIMENT

Figure 1A:
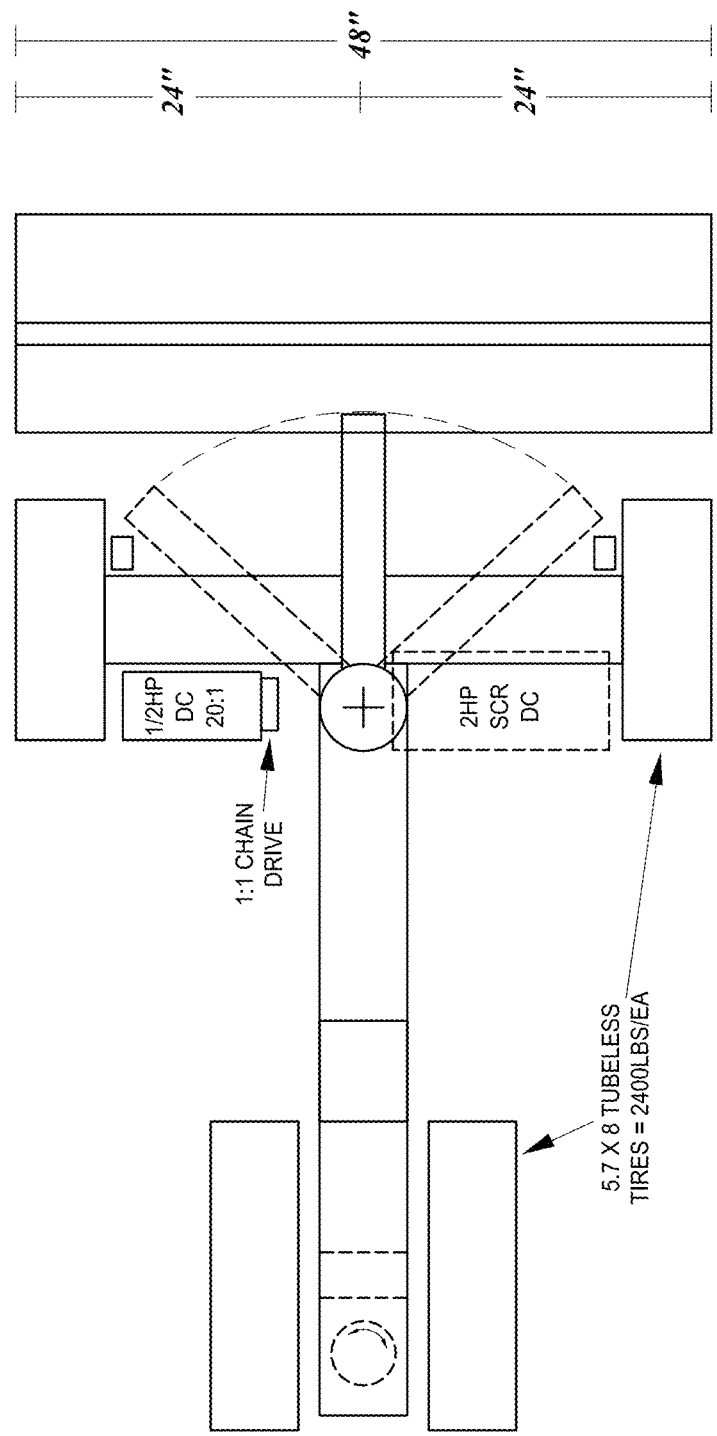
FIG. 1A provides a top view of an apparatus for applying aggregate and reactive emulsion to paving surface to be repaired.

The following description and examples illustrate a preferred embodiment of the present invention in detail. Those of skill in the art will recognize that there are numerous variations and modifications of this invention that are encompassed by its scope. Accordingly, the description of a preferred embodiment should not be deemed to limit the scope of the present invention.

Contrary to conventional methods, the systems of various embodiments and associated paving repair methods not only repair the pavement to a uniform surface with paving properties similar or superior to conventional or conventionally repaired asphalt paving, but also change the character of the underlying deteriorated road bed to minimize or eliminate the telegraphing of cracks. This character of the underlying pavement is a function of, e.g., the starting composition of the road, how the road was initially manufactured, exposure of the road to ambient conditions and different loads over time, and prior repair processes.

Pavement that has undergone the long term stresses of sun, rain and mechanical loads endures a continuous, oxidative chemical attack which results in mass loss to the binder. As asphalt binder mass loss occurs, the pavement shrinks, forming crack patterns: laterally, longitudinally and into an alligatored mat. Visual, physical evidence of this crack propagation usually begins within the first seven years of the installation of a new asphalt concrete (AC) pavement road.

A detailed reaction mechanism of asphalt oxidation, resulting in this mass loss of chemicals, remains a developing science. It is generally accepted that resinous subcomponents such as naphthene aromatic and polar aromatic fractions are consumed during the oxidation process. These resins constitute the continuous, solvating-suspension phase of asphalt; and, taken as a whole, are referred to as maltenes. Suspended within the maltenes are a high molecular weight substance known as asphaltenes. While a final development of this reaction mechanism is being developed, research scientists have identified the production rate(s) of carbonyl groups such as ketones and carboxylic acid and sulfoxides, identified by infrared spectroscopy, as the functional 'fingerprint' that the mechanism is progressing. A detailed discussion of the relationship between asphalt compatibility, flow properties, and oxidative aging is provided by Pauli et al., Int. J. Pavement Res. Techol. 6(1):1-7, the entire contents of which is hereby incorporated by reference herein. Pauli et al. provide methodology for determining aging in asphalt pavement, which can be employed to determine the degree of aging of asphalt pavement, enabling a comparison of the quality of repair attained by various methods (e.g., methods of the embodiments versus conventional Hot In-Place Recycling, or conventional cold patch or hot patch technology).

Asphalt concrete ductility and adhesion is primarily a function of the maltene components. Aged asphalt binders, containing a substantially high percentage of asphaltenes, exhibit brittleness and sufficient loss of strength whereby rolling mechanical loads accelerate the rate of damage to the stone-asphalt composite structure. The uppermost one-half inch (0.50") cross-section of AC pavement has the highest concentration of asphaltenes as the oxidative mechanism is accelerated by the concentrated presence of moisture, air and sunlight at the pavement surface. Such aged and alligatored pavement is repaired using the pavement repair systems of various embodiments.

Solid phase auto-regenerative cohesion can be achieved within an asphalt through the use of functional bio-resin modified, conventional emulsions to achieve a robust fatigue life, including self-healing properties, for infrastructure elements such as roads and concrete structures. Homogenizing asphalt liquid oligomers involves use of a highly efficient, heavy industrial, mobile heating platform which is capable of emitting a broad bandwidth of energy between near infrared to near microwave. The technology for road construction and restoration has been developed to optimize adhesive qualities and curing processes which substantially attenuate well understood stress-strain relationships within the aggregate binder system; thereby extending fatigue life.

Pavement Preparation Stage

The initial stage in the pavement repair methodology preferably involves a preparatory stage. The rough surface and cracks of aged, e.g., alligatored pavement are typically riddled with dirt and organic matter, which are removed to allow new slurry material to come in contact with the original stone-asphalt composite structure. In this preparatory stage, the pavement surface is cleared of such debris, as well as pavement markers (road reflectors, raised pavement markers, temporary polyurethane markers, tactile pavement structures, and the like).

It is generally preferred to remove pavement markers (road reflectors, raised pavement markers, temporary polyurethane markers, tactile pavement structures, thermoplastic imprinting, crosswalk markings, or other marking or safety devices) by mechanically removing, e.g., scraping off or combusting, prior to conducting further steps. An advantage of the methodology of various embodiments over conventional processes is that there is no need to clean the pavement beyond broom clean, e.g., by removing dirt and pavement markers, and there is also no need to remove any paint or other such markings on the pavement surface.

Debris removal is advantageously accomplished by applying a pressurized air-water mixture to the surface; however, other methods can be performed instead of or in conjunction with pressurized treatment. For example, the surface can be cleaned using pressurized air only, pressurized water only, a pressurized solvent, sweeping, vacuuming, or the like. In a preferred embodiment, debris removal is preferably accomplished using a low volume, high pressure water blasting system operating in the 100-500 psi range. A nozzle jet which delivers a conical pattern is particularly preferred because it leaves no spray 'shadow' as the washing device moves parallel to the surface of the pavement. A vacuum system positioned just ahead and just behind the high pressure washing system can minimize the possible negative environmental impact caused by dislodged material being transferred into the atmosphere and adjacent ditch line. A conventional Hot In-Place Recycle process virtually never follows this practice, since when the uppermost pavement cross-section (approximately the top 2" of pavement) is planed or scarified, the dirt and organic debris is simply rolled into the processed pavement, thereby becoming small defects to the final, recycled pavement finish.

Large cracks (e.g., cracks wider than one inch), potholes and divots are preferably filled with suitable cold or warm patch asphalt concrete material and compacted to a dense structure parallel to the elevation of the surrounding pavement surface. In some embodiments, deviations from a uniform surface plane (e.g., potholes, divots, cracks, grooves, compressions, ruts, and the like) in the pavement are filled and compacted with select gradations of dry aggregate, e.g., prior to application of a cold or warm patch asphalt, or an asphalt emulsion. Deviations from a uniform surface plane can penetrate deep into the surface of a rough pavement, typically to a depth of up to 3 or 4 inches. The aggregate serves to infill lost volume to the structure and return the pavement surface to a uniform plane, with no divots, ruts, or other sizeable irregularities. The aggregate is also selected to exhibit the proper combination of micro and macro texture to ensure good traction for vehicles traveling over the road under ambient conditions. Typical aggregate size ranges from ¼ inches in diameter to ⅜ inches in diameter; however, smaller or larger aggregate can be employed. Suitable aggregate includes coarse particulate material typically used in construction, such as sand, gravel, crushed stone, slag, recycled concrete or asphalt pavements, ground tire rubber, and geosynthetic aggregates. In paving applications, the aggregate serves as reinforcement to add strength to the overall composite material. Aggregates are also used as base material under roads. In other words, aggregates are used as a stable foundation or road/rail base with predictable, uniform properties (e.g. to help prevent differential settling under the road or building), or as a low-cost extender that binds with more expensive cement or asphalt to form concrete. The American Society for Testing and Materials publishes a listing of specifications for various construction aggregate products, which, by their individual design, are suitable for specific construction purposes. These products include specific types of coarse and fine aggregate designed for such uses as additives to asphalt and concrete mixes, as well as other construction uses. State transportation departments further refine aggregate material specifications in order to tailor aggregate use to the needs and available supply in their particular locations. Sources of aggregates can be grouped into three main categories: those derived from mining of mineral aggregate deposits, including sand, gravel, and stone; those derived from of waste slag from the manufacture of iron and steel; and those derived by recycling of concrete, which is itself chiefly manufactured from mineral aggregates. The largest-volume of recycled material used as construction aggregate is blast furnace and steel furnace slag. Blast furnace slag is either air-cooled (slow cooling in the open) or granulated (formed by quenching molten slag in water to form sand-sized glass-like particles). If the granulated blast furnace slag accesses free lime during hydration, it develops strong hydraulic cementitious properties and can partly substitute for Portland cement in concrete. Steel furnace slag is also air-cooled. Glass aggregate, a mix of colors crushed to a small size, is substituted for many construction and utility projects in place of pea gravel or crushed rock. Aggregates themselves can be recycled as aggregates. Many polymer-based geosynthetic aggregates are also made from recycled materials. Any solid material exhibiting properties similar to those of the above-described aggregates may be employed as aggregate in the processes of various embodiments. Once the dry aggregate is placed in the damaged areas (potholes, large divots, large cracks, or compressions), it is preferably compacted, smoothed and leveled off.

Reactive Asphalt Emulsion Stage

After the surface of the aged pavement is cleaned, a reactive asphalt emulsion or an aggregate composite slurry, e.g., a hot slurry, is sprayed, poured, or otherwise applied onto cleaned (and optionally hot patch asphalt concrete, cold patch asphalt concrete, and/or the dry aggregate-filled) surface. The reactive asphalt emulsion and/or aggregate composite slurry thus applied quickly penetrates into small cracks and crevices in the aged pavement as well as dry aggregate-filled areas, providing a substantially fully saturated cross section to a surface of the plane of the road. Because of the high penetrating ability of the reactive asphalt emulsion in the emulsion and aggregate composite slurry, only a small amount of binder is needed to form a strong bond with the dry aggregate—typically approximately 10% binder to 90% dry aggregate is employed. The reactive emulsion is preferably hot and typically applied in the form of a 20% to 40% solid emulsion in water. The water in the reactive asphalt emulsion either flashes off during subsequent activities, or is absorbed by the aggregate or otherwise remains in the paving system. The binder upon curing bonds not only the new aggregate together, but also new aggregate to old pavement, and old pavement together.

The process methods utilize various combinations of elastomers and other components so as to achieve a road surface exhibiting an extremely good toughness, extremely good stretchability, good environmental resistance, and good adhesion. The compositions are waterborne, sprayable, and can be provided as a single package. A plurality of crosslinkable binder elements is employed. In addition to binding new aggregate and aged pavement, the reactive emulsion compositions may be configured for use as a primer/tack coat, a stress absorbing interlayer, or a texture restoring and waterproofing top coat.

The compositions exhibit viscosities suitable for processing using conventional paving techniques, and polymerize at a temperature compatible with conventional asphalt paving temperatures. Dissolving diluents and plasticizers are employed in conjunction with the elastomers such that the rubberized mixture of elastomer and asphalt is rendered into liquid form at room temperature, which yields tremendous advantages in terms of handleability and ease of installation in addition to long term performance of the resulting paving material. The elastomer compositions include butyl rubber, diene modified asphalt, and chemically fortified bioresins (bioresins that have been taken through a reactor cycle to enhance long term stability, sun resistance, and long term hydrolytic resistance), and contain negligible (<1%) to zero perflurocarbons (PFCs) and negligible (<1%) polyaromatic hydrocarbons (PAHs) as the volatile components.

Alternatively to and in conjunction with the placement of dry aggregate in voids as previously described, the elastomer compositions can be prepared as an ambient liquid that, at the job site, may be sprayed into a mixer with aggregate. The composition coats the stone using similar techniques as in a hot mix plant, except that it is done at ambient temperature. The coated aggregate is laid on the ground and spread with conventional drag boxes or paving machines at a very thin coating. Depending upon the size of the aggregate, a thickness of 1/10 inch can be obtained (e.g., using spray coating or other deposition techniques); however, thicknesses of approximately ½ inch are typically employed with aggregate having a diameter of up to approximately ⅜ inches.

The reactive emulsion is a waterborne emulsion of a polymer modified asphalt. The asphalt itself can be provided in emulsion form. Asphalt, also referred to as bitumen, is a sticky, black and highly viscous liquid or semi-solid that is present in most crude petroleums and in some natural deposits. Asphalt is used as a glue or binder mixed with aggregate particles to create asphalt pavement. The terms "asphalt" and "bitumen" are often used interchangeably to mean both natural and manufactured forms of the substance. Asphalt is the refined residue from the distillation process of selected crude oils and boils at 525° F. Naturally occurring asphalt is sometimes referred to as "crude bitumen." Asphalt is composed primarily of a mixture of highly condensed polycyclic aromatic hydrocarbons; it is most commonly modeled as a colloid.

A number of technologies allow asphalt to be mixed at temperatures much lower than its boiling point. These involve mixing the asphalt with petroleum solvents to form "cutbacks" with reduced melting point or mixtures with water to turn the asphalt into an emulsion. Asphalt emulsions contain up to 70% asphalt and typically less than 1.5% chemical additives. There are two main types of emulsions with different affinity for aggregates, cationic and anionic.

Asphalt can also be made from non-petroleum based renewable resources such as sugar, molasses, rice, corn, and potato starches, or from waste material by fractional distillation of used motor oils.

The asphalt can be modified by the addition of polymers, e.g., natural rubber or synthetic thermoplastic rubbers. Styrene butadiene styrene and styrene ethylenebutadiene styrene are thermoplastic rubbers. Ethylene Vinyl Acetate (EVA) is a thermoplastic polymer. The most common grade of EVA for asphalt modification in pavement is the classification 150/19 (a melt flow index of 150 and a vinyl acetate content of 19%). The polymer softens at high temp, and then solidifies upon cooling. Typically, approximately 5% by weight of the polymeric additive is added to the asphalt. Rubberized asphalt is particularly suited for use in certain embodiments.

Functionalized triglyceride bioresins can be employed as thermoset components in certain emulsion formulations. Thermosets harden at high temperature. When employed in combination with a thermoplastic component, the composition maintains its shape better on heating and under high temperature conditions. Suitable bioresins are derived from triglycerides—fatty acid triesters of the trihydroxy alcohol glycerol. Triglycerides are an abundant renewable resource primarily derived from natural plant or animal oils that contain esterified mono- to poly-unsaturated fatty acid side chains. They can be obtained from a variety of plant sources, e.g., linseed oil, castor oil, soybean oil. Linseed oil comprises an average of 53% linolenic acid, 18% oleic acid, 15% linoleic acid, 6% palmitic acid, and 6% stearic acid. Cross-linking occurs at points of unsaturation on the fatty acid side chains. The triglycerides can be modified to contain epoxy and/or hydroxy groups by methods known in the art to improve cross-linking and to allow the triglyceride to be cross-linked using conventional urethane crosslinking chemistries.

Suitable binder crosslink components include resins that are multifunctional and react with active hydrogens, e.g., in carboxylic or carbonyl, or hydroxyl. These resins can include polyurethanes, isocyanates, bisphenol A-based liquid epoxy resins, and aliphatic glycol epoxy resins as marketed by The Dow Chemical Company. The binder crosslink component is water dispersible but will stay buffered from going into a crosslink in the presence of water. Upon evaporation of the water, it will self-cross within 24 hours just from UV initiation. As long as water is present in the mix, the components can remain in proximity without cross-linking (e.g., yielding a single component formulation).

Suitable suspension components include pre-crosslinked bioresin suspension gels. They react with both the crosslink component and catalyst to yield a tough, water resistant, shear resistant plastic. The suspension component is preferably relatively inexpensive, has tremendous robustness, and is not hydrophobic.

Suitable catalysts include multi-functional pre-dispersed initiators (MFXI). Multifunctional initiators are those that possess more than one functional group capable of providing a site for chain growth. The catalyst assists in improving growth of molecular weight, and when compounded into the polymer imparts robustness. The catalyst can be activated by either ultraviolet radiation (e.g., sunlight) or heat. Suitable multifunctional catalysts can include one or more sulfates and a reactive metal that is an electron scavenger, which can cause crosslinking between a hydrogen-seeking crosslinking agent and other functional groups in the presence of water.

The components of the reactive emulsion composition can undergo a thermotropic conversion, resulting in entanglement and/or bridging at functional groups such that the resulting reaction product comprises both thermoplastic and thermoset elements. The resulting composition exhibits a superior suspension (the "yield") against the settling of the much denser inorganic element (fine to coarse aggregate) by the formation of a "clathrate" or "cage-like" medium. This fully integrated, interlocking connectivity between the three polymeric components maintains the aggregate in place and better protected from the elements than in conventional formulations.

The thermoplastic component and the thermoset/suspending components possess chain-terminating functional groups that are hindered mostly by water but will selectively react to form a crosslink, upon water evaporation, to the thermoplastic functionality rather than to the functionality of sister thermoset molecules, thereby forming a true thermoset rather than a less precise molecularly entanglement which exhibits more amorphous (and less useful) physical properties. The composition can be provided as a single package, which is activated/cross-linked upon removal of the water. The chain chemistry is such that thermoplastic moieties are coupled to thermoset moieties. When heated, it will act like a thermoplastic but it will have substantial resistance to thermal distortion because of the thermoset components. The relative amounts of thermoplastic and thermoset components will determine the resistance. For example, a small amount of thermoplastic moieties with a large amount of thermoset moieties will exhibit little plasticity upon heating. The resulting cross-linked material can be considered to be a thermotrope that will behave like both a thermoset and a thermoplastic at different temperatures.

The thermoplastic component in the water-borne compositions of selected embodiments is a preferably a polymer modified asphalt emulsion, with the polymer typically a styrene, ethylene, butadiene styrene, or a styrene butadiene styrene polymer. The midblock, e.g., butadiene and/or ethylene butadiene, can be linear or radial. Polyethylene glycols, such as those available from Kraton and Asahi, are water-soluble nonionic oxygen-containing high-molecular ethylene oxide polymers having two terminal hydroxyl groups. They are available in a broad range of molecular weight grades, and include crystalline thermoplastic polymers (MW>2000) suitable for use in certain compositions of the various embodiments. An additional broad range of properties is available by integrating polyisobutylene rubber (e.g., Oppanol® manufactured by BASF of Ludwigshafen am Rhein, Germany). The Oppanol® polyisobutylenes are of medium and high molecular weight, ranging from 10,000 MW up to 5,000,000 MW. TABLE 1 lists properties of commercially available Oppanol® polyisobutylenes that are suitable for use in elastomer compositions of various embodiments.

TABLE 1

| Oppanol ® | Viscosity in solution (isooctane, 20° C.) Concentration [g/cm3] | Staudinger Index (J0) [cm3/g] | Average molecular weight, viscosity average (Mv) [g/mol] | Stabilized [with BHT] |
|---|---|---|---|---|
| medium-molecular-weight Oppanol ® | | | | |
| B 10 SFN | 0.01 | 27.5-31.2 | 40 000 | No |
| B 10 N | 0.01 | 27.5-31.2 | 40 000 | Yes |
| B 11 SFN | 0.01 | 32.5-36.0 | 49 000 | No |
| B 12 SFN | 0.01 | 34.5-39.0 | 55 000 | No |
| B 12 N | 0.01 | 34.5-39.0 | 55 000 | Yes |
| B 13 SFN | 0.01 | 39.0-43.0 | 65 000 | No |
| B 14 SFN | 0.01 | 42.5-46.4 | 73 000 | No |
| B 14 N | 0.01 | 42.5-46.4 | 73 000 | Yes |
| B 15 SFN | 0.01 | 45.9-51.6 | 85 000 | No |
| B 15 N | 0.01 | 45.9-51.6 | 85 000 | Yes |
| high-molecular-weight Oppanol ® | | | | |
| B 30 SF | 0.005 | 76.5-93.5 | 200 000 | No |
| B 50 | 0.002 | 113-143 | 400 000 | Yes |
| B 50 SF | 0.002 | 113-143 | 400 000 | No |
| B 80 | 0.002 | 178-236 | 800 000 | Yes |
| B 100 | 0.002 | 241-294 | 1 110 000 | Yes |
| B 150 | 0.001 | 416-479 | 2 600 000 | Yes |
| B 200 | 0.001 | 551-661 | 4 000 000 | Yes |

The reactive emulsion and/or aggregate slurry can be sprayed or poured on a prepared or unprepared pavement surface to be repaired. Upon contact with hot rock or pavement, the water present evaporates and the composition sets. Once set, the composition may be treated with electromagnetic radiation and then compacted by a vibrating roller while at or above 150° F. (or above 175° F., or above 200° F.) but below the 'blue smoke' threshold (typically >300° F.), preferably below 275° F., most preferably about 250° F. The resulting surface has a very low void density, a high resistance to heating and softening, and it has anchor points with a wearing core essentially that is bound into it that will not move if new pavement is placed on top. The compositions of various embodiments enable the densification (or reduction in voids percentage) to be dramatically improved, e.g., a pavement having 6-8% voids can be densified to a pavement having 5% or less voids, or even 4% or less voids, e.g., 2% to 2.5%, 3%, or 3.5% voids. A void percentage reduction of 1%, 2%, 3%, 4%, or 5% or more (e.g., a void percentage reduction of 1% would correspond to a densification of a pavement having 6% voids to one having 5% voids) is desirable; however, smaller reductions can also be advantageous. The life of the pavement is increased substantially upon improvement in densification.

Although dry, untreated aggregate can optionally be employed in the preparatory stage, and later combined with the reactive emulsion to yield a reactive emulsion and aggregate slurry, it can be advantageous to combine the reactive emulsion and aggregate into a slurry before applying to the aged (e.g., alligatored) pavement. In certain embodiments it can be desirable to pretreat the aggregate surface to form "anchor points" by coating with a water dispersible thermoset resin that has, in addition to the functional groups which selectively couple with the thermoplastic functionality discussed above, an independent, mid-morphology, pendulous functionality which bonds with a sufficiently improved strength to the specific rock chemistry being used in the final composition. Foremost, this dramatically improves binder adhesion to the stone binder interface, thereby reducing moisture susceptibility. It also assures that the film stays in place and does not prematurely slip laterally. A benefit in an application such as an interlayer primer is much higher compaction and thus a lower void density, i.e., improved resistance to oxidative, hydrocarbon embrittlement and ultimately a noticeably longer useful.

The reactive emulsions exhibit superior properties when compared to conventional formulations. The superior properties can be in the areas of handling, storability, hazmat, curing characteristics, environmental considerations, chemical resistance, moisture susceptibility, sun resistance, tensile and flexural quanta, and anti-strip quanta. The compositions can be handled, stored and installed using conventional equipment. They can exhibit reduced hot mix asphalt (HMA) concrete void density. They can provide a novel way to restore microtexture to a pavement surface. They can exhibit improved water resistance and/or sun resistance. The compositions can provide the highest mechanical properties versus unit of cost, and are sustainable. The compositions reform and stabilize a broad range of weakness in asphalt and result in a substantially lower life cycle cost of pavement maintenance.

Figure 1B:
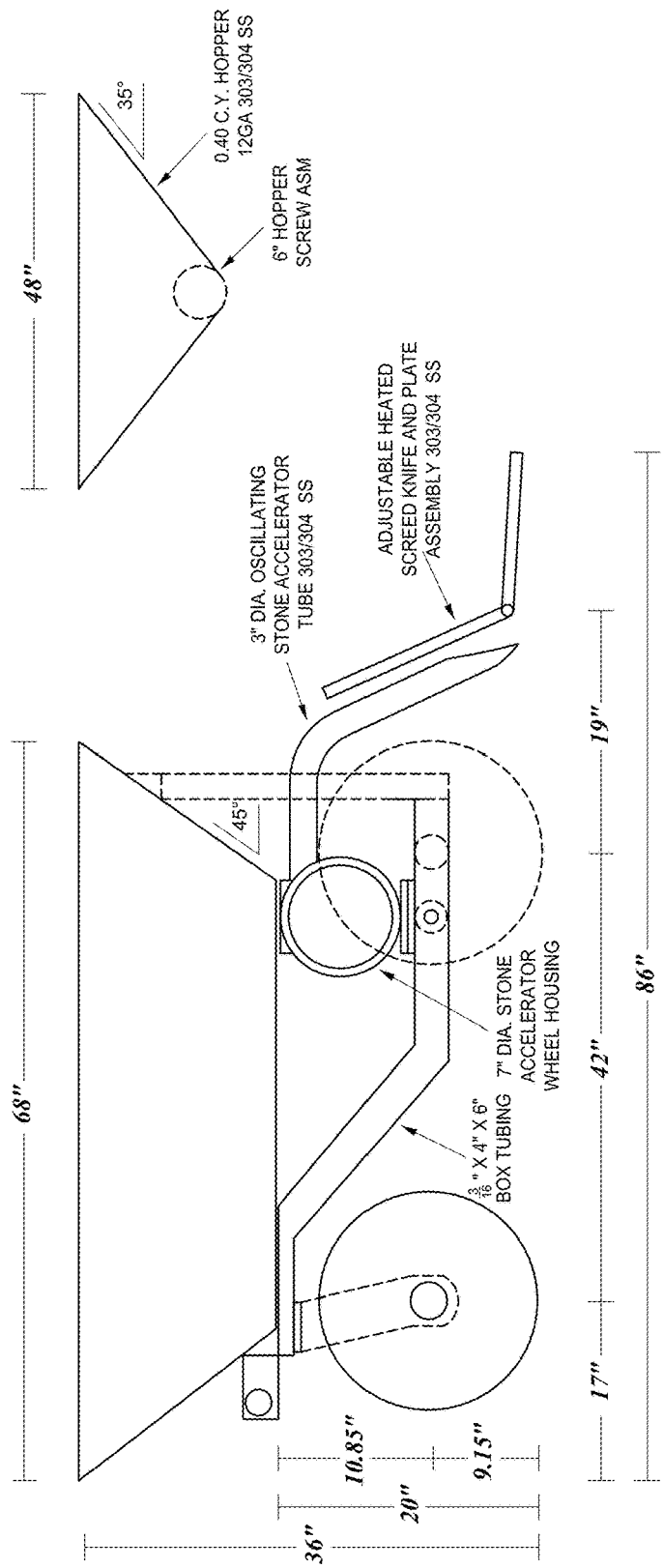
FIG. 1B provides a side and front view of the apparatus of FIG. 1A. An air pot adhesive tank is not depicted. Electric power and compressed air can be provided to the apparatus by a support unit, not depicted. The hopper is loaded with a heated aggregate, and the apparatus is configured to move at a speed of 20 feet per minute, with a maximum speed of delivery of aggregate of 75 feet per second.

FIG. 1A provides a top view of an apparatus for applying aggregate and reactive emulsion to paving surface to be repaired. FIG. 1B provides a side and front view of the apparatus of FIG. 1A. An air pot adhesive tank is not depicted. Electric power and compressed air can be provided to the apparatus by a support unit, not depicted. The hopper is loaded with a heated aggregate, and the apparatus is configured to move at a speed of 20 feet per minute, with a maximum speed of delivery of aggregate of 75 feet per second.

Elastomer Coated Aggregate Stage

In certain embodiments, after the aggregate has been placed and the reactive emulsion has been applied, optionally a thin layer (from about ⅛ inches or less to about 1 inches or more) of elastomer coated aggregate can optionally be either sprayed or spread across the surface of the pavement so as to provide a uniform surface and to fill in any other depressions that were not aggregate filled during the dry aggregate preparation stage.

Heating Stages

In certain embodiments, it can be desired to heat an asphalt surface. Heating can be accomplished by conventional techniques, or techniques as described herein. In certain embodiments wherein an asphalt emulsion is applied to a pavement surface to be subjected to exposure to terahertz electromagnetic radiation, it can be desirable to heat the pavement surface prior to and/or after application of the asphalt emulsion, but before any subsequent application of terahertz electromagnetic radiation (e.g., to induce cross-linking). In the heating stage, electromagnetic radiation of a preselected peak wavelength is applied to the pavement surface prior to and after application of the asphalt emulsion in order to heat the asphalt. The heating radiation can be generated using conventional techniques as described herein, or by modifying an emitter as in various embodiments to emit a desired wavelength. The wavelength of the electromagnetic radiation used for heating is selected based upon the aggregate and/or asphalt present. Preferred peak wavelengths for common materials are provided below. For example, granite rock is advantageously heated by applying electromagnetic radiation with a peak wavelength of from 3000-5000 nm. Sand, depending upon the composition, is advantageously heated by applying electromagnetic radiation with a peak wavelength of 3000 nm or from 5000-8000 nm. Limestone is advantageously heated by applying electromagnetic radiation with a peak wavelength of from 3000-4000 nm. Maltene asphalt is advantageously heated by applying electromagnetic radiation with a peak wavelength of from 1000-8000 nm. Asphaltene asphalt is advantageously heated by applying electromagnetic radiation with a peak wavelength of from 1000-3000 nm.

TABLE 2

| Peak Wavelength (nm) | Granite Rock | Sand | Limestone | Maltene Asphalt | Asphaltene Asphalt |
|---|---|---|---|---|---|
| 1000 | | | | X | X |
| 2000 | | | | X | X |
| 3000 | X | X | X | X | X |
| 4000 | X | | X | X | |
| 5000 | X | X | | X | |
| 6000 | | X | | X | |
| 7000 | | X | | X | |
| 8000 | | X | | X | |
| 9000 | | | | X | |
| 10000 | | | | X | |

In operation, the preselected wavelength is achieved primarily by the regulation of the surface temperature of the emitter element (the wavelength produced by the heat source is dependent upon the source temperature). This is achieved by adjusting the source(s) by which the surface temperature is achieved, and thus the peak wavelength, to match the spectral absorption rate of the material to be heated. This principle applies regardless of the construction of the heat source. By way of example, an Incoloy tubular heater, the resistance wire of a quartz heater, an FP Flat Panel heater or a Black Body Ceramic Infrared heater operating at 850° F. would all have the same peak energy wavelength of 4,000 nm (4 microns).

Two common methods of temperature control in infrared processes include varying the voltage input to the element and adjusting the amount of on-time versus off-time of the elements. A closed loop control system includes infrared sensors or thermocouples attached or integral to the energy source. These sensors or thermocouples monitor the temperature of the process and signal a control which, in turn, signals an output device to deliver current to (or turn of current from) the heat source.

With an established, preselected absorption rate strategy, the watt density, process time cycle and distance to pavement surface can be determined.

Figures 3A, 3B:
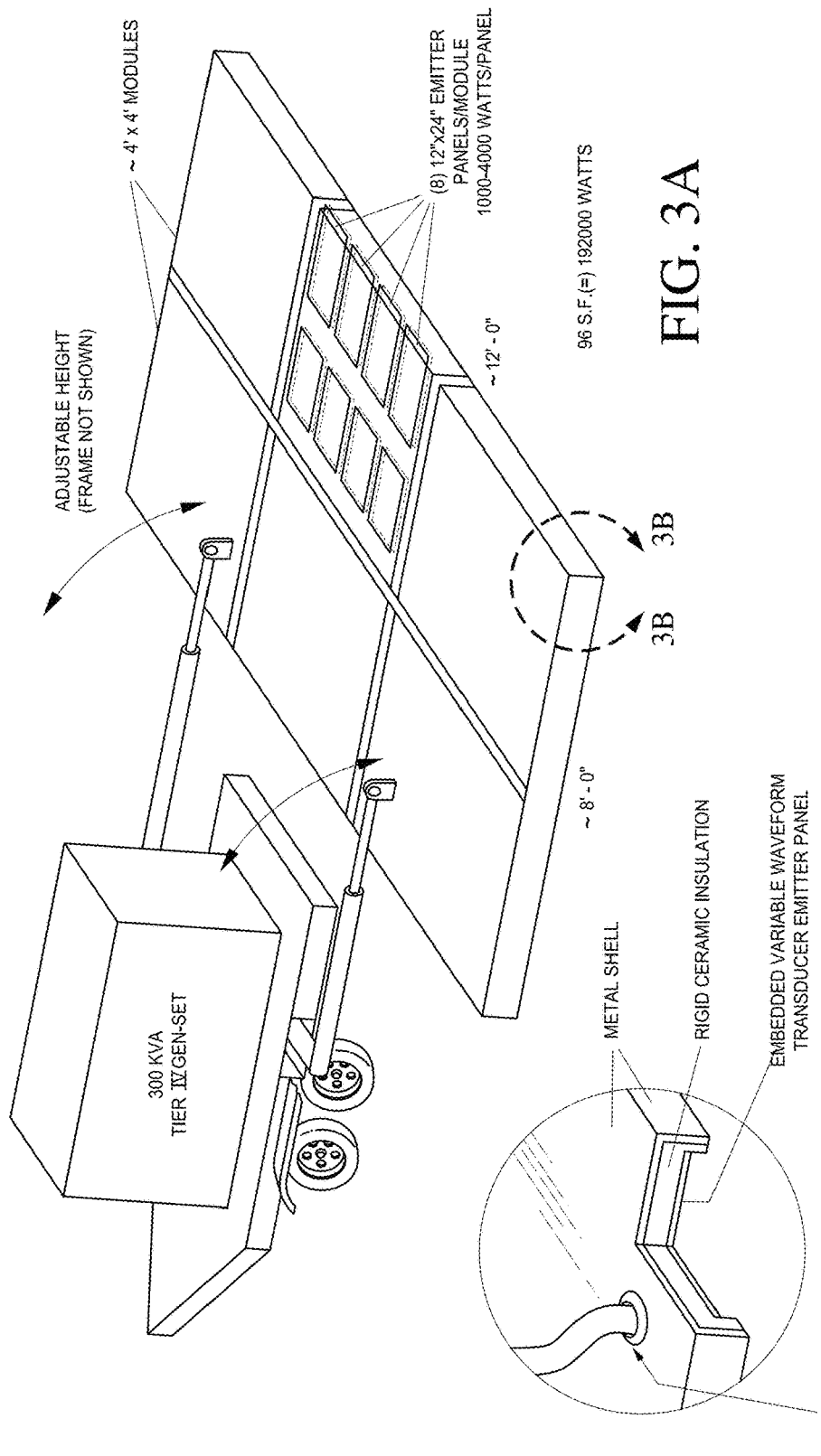
FIG. 3A and FIG. 3B provide a schematic view of a portable emitter device.

The heating electromagnetic radiation can be generated using emitter systems as described herein. In a preferred embodiment, an emitter system as depicted in FIG. 3A and FIG. 3B is modified to emit a suitable wavelength for heating. In this system, a series of easily removable emitter cartridges are mounted within a towable stainless steel frame. Surface temperature modulation can be achieved by one or more of: an AC power, waveform controller; cartridge design; voltage regulation; and an on-off power schedule. For example, IR heating cartridges can be swapped for terahertz emitting cartridges as desired.

As employed herein, "optimal pre-thermalization" (OPT) is defined as applying electromagnetic radiation of a preselected peak wavelength to a particular pavement cross-section, wherein the greatest temperature rise per unit of pavement mass is obtained for the lowest expended unit of energy during any time sequence when both parameters are being correlated. Pavement pounds/degree Fahrenheit rise/kilowatt hours expended (Pp/delta F/kwh) is the unit of measure of OPT.

Each cross-section of pavement has its own unique material and topographic characteristics. Tailoring the system to take advantage of these differences can be achieved by adjusting the bandwidth and the power density of the electromagnetic radiation so as to maximize radiation absorption for a given set of conditions.

As a first step, this is done by reference to tables which have been empirically developed by field experiments to classify absorbed wavelength quanta as it relates to: 1) stone petrography, 2) asphaltene/maltene content of the binder and 3) categories of average crack width×depth topography. This tool is referred to as an OPT Chart. See, e.g., TABLE 2. Most asphalt concrete pavement comprises about 95% stone and 5% binder by mass. Cracks in pavement can include those referred to in the industry as 'micro fissures', which are as narrow as approximately 0.004", to larger cracks up to approximately 3" in width. Below the dimensional range for micro fissures, the cracks are not easy to visibly detect without magnification. Above the dimensional range for larger cracks over 3", such cracks are typically beaten into potholes by wheel traffic. The systems of various embodiments are preferably employed for repairing pavement with cracks of about 3" in width, or less, e.g., 0.004" to 3", or 0.004" to 2", or 0.004" to 1", or 0.004" to 0.5", or 0.004" to 0.05", or to any range between.

The emitter emits electromagnetic waves with a combination of horizontal, vertical and circular polarization. As a 'rule of thumb', the width of a waveguide is of the same order of magnitude as the wavelength of the guided wave. The cracks are potential waveguide structures. Since the cracks may act as dielectric waveguides, choosing a wavelength that is near the average maximum absorption quanta of the stone and binder, but which may also effectively carry the selected wavelength's zigzag progression deep into a large portion of the cracks without energy loss, is an effective strategy to achieve OPT.

Prior to beginning the repair of a specific section of pavement, a small-scale, easily configurable emitter can be deployed at the job site. This test assembly is pre-configured to emit a specific IR wavelength at a given watt density pursuant to the OPT Chart. Select locations within the field of repair, which are representative of the average field conditions, are then heated to determine the actual Pp/delta F/kwh. Once the effectiveness of the pre-selected IR bandwidth and watt density have been measured through the use of the small scale emitter, additional adjustments may be made to the emitter frequency by cartridge construction, voltage, power density and/or on-off power schedule to tune the system, as necessary, to achieve OPT during project scale-up.

In operation, after the aged and alligatored pavement has been cleaned of debris, the surface of the pavement is heated to attain a temperature of about 240° F., e.g., from about 150-350° F., or from about 175-325° F., or from about 200-300° F., or from about 225-275° F., or from about 230-250° F., or any range between. The heating is advantageously accomplished using an emitter array as described herein (e.g., as depicted in 3); however, any alternative heating system can also be employed, as discussed herein. The peak wavelength is selected based on the pavement to be heated, e.g., by use of an OPT table or by exploratory testing conducted on representative portions of the surface using a small scale emitter. After the cleaned aged and alligatored pavement has been heated, the asphalt emulsion is applied as described herein. Electromagnetic radiation is then applied to the emulsion to attain a temperature sufficient to achieve curing, as described herein, e.g., of about 250° F. or a temperature of from about 150-350° F., or from about 175-325° F., or from about 200-300° F., or from about 225-275° F., or from about 230-250° F., or any range between.

After the steps of pavement preparation and application of the asphalt emulsion, the pavement can be considered a "wet" system that, if left to slow cure, would eventually provide some degree of quality as to the driving surface. However, the heating steps subsequently employed in systems of certain embodiments result in a dramatically superior driving surface.

The heating element applies electromagnetic radiation that penetrates deep into the pavement and/or emulsion. When applied to the emulsion, it softens and crosslinks the upper portions of new material, yielding a material that after compression into a dense structure will exhibit properties well exceeding those of conventional asphalt pavement in terms of toughness, resilience, flexibility, and/or resistance to cracks. In the lower, old pavement portions beneath the new portions the heating and rolling process compresses and pushes together the warmed old asphalt and the preparation of the nearly volatile-free emulsion or the binder emulsion, eliminating voids, to create a tougher and more durable transition region between the old pavement substrate and the new overlay. The transition region is a continuum, and at depths of from 2½ to 3 inches or more, past which the preparation of binder emulsion and/or the electromagnetic energy do not penetrate. The material is essentially old asphalt paving that has been remelted and pushed together. Because it does not contain elastomer, the properties will be similar to those of conventional asphalt; however, cracks and fissures will have been eliminated by the process and thus will not telegraph to the surface.

Accordingly, after application of the reactive emulsion (and optionally the thin layer of elastomer coated aggregate) over the aggregate filled pavement surface, a heat shuttle including a heating element is passed over the pavement surface. The heat shuttle can be of any suitable dimension, e.g., as large as or larger than 32 feet wide by 32 feet long, or smaller, e.g., 8 feet wide by 8 feet long, or 4 feet wide by 4 feet long. In a particular preferred embodiment, the shuttle is sufficiently wide so as to cover an entire width of a standard road or highway traffic lane including associated shoulder, or a full width of a typical two lane road. The heat shuttle is pulled across the top of the prepared surface. As the heat shuttle passes over the surface, a heating element delivers electromagnetic radiation of the preselected peak wavelength, e.g., energy in the near microwave (e.g., terahertz) to the mid-infrared range, that penetrates through the layer of elastomer coated aggregate, and down into the aggregate-filled new portions as well as the undisturbed old portions of the pavement being repaired. The microwave-infrared energy penetrates down to a depth of 3 or more inches, heating the entire penetrated mass of repaired pavement to a temperature of at least about 240° F., but preferably not more than 275-300° F., yielding a softened heated mass comprising the topmost 1, 2, or even 3 inches of the pavement surface. An advantage of the systems of certain embodiments is that the old pavement is not disrupted as part of the repair process, such that there is minimal oxidation of the old pavement upon application of heat, such that minimal smoke is generated by the process.

Heat shuttles can be employed to heat pavement. Heat shuttles can incorporate various different types of heating elements. One conventional type of emitter comprises a stainless steel tube wherein natural gas or liquid propane gas are mixed with air and ignited, generating heat (infrared energy) that is released through the stainless steel tube. Although other types of alloys can also be employed for the tube, stainless steel is generally preferred for its slow deterioration and for the bandwidth of energy that radiates from the outside of that tube typically in the medium to far infrared which exhibits good penetration into asphalt pavement systems. Other types of emitters include those incorporating a rigid ceramic element where the combustion takes place in micropores in the ceramic element. Bandwidth for such emitters is also in the medium to far infrared. Another type of emitter incorporates a flexible cloth-like ceramic medium having several layers, or layers of stainless steel cloth together with ceramic cloth. The cloth traps the combustion gases so that no flame is present on the surface of the element while generating infrared emissions. Any suitable device capable of generating infrared radiation that penetrates to a depth of 2, 3, 4 or more inches into the pavement surface can be employed to heat pavement.

A particularly preferred heat shuttle incorporates a ceramic structure in a form of thin sheets of cloth-like material that can operate at much higher temperatures (e.g., 2000° C.) than conventional ceramics (e.g., 1500° C.). In this structure, a higher combustion temperature can be obtained by catalyzing combustion of an air/liquefied petroleum gas (LPG) mixture or air/nitric gas mixture. The infrared energy generated is typically of shorter wavelength than the previously described systems, and can more quickly and efficiently heat the pavement than these conventional systems. The system also avoids creation of an open flame, with the resulting generation of smoke and other carbon emissions from the heated pavement. Any combustible mixture that adjusts the combustion reaction, if necessary, to generate electromagnetic radiation of the desired peak wavelength, can be employed to generate penetrating energy suitable for heating the asphalt/aggregate mixture to be treated.

In certain embodiments, it can be desired to apply longer wavelength radiation of the pavement. Combustible mixtures that slow down the combustion reaction such that longer wavelengths are produced, e.g., liquefied petroleum gas (LPG), can be employed to generate such penetrating energy.

Conventional combustion systems typically generate energy with a wavelength of from 1-5 nm. Instead, it is generally preferred that energy of longer wavelengths, e.g., of from 2-5 mm (terahertz range) be generated, e.g., to initiate crosslinking. Heating (as opposed to crosslinking) the asphalt/aggregate mixture to be treated can advantageously be accomplished, e.g., using energy with a shorter wavelength of from 1000-10000 nm.

In certain embodiments, simplified electronics and software can be employed in connection with a device that employs a simple emitter, so as to avoid high capital expenditures. The emitter is designed to produce radiation at a wavelength or range of wavelengths that will penetrate the pavement while at the same time minimizing excess heating in an upper region of the pavement, such that substantially uniform heating throughout the asphalt medium down to a depth of at least 1, 2 or 3 inches is obtained. In some embodiments, substantially uniform heating includes a temperature differential throughout a preselected depth, e.g., 2 inches, of no more than 50° F. In other words, the temperature of any portion of the upper region is no more than 50° F. higher than any portion of the lowest region. However, in certain embodiments, larger temperature differentials may be acceptable, e.g., up to 100° F. or more, provided that damage to the cured surface is avoided.

Figure 2:
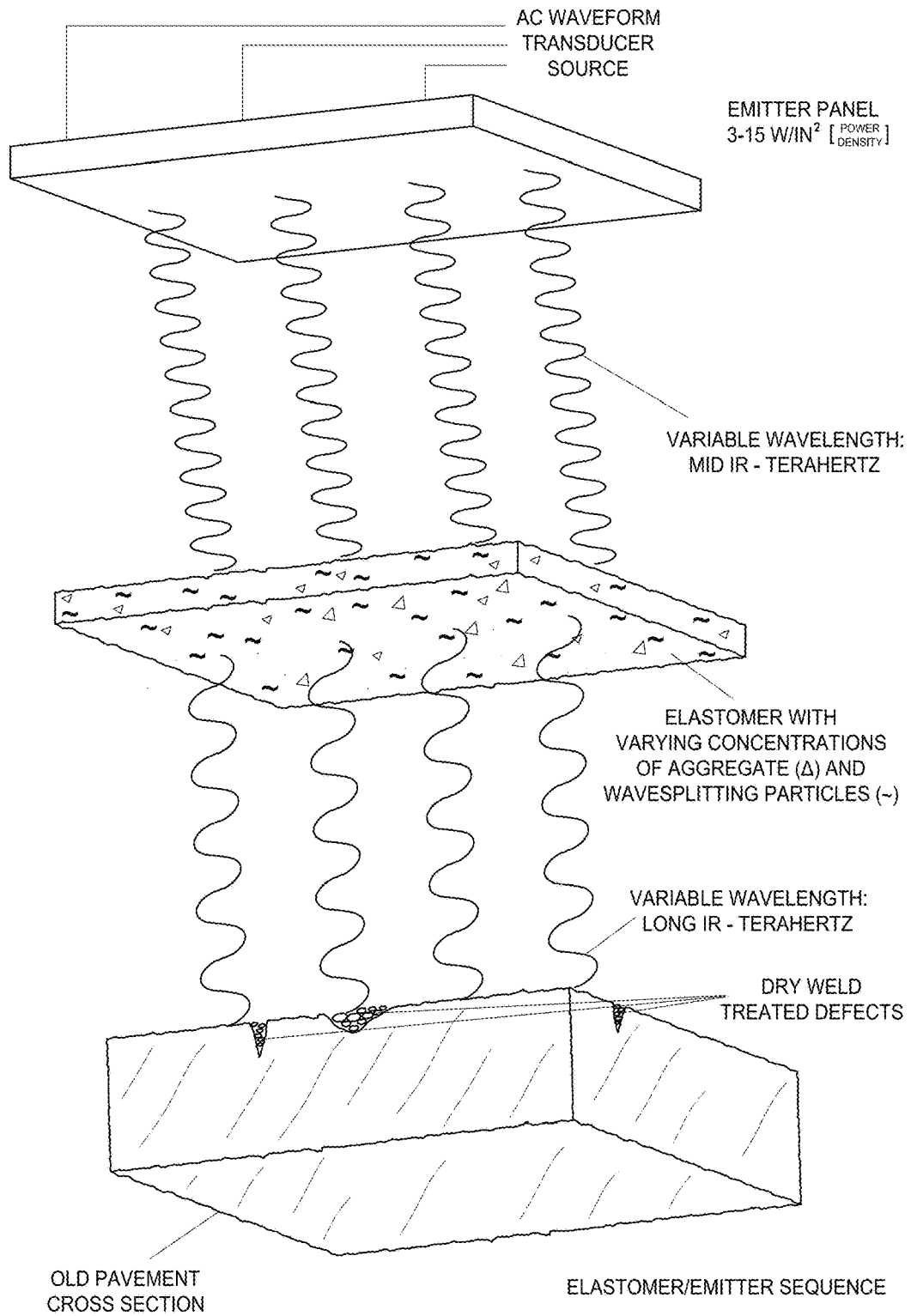
FIG. 2 provides a schematic view of emitter of one embodiment employed in a system to cure a polymer modified asphalt emulsion and stone composite slurry over a damaged pavement.

To attain the desired temperature profile, radiation in the infrared region is applied. The radiated energy applied to the surface is selected so as to control a depth of penetration and a rate of penetration to avoid heating or activating the asphalt too quickly, which may damage the pavement. The devices of various embodiments can be manufactured to minimize cost and are suitable for use in the field. Field use can be achieved by powering the device using a portable generator, e.g., a Tier 4 diesel engine, which qualifies under current emission standards. In one embodiment, the generator is electrically connected to a series of emitter panels situated within a metal frame. The device can be insulated with a high-density ceramic, and the panels can be nested within the ceramic liner of a frame points to point downward towards the pavement. One example of an emitter panel is provided in FIG. 2.

An array of panels can be assembled together, as in an array of 2×1 panels, or any other desired configuration, e.g., 2×2, 2×3, 2×4, 2×5, 2×6, 2×7, 2×8, 2×9, 2×10, 2×11, 2×12, 2×13, 2×14, 2×15, 2×16, 2×17, 2×18, 2×19, 2×20, 2×(more than 20), 3×3, 3×4, 3×5, 3×6, 3×7, 3×8, 3×9, 3×10, 3×11, 3×12, 3×13, 3×14, 3×15, 3×16, 3×17, 3×18, 3×19, 3×20, 3×(more than 20), 4×4, 4×5, 4×6, 4×7, 4×8, 4×9, 4×10, 4×11, 4×12, 4×13, 4×14, 4×15, 4×16, 4×17, 4×18, 4×19, 4×20, 4×(more than 20), 5×5, 5×6, 5×7, 5×8, 5×9, 5×10, 5×11, 5×12, 5×13, 5×14, 5×15, 5×16, 5×17, 5×18, 5×19, 5×20, 5×(more than 20), 6×6, 6×7, 6×8, 6×9, 6×10, 6×11, 6×12, 6×13, 6×14, 6×15, 6×16, 6×17, 6×18, 6×19, 6×20, 6×(more than 20), 7×7, 7×8, 7×9, 7×10, 7×11, 7×12, 7×13, 7×14, 7×15, 7×16, 7×17, 7×18, 7×19, 7×20, 7×(more than 20), 8×8, 8×9, 8×10, 8×11, 8×12, 8×13, 8×14, 8×15, 8×16, 8×17, 8×18, 8×19, 8×20, 8×(more than 20), 9×9, 9×10, 9×11, 9×12, 9×13, 9×14, 9×15, 9×16, 9×17, 9×18, 9×19, 9×20, 9×(more than 20), 10×10, 10×11, 10×12, 10×13, 10×14, 10×15, 10×16, 10×17, 10×18, 10×19, 10×20, 10× (more than 20), 11×11, 11×12, 11×13, 11×14, 11×15, 11×16, 11×17, 11×18, 11×19, 11×20, 11×(more than 20), 12×12, 12×13, 12×14, 12×15, 12×16, 12×17, 12×18, 12×19, 12×20, 12×(more than 20), 13×13, 13×14, 13×15, 13×16, 13×17, 13×18, 13×19, 13×20, 13×(more than 20), 14×14, 14×15, 14×16, 14×17, 14×18, 14×19, 14×20, 14×(more than 20), 15×15, 15×16, 15×17, 15×18, 15×19, 15×20, 15×(more than 20), 16×16, 16×17, 16×18, 16×19, 16×20, 16×(more than 20), 17×17, 17×18, 17×19, 17×20, 17×(more than 20), 18×18, 18×19, 18×20, 18×(more than 20), 19×19, 19×20, 19×(more than 20), 20×20, 20×(more than 20), or (more than 20)×(more than 20). The panels can be of any suitable size, e.g., 1×1 inches or smaller, 3×3 inches, 6×6 inches, 12×12 inches, 18×18 inches, or 24×24 inches or larger. The panels can be one or more of square, rectangular, triangular, hexagonal, or other shape. Preferably, each panel abuts an adjacent panel so as to minimize non-emitting space; however, in certain embodiments some degree of spacing between panels may be acceptable, such that, e.g., circular emitters can be employed, or, e.g., square emitters can be spaced apart. One example of a suitable array is a 2×12 array of one foot square panels.

While in certain embodiments an elongated (e.g., coiled, straight, tubular, or other structures in a waveguide pattern) semiconductor (e.g., silicon carbide, non-oriented carbon fiber, doped boron nitride) or resistance conductors (e.g., iron-nickel) can be employed in the emitter, in a particularly preferred embodiment the panels include a serpentine wire as an emitter. An advantage of the serpentine configuration is that it does not have the high resistance exhibited by spaced apart coils. Accordingly, more of the energy is emitted as radiation of the desired wavelength. The coils are spaced apart to minimize the resistance, and a radiant energy is emitted within a "sandwiched" space bounded on the upper side of by the high-density ceramic that has a very low permittivity and essentially redirects the reflected energy from the serpentine wire downward.

On the lower side of the wires, which can advantageously be embedded in a support or be self-supporting, is a thin micaceous panel. The mica group of sheet silicate (phyllosilicate) minerals includes several closely related materials having close to perfect basal cleavage. All are monoclinic, with a tendency towards pseudohexagonal crystals, and are similar in chemical composition. The nearly perfect cleavage, which is the most prominent characteristic of mica, is explained by the hexagonal sheet-like arrangement of its atoms. Mica or other materials exhibiting micaceous properties can include a large number of layers that create birefringence or trirefringence (biaxial birefringence). Birefringence is the optical property of a material having a refractive index that depends on the polarization and propagation direction of light. These optically anisotropic materials are said to be birefringent. The birefringence is often quantified by the maximum difference in refractive index within the material. Birefringence is also often used as a synonym for double refraction, the decomposition of a ray of light into two rays when it passes through a birefringent material. Crystals with anisotropic crystal structures are often birefringent, as well as plastics under mechanical stress. Biaxial birefringence describes an anisotropic material that has more than one axis of anisotropy. For such a material, the refractive index tensor n, will in general have three distinct eigenvalues that can be labeled $n_\alpha$, $n_\beta$ and $n_\gamma$. Both radiant and conductive energy from the serpentine wire is transmitted to the micaceous element. The birefringent characteristics of the micaceous material can be employed to transmit a subset of wavelengths generated by the serpentine wire while filtering out other wavelengths. The emitter of certain embodiment employs a sheath of stainless steel that protects the micaceous material from being damaged. This conductive sheath transfers energy with no significant wavelength translation. By employing this combination of components (e.g., serpentine wire, micaceous material, stainless steel sheath), energy generated by the serpentine wire with a peak wavelength of about 2 micrometers can have the peak wavelength be taken to about 20 micrometers. A wavelength of 10 micrometers or less to 100 micrometers or more, e.g., about 20 micrometers, can advantageously be used in connection with asphalt applications to improve the characteristics of the asphalt. The thickness or other characteristics of the micaceous material can be adjusted to provide a targeted wavelength or range of wavelengths to the surface.

In a particularly preferred embodiment, the device has a 2-foot wide by 12-foot long intercavity dimension, configured similar to a hood, in which a ceramic insulation is mounted. The emitter elements are advantageously 1 foot by 1 foot. E.g., a 2-foot wide device can be configured to be 2 elements wide by 12 elements long, for a total of 24 elements. Such elements can have a Watt density of roughly 14 Watts per square inch, at full energy, capable of being powered by, e.g., a generator that can deliver 250 kW. An example of a portable device suitable for use in repairing asphalt pavement is depicted in FIG. 3A and FIG. 3B.

In some embodiments, an emitter assembly may comprise a structural frame, a power source, a power interrupting mechanism, an electromagnetic radiation emitter, and a positioning system. The emitter assembly may be several feet wide, several feet long, and several feet high. In some embodiments, the emitter assembly is approximately 12 feet wide, 8 feet long, and approximately 2 feet high. The emitter assembly may be other sizes as well and the scope of the invention is not limited by the size of the emitter assembly. The frame may support one or more of the other components.

The frame may comprise structurally adequate members such as metal supports, beams, rails, or other such structures. The frame may be configured to prevent significant deformation when in use or in transport. The frame may be designed to support at least part of the weight of the various components. In some embodiments, the frame comprises one or more beams. The beams may comprise a metal, wood, or other material that can adequately support the weight of the components. The beams may comprise aluminum or steel, and in some embodiments it may be advantageous to use a material that is both lightweight and strong. One or more beams may be disposed on either side of the frame and on either end of the frame. The beams on the side may be connected vertically through brackets, plates, or other attachment mechanisms. The pieces may be welded together, or bolts may be utilized to connect the pieces. One or more beams may traverse the frame from one side to the other side, or from front to back, and may be configured to provide support or an attachment mechanism to other components. One or more beams that traverse the frame may be disposed near the bottom of the frame, such that one or more of the electromagnetic radiation emitters may be attachable to the beams. The frame may attach to one or more wheels, directly or indirectly, which may assist the frame in being transported.

In some embodiments the frame may be configured to prevent bending, sagging, or twisting even while traversing uneven terrain. The frame may provide a robust structure that supports one or more components of the assembly. Because the assembly may be used in a variety of environments, it may be advantageous for the frame and assembly to be resistant to deformation and deterioration when in transport and in use. For instance, the assembly may be used on roadways that are uneven. It may be advantageous for the frame to withstand transport over an uneven surface. As another example, the frame and assembly may be used in the outdoors in remote locations. It may be advantageous for the frame and assembly to not only be resistant to damage during the transport to the remote location, but also for the frame and assembly to be resistant to the effects of weather while at that location. Even during adverse conditions and extensive travel and transport, it may be advantageous for the bottom surface of the frame to remain a generally consistent distance from a road or other surface over which the assembly may be placed. Therefore, the frame may be sufficiently robust and resistant to deformation or damage in a variety of conditions.

In order to transport the assembly, the frame may comprise an attachment mechanism that may allow the assembly to be pulled. In some embodiments, the frame comprises rings or hitches that are connectable to a vehicle. The vehicle may be configured to pull the assembly over short distances over the roadway, or longer distances to transport the assembly to the work site.

A power source may be connected or connectable to at least part of the emitter assembly. The power source may comprise a generator and may comprise a diesel generator or other power source. The power source may be disposed on the emitter assembly or maybe connectable to the assembly. The power source may be part of a second assembly positionable adjacent the emitter assembly. The function of the power source may be to provide power or electricity to a power distribution device that may be located on the emitter assembly or on the frame. In some embodiments, a diesel powered electric generator may be disposed on a platform or movable trailer that may be connectable to the emitter assembly.

The power distribution device may be disposed on at least part of the emitter assembly and may sit on at least part of the frame. The power distribution device may comprise one or more circuit breakers or other power interrupting mechanisms. The power distribution device may be configured such that it receives power from the power source and distributes it to one or more electromagnetic radiation emitter panels. In some embodiments, the power distribution device comprises a metal box and circuit breakers, which may be similar to those found in commercial or residential building units. The power distribution device may be temporarily or permanently connected to the frame, and in some embodiments, may be bolted to a surface of the frame.

The frame may support one or more electromagnetic radiation emitters. The emitters may be approximately 12 inches by 24 inches, and more than one emitter may be disposed on an emitter module. One or more modules may be disposed on the emitter assembly. In some embodiments, the assembly comprises six modules, with each module measuring approximately 4 feet by 4 feet. In some embodiments, each module comprises multiple emitter panels. The emitters may be generally flat, and may be disposed adjacent one or more other emitters. Each emitter panel may or may not abut a second emitter panel. Each emitter panel may be directly or indirectly electrically connected to the power interrupting mechanism, and may be electrically connected in parallel or in series with other emitter panels.

The emitter modules may comprise a top plate, and the top plate may be disposed on the top and side surfaces. The modules may further comprise a ceramic layer generally disposed underneath the top plate. An emitter panel may be generally disposed beneath the ceramic layer. An electrical connection from the emitter panel to the power interrupting mechanism may travel through the ceramic layer and through the metal shell. The module may be configured to emit electromagnetic radiation in a generally downward direction, and may be configured to prevent substantial electromagnetic radiation from being emitted in an upward direction. The module may also limit the amount of electromagnetic radiation emitted to the side. It may be advantageous to at least partially limit the emissions of electromagnetic radiation in some directions in order to prevent injury to persons located nearby. Further, it may be advantageous to generally direct the electromagnetic radiation in a downward direction, so that the radiation is received by the surface below the emitter assembly. During use the emitter assembly may be positioned over a road or other surface, and the electromagnetic radiation being emitted from the emitter panels may be directed at the road or other surface.

In some embodiments, the panels and/or modules may be independently separable from the emitter assembly. It may be advantageous to be able to disconnect one or more emitter panels or modules from the rest of the assembly in order to replace or repair the panels or modules. There may be other advantages as well to being able to separate portions of the assembly. The panels or modules may attach to one or more beams of the frame using bolts or other various attachment mechanisms. In some embodiments, the panels are bolted to a beam that traverses the frame from front to back. The beams define openings, through which one may access a bolt or other attachment device. Other methods of attaching the panels to the frame or assembly may be possible and the scope of the invention is not limited by the method of attaching the panels.

The emitter assembly may comprise a positioning system which may comprise parts of the frame and wheels. The positioning system may also comprise attachments from which the emitter assembly may be connected to a supporting structure, such that the emitter assembly may at least partially suspend from the structure. In some embodiments, the emitter assembly comprises four wheels, with each wheel generally disposed at the corners of the frame. More wheels, such as six or eight or other number, may be advantageous depending on the size of the emitter assembly. Each wheel may be connected to a wheel support and each wheel support may be configured to allow the height of the wheel, relative to the frame, to be independently adjusted. Independently adjusting the height of the wheel may allow the emitter assembly to be more accurately positioned above a road or other surface. By being able to more accurately position the emitter assembly above the surface, the distance between the emitter assembly and the road or surface may be more uniform, and in some embodiments the emitter assembly may be more effective and consistent in transmitting the electromagnetic radiation from the emitter panels to the road or surface.

The positioning system, including wheels, may allow the assembly to be positioned in various locations, and may be configured to allow the emitter assembly to be transported between different locations. In some embodiments, the positioning system may allow the emitter assembly to be translated above the surface, before, during, or after use, either continuously or discreetly, depending on user preference. For instance, the assembly may be moved continuously along the surface while electromagnetic radiation is being emitted from the emitting panels. Or, the assembly may emit electromagnetic radiation at a first location, then the assembly is moved to a second location, and then additional electromagnetic radiation is emitted. The positioning system may allow the emitter assembly to be translated in a forward and back direction, in a side to side direction, or be rotated about an axis. The frame or other part of the emitter assembly, including the positioning system, may be configured to allow at least part of the frame to be connected to a vehicle such that the emitter assembly can be transported between locations. In some embodiments, the assembly may be configured to be loaded onto a transporting device, such as a trailer, that may be configured to transport the assembly from a first location to a second location.

A net frame is preferably attached to wheels on the outside of the device, to permit adjustment of the emitter within the cavity itself, or to permit adjustment of the height of the emitter over the pavement. In a preferred embodiment, the emitter is provided in a cavity approximately 6 inches deep, and a height of the emitter surface over the pavement surface can be varied from as low as a quarter of an inch or as high as an inch or more. The emitter is preferably placed as close to the surface of the pavement as is practical (e.g., <1 inch, or <0.5 inches, or <0.25 inches) so as to minimize loss of energy via reflectance and/or refraction by the pavement surface. However, if the spacing is too close, imperfections in the pavement surface, or smoke or dislodged gummy residue, may cause damage to the emitter.

In various embodiments for pavement repair applications, an emitter design can be employed wherein multiple units (e.g., 1, 2, 3, 4, 5, 6, 7, 8, 9, or 10 or more) are grouped together. For example, four units, each including a 3×3 emitter array, will provide 36 square feet of emitter. Four units, each including a 4×6 emitter array, will provide 96 square feet of emitter. It is generally preferred to employ a square footage of emitter that can be supported by a desired generator. 250 kW generators are generally preferred, as providing a good balance of power and cost, but in certain embodiments larger generators can be employed, e.g., a 300 kW generator. Instead of a larger generator, two or more smaller generators can be employed to provide adequate power for a preferred array size. In a preferred embodiment, a 250 kw generator can be employed to power a 100 square foot emitter array that puts out 14 watts per square inch. Two such generators can be provided on the same tug to power 250 square feet of emitter. In most paving applications, the width of the road to be repaired is approximately 12 feet, so emitter arrays or groups of emitter arrays having a width of 12 feet and a sufficient length to provide an appropriate amount of energy to the surface are desirable.

In operation, circuits and sensors can be employed to identify obstacles underneath the emitter unit, e.g., by sensing reflected energy or heat buildup, and can adjust the power to the emitter or the distance of the emitter from the pavement surface. Other sensors can detect the presence of combusted organics, e.g., a laser that can detect a certain amount of smoke passing through its beam. If high temperature is detected, the emitter can be distanced from the pavement, power can be reduced, or the speed at which the emitter passes over the surface can be decreased. Similarly, if the temperature detected is too low, the power of the emitter can be increased, it can be distanced from the surface, or the speed at which the emitter passes over the surface can be increased.

In certain embodiment, the heat shuttle passes over the pavement, flashing off non-VOC components and bringing moisture in the pavement to the surface, warming the mass of pavement. The pavement is then allowed to cool down to a preferred temperature for compression, at which time a vibrating roller is passed over the surface. An advantage of the system is that virtually no smoke is produced while operating the system. The resulting pavement has a density similar to new pavement, but incorporates durable elastomers imparting superior performance properties.

Another advantage of the system is that the elastomer composition can be formulated to include a resealing adhesive that does not lose its internal cohesion (stickiness) over time. A road repaired using the system that begins to show signs of wear (microfissures or cracks) can be readily repaired simply by passing the heat shuttle across the surface (for, e.g., 30 seconds to 2 or 3 minutes), then passing a compaction roller over surface, which repairs and reseals the cracks. Should a crack appear in the pavement that is beginning to show signs of wear, one simply passes the heat shuttle across the surface. A quick pass of the device of 30 seconds, followed by a roller pass, can result in a robust crack repair. Preferably, such a heating/rolling treatment is employed approximately every three to five years so as to maintain the pavement in good condition for 20 years or more.

Upon exposure to a temperature of approximately 250° F., the elastomer of the reactive emulsion crosslinks, generating a bond (between new aggregate, between new aggregate and old pavement, or between portions of old pavement) of sufficient strength such that a conventional road vibratory roller can be applied over the top of the pavement surface to provide a new driving surface. During rolling, the vibratory compaction redensifies all the defects in the old road bed.

In some embodiments, additional elastomer can be applied prior to vibratory compaction. The elastomer is preferably applied as a spray that penetrates into the old road surface, filling cracks and crevices such that when vibratory rolling takes place it further bonds the old pavement together as well as regions between the new material and the old material.

Rubber, e.g., ground tire filler, is a material commonly employed in asphalt pavements. It is a high energy-absorbing material. If it absorbs too much energy too quickly, it will become a source of combustion and can damage the emitter unit or emit fumes into the atmosphere. Accordingly, in some embodiments it is desirable to include a feedback loop on each emitter panel (e.g., a 1 foot square panel) in an array, so as to continuously monitor the power density at the emitter's particular setting and its effect on the pavement. Each emitter panel can be independently operated so as to provide an appropriate amount of energy to the surface beneath. Because rubberized coating is commonly employed as crack sealer on old roads, it can be desirable to have such control over each emitter panel.

To provide satisfactory pavement repair, the presence of irregularities and defects on the surface, such as cracks, fissures, low areas, and the like, must be addressed. It is typically preferred to sweep off any thick cross-sections of dirt, to remove vegetation and to remove any reflectors that are on the road. The presence of road paint, e.g., paint used for lane markers, generally does not present any issues as to operation of the emitter, provided it is thin and does not contain substances that may prevent uniform heating. The paint employed in crosswalks may contain substances that prevent uniform heating. In such situations, the crosswalk markings can be removed, the emitter can be operated so as not to move over the markings, or the emitter is shut off when it goes over crosswalk markings (e.g., manually shut off, or automatically shut off when markings are detected). Crosswalks that comprise a thick thermal plastic strip placed on the pavement can inhibit management of the delivery of energy into the deep pavement, and are desirably removed and reinstalled prior to pavement renovation, or such areas are avoided during renovation.

Irregularities and defects on the surface of the pavement can vary. The systems of various embodiments are particularly suited to the repair of alligatored pavement. However, in some instances, it may be suitable for repairing other damage. For example, the aged asphalt the surface can have a boney, or rough look and texture, where large rocks have essentially become islands rising above the lower sections of the pavement due to fine rock being dislodged. In some instances, fissures or potholes that are in each up to two inches or more deep may be present. Severe irregularities and defects can be advantageously repaired using a combination of stone and a formulated elastomer that glues the stone together once it's cured. The elastomer is applied to the surface and then cured using the emitter device. In certain embodiments, the coating can be as thin as one gallon or less per hundred square feet of stone and elastomer spread over the surface, e.g., a coating as thin as a few thousandths of an inch. In certain embodiments, a mixture of elastomer and aggregate can be blended to form a cold slurry that is spread over the surface to replace volume on a damaged or deteriorated road and then cured using the emitter device. In such embodiments, an initial application of heat prior to the emitter can be applied, e.g., open flame or other heating unit as described elsewhere herein, that causes an initial flashing of volatile materials from the cold slurry. This initiates some degree of curing, to prevent adhesion of the slurry to the tires of the tow rig pulling the emitter. Alternatively, the tires, the driving unit and the emitter device, are configured so as to straddle the strip of pavement that is being repaired.

In the case of large and very long runs on highways, use of the system can minimize closure time, even under conditions wherein material is placed and compacted, due to the rapid curing observed. In such embodiments, an uncured surface of various stone sizes and elastomer recipes can be spread across the surface and then the emitter device is pulled over it, simultaneously drying out and heating the adhesive on the surface while also, at a different wavelength, pushing energy deep into the pavement so that, based upon the prescription for the repair, simultaneous curing of the material on the top is achieved, along with and warming and stirring to a homogenized state the interstitial asphalt of the pavement from the surface down to a depth of 1, 2, or 3 inches or more.

Following behind the emitter unit, a compactor can be employed once the pavement cools. Typical temperatures after emitter treatment are about 250° F. Once heat dissipates such that the temperature is 180-190° F., a compacting roller can be applied. A single or 2-drum roller with vibrating capabilities can be run across the surface to compact the voids that are in the old pavement, basically reducing it to a density that is similar to that of virgin pavement, and further compacting the new material down into voids and irregular surfaces of the pavement where the binder emulsion, elastomer or other repair material had been placed. Multiple passes of a roller can be applied, e.g., two, three, four, or more passes. Three or four passes will provide the density and the uniform fusion between the particles that results in a long-lasting pavement cross-section.

An elastomer (also referred to herein as binder, emulsion, or the like) of certain embodiments typically comprises four components, and is a very robust emulsion that can contain asphalts of various softening points. The elastomer can also include butyl rubber, a styrene-butadiene-styrene (SBS) polymer, and a bioresin. The type of bioresins, the concentration of the SBS polymer, and the molecular weight of the butyl rubber employed, along with other components of the mixture, can be balanced to achieve a desired set of properties of the adhesive system in its cured form. The elastomer may, in certain embodiments, be employed as a mask to protect the underlying pavement as it goes through this heating cycle from oxidation at the surface, because the temperature is higher at the surface than it is deep down when the emitter system is applied to the pavement. In order to have a sufficient amount of energy penetrating to depth so as to fluidize the asphalt, and to minimize hot spots, the elastomer can act as a mask to avoid oxidation of the asphalt where hot spots are present.

Depending upon the nature of the materials present in the elastomer, a wavelength separating effect can occur in the elastomer as in the micaceous material, such that certain wavelengths are preferentially transmitted. The elastomer does not have to be a pure organic material; it can have materials like silicon dioxide or other materials that have a desired permittivity to a particular wavelength, or birefringent or trirefringent properties. In some embodiments, these components are present in a volume as high as 50% in the elastomer composition; however, in certain embodiments lower amounts can be desirably employed, e.g., from 1-10% by volume, or from 10-50% by volume.

The relative permittivity of a material under given conditions reflects the extent to which it concentrates electrostatic lines of flux. In technical terms, relative permittivity is the ratio of the amount of electrical energy stored in a material by an applied voltage relative to that stored in a vacuum. For example, the power source can be the emitter, the transmitting device can be the medium through which the emitter's energy is passing, and the load is what actually happens when the molecular structure of the various substances adsorbs the energy. The movement of energy from the emitter device through the pavement medium can be described in terms of the relative permittivity of the pavement. For methodologies for creating a wavelength of energy, typically resistance wires are used for heating, e.g., wires comprising iron, aluminum, titanium, platinum, etc., and a variety of other materials that create design resistance. The resistance of the flow of electric current creates radiant energy that falls in the bandwidth from a millimeter long down a few micrometers—the infrared (IR) microwave boundary. Materials are heated depending upon the absorbent qualities of polar materials, like water, that they contain. There are certain bandwidths in the IR region that are highly condensed or captured within the structure of, e.g., water, and quick energy absorption is observed (e.g., a quick rise in terms of temperature as a result of that absorbed energy). The IR microwave boundary can be considered that region between far infrared and what can be considered extremely short microwaves (e.g., 1 millimeter). In various embodiments, it is desirable for the emitter to provide a substantial amount of energy in this region, e.g., 1, 5, 10, 15, or 20 nm up to 1, 2 or more millimeters, preferably from about 1000 nm to about 10000 nm, depending upon the asphalt/aggregate to be heated, or from 2 microns to 1 millimeter. Many materials are substantially transparent to microwaves having a bandwidth that is down in the megahertz and kilohertz range, which are very long bandwidths compared to IR heating. These microwaves penetrate materials readily that do not have a high hydroelectric constant or a high relative permittivity. The microwave transmissivity of common materials such as are used in the paving industry or other industries are well known or readily ascertained by one of skill in the art. The refraction and reflection that takes place between the emitter surface and the surface of the emulsion when it is placed on the top of the pavement can likewise be ascertained, so as to achieve a desired temperature profile in the pavement.

In an asphalt pavement surface contacted with energy having a peak wavelength of from about 1000 nm to about 10000 nm, or up to 20 micrometers or more against the surface, the presence or absence of the emulsion on the surface can have a profound affect in terms of how much energy is refracted, reflected and, transmitted below the surface to the interstices of the asphalt at, e.g., three inches in depth. Refraction is the change in direction of a wave due to a change in its medium. It is essentially a surface phenomenon. Refraction is mainly in governance of the law of conservation of energy. Momentum due to the change of medium results in the phase of the wave being changed, but its frequency remains constant. As energy moves from the emitter to the surface of the pavement, the rate of movement remains the same, and the wavelength remains the same; however, the incident wave is partially refracted and partially reflected when it hits the surface. Snell's Law, also referred to as the Law of Refraction, is a formula that is used to describe the relationship between the angles of incidence and refraction. Refraction that takes place at interface, e.g., a boundary between air and a solid, can exhibit a phenomenon referred to as an evanescent wave, wherein the wavelengths on one side of the boundary are partially reflected and partially refracted. At the boundary, reflected energy or wavelengths can come back from the substance, creating a chaotic collision of electromagnetic energy that is generally one-third of the wavelength. For either a narrow energy source such as a laser or a broad infrared radiant energy source coming to the surface of a solid, one is able to measure this perturbance and predict with a degree of accuracy how much energy is returned and how much is transmitted, which impacts the amount of energy transmitted into the pavement. An advantage of the emulsion on the pavement surface is that it disrupts the organized formation of a wave bouncing back out of the pavement, such that more energy can be transmitted into the pavement. Knowing the wavelength that is presented to the pavement, the evanescence wave that is created, and the permittivity of the material enables one to predict and control the heating characteristics of the pavement. The relative permittivity is an absolute number for stone, for water, for the atmosphere of the voids in the pavement, for the asphalt that is in the interstices. When considered together, one can analyze what the effect of a particular wavelength on its rate of movement through the pavement, e.g., through the use of conventional probes for determining energy levels and bandwidth changes. This permits the emitter and the materials employed in the emulsion to be selected such that the peak wavelength can be manipulated to maximize energy absorption by the pavement or aggregate or asphalt emulsion/asphalt emulsion while minimizing consumption of energy in generating the electromagnetic radiation. For example, the wavelength can be manipulated to about a millimeter, which is in the terawatt range. In this range, the depth of penetration for the amount of energy that is used from the generator is profoundly improved, such that energy consumption is reduced.

For an emitter temperature that is at 750° F., and for an immediate surface temperature, e.g., ⅓ of the wavelength below the emulsion layer that is 55° F., within a few seconds, because it is time-dependent, a temperature at just below the surface, e.g., a millimeter below the surface, is 75° F. Moving down progressively in increments of ½ inch to one inch, the emitter temperature versus the surface temperature versus the temperature at various depths can be analyzed. This power depth loss of the energy as it enters the pavement from the irradiated surface can be compensated for by manipulating the surface energy, the Watt density, the wavelength, the effects of evanescence wave paths, and the wavelength of energy passing through the pavement so as to increase the uniformity of heating from the surface to a desired depth (e.g., 3 inches). As top temperature threshold, it is desirable to avoid the formation of organic gases, which indicates that the material has gone past the threshold of maintaining its original molecular structure. If gas formation is not apparent, as indicated by the absence of smoke, the power can be increased; however, that is not the only factor that should be considered. The other factor is a desire to minimize the amount of power that it takes to get the energy as deep as it needs to be (e.g., as can be determined by characterizing how deep the voids are that are part of the flaws in the pavement so that it can be determined how long the unit has to stay over a certain spot with a particular configuration to reach that depth). One must also achieve a temperature such that when a roller is applied to the heated pavement, it is fluidized and will compress to eliminate voids, whereby increased densification and homogenization of the repaired pavement is achieved.

In terms of relative permittivity, that of water, for instance, is 80 times higher than that of rock, which is 7. Asphalt's relative permittivity is similar to that of water—60-70 times higher than that of rock. Rock can be considered substantially microwave transparent. This means 95% of the pavement cross-section is essentially transparent to millimeter wavelengths. Referring back to Snell's Law, the more oblique the angle of the radiation coming to the surface from its boundary zone (critical angle incidence), the higher the refraction and the higher the reflection. The angle of incidence of the radiation can therefore be manipulated to adjust the amount of energy transmitted. The far IR—near microwave wavelength is going to interface a solid surface at a much more direct angle, such that for a microwave transparent material like stone, some IR energy that is quickly absorbed by the aggregate in the interstices can be desirable for heating (see, e.g., TABLE 2).

In various embodiments, it is desired to move energy from the emitter surface to 1, 2, or 3 inches deep in the pavement, in the shortest amount of time without destroying or otherwise significantly damaging the materials in the upper region. The emitter system can enable this to be achieved. In contrast, heating with gas-fired, open-flamed propane that generates primarily IR radiation, e.g., with an uncontrolled peak wavelength, results in excess surface heating—smoke coming off the pavement, indicating destruction of organic pavement constituents such as rubber or asphalt. The components' molecular weights can be negatively impacted, causing the damaged portions to lose water resistance, adhesiveness, and other desirable properties. The emitter system also results in reduced fuel costs, compared to conventional combustion systems, which are impractical to tune for peak wavelength by adjusting, e.g., air/fuel mixtures, and are extremely inefficient in terms of power consumption per unit of energy transmitted to the pavement.

The composite structure of the pavement is 95% aggregate that exhibits microwave transparency, whereas 75-78% of the remaining 5% is in the form of polar molecules that are affected dramatically by contact with far IR—near microwave radiation. In use, the emitter is turned on and drawn across the pavement. The entire continuum of the wavelengths and how energy is moving through the pavement is in a state of flux, meaning that some water molecules will be lost from the system. This changes the potential for an evanescence wave, as the polar structures that are in the emulsion are removed by evaporation, thus affecting the transmission of energy. In addition, energy is stored within the rock and the interstices of the asphalt, which also changes the way that the energy moves through the substrate. It is therefore desirable to have a system configured to monitor such conditions, and that can also utilize feedback on how different Watt densities, different emitters, and changes in the components that are employed in the emulsion can maximize the use of the energy while minimizing potential damage to the pavement during homogenization of the interstices down to 1, 2, or 3 inches in depth and while minimizing energy consumption.

By analyzing data from experiments with different paving materials and different emulsion compositions, emitters can be constructed that work well with conventional asphalt concrete pavements, and that consume less than 20% of the power of heaters in conventional use for heating pavement, or even less energy (e.g., 5%). Such conventional methods include burning liquid propane gas using a ceramic blanket, or the more sophisticated open flame or catalyzed gas systems.

In one embodiment, the emulsion includes a birefringent or trirefringent material, and is provided in the form of a pre-manufactured film. The film is rolled over the surface of the pavement, e.g., from a spool, and then the emitter system is run over the top, yielding a sealed surface. It is desirable to avoid driving too much energy into isolated spots in the pavement where the energy is absorbed quickly, e.g., due to the higher permittivity of asphalt, water or other organic material such as rubberized asphalt. This can negatively impact the molecular structure of the elastomer. The elastomer begins to melt and flow over the surface of the asphalt, such that blowing off of water or other volatiles is avoided. This results in a zero (defined by EPA as less than 1%) volatile organic carbon (VOC) repair process.

The emitter systems typically generate about 0.1% VOC, which is highly desirable from an environmental standpoint and superior to many conventional processes which generate smoke and release large amounts of VOC.

Rock or very fine aggregate can be coated with elastomer and the elastomer can be pre-cured. The rock, which serves as a carrier of the elastomer, can then be placed due to its dry, free-flowing nature. By pre-firing the elastomer on a stone, e.g., in a plant, one can minimize the amount of energy one has to use in the field. Such a mixture would offer advantages over cold-mix asphalt in terms of ease of handling in the field. The material is pre-dried, taken to a jobsite, spread out, and then heated using the emitter system to yield a quality asphalt concrete pavement surface.

Oligopolymerization

In some embodiments, the radiation emitted by the heat shuttle can optionally be modulated to emit at least some radiation in the far IR—near microwave region, in addition to the 1000-10000 nm peak wavelength radiation employed in heating the pavement or aggregate or asphalt emulsion. This focuses heat on the asphalt between aggregate instead of the aggregate itself, essentially preheating the asphalt. This efficiently warms and disturbs the polar molecules of asphalt in the voids and interstices in the pavement without dehydrogenation of the asphalt. The approximately 100 µm ductile asphalt coating on the rock surface becomes turbulent and is thus mixed with the more brittle and short chain molecules occupying a volume beyond 100 µm from the stone surface. The process can also be employed to polymerize oligomers (approximately 2-150 repeating units) and other broken polymer chains in the aged asphalt, causing them to link into longer chains whereby ductility is improved. This process can be referred to as oligopolymerization, and can be utilized in a process of homogenization by liquid asphalt oligopolymerization. Core tests indicate that pavement thus treated is as much as 95% equivalent (or even more in certain circumstances) to the virgin asphalt binder originally found in the pavement in terms of: compressive strength, flexural compressive strength, and shear strength, compared to mere heating without oligopolymerization. Infrared radiation transitions to the microwave frequency at a wavelength of about 1 millimeter. When the wavelength gets shorter than 1 millimeter, the radiation is considered far infrared. Terahertz radiation, also called submillimeter radiation, terahertz waves, or THz, is electromagnetic radiation with frequencies between the high-frequency edge of the millimeter wave band, 300 gigahertz ($3 \times 10^{11}$ Hz), and the low frequency edge of the far-infrared light band, 3000 GHz ($3 \times 10^{12}$ Hz). Corresponding wavelengths of radiation in this band range from 1 mm to 0.1 mm (or 100 µm). Because terahertz radiation begins at a wavelength of one millimeter and proceeds into shorter wavelengths, it is sometimes known as the submillimeter band, and its radiation as submillimeter waves, especially in astronomy. Terahertz radiation occupies a middle ground between microwaves and infrared light waves. For inducing oligopolymerization it is preferred to employ radiation wavelengths of from 10,000 nm, 15,000, 50,000, 100,000 nm, or 500,000 nm to 1,000 µm or more, e.g., from 15,000 nm to 1.1 mm, 1.2 mm, 1.3 mm, 1.4 mm, 1.5 mm, 1.6 mm, 1.7 mm, 1.8 mm, 1.9 mm, 2 mm, 2.5 mm, 3 mm, 3.5 mm, 4 mm, 4.5 mm, or 5 mm or more.

Comparison of Systems of the Embodiments to Conventional Hot in Place Recycle (HIR)

The systems of the embodiments are noninvasive methods of restoring the pavement to the highest possible physical properties—properties superior to those of conventionally repaired pavement, such that the asphalt exhibits characteristics similar to, or better than, virgin asphalt ("rejuvenated asphalt").

Hot In-Place Recycle (HIR) is the conventional method for repairing aged and alligatored asphalt pavement. HIR is described in detail in Chapter 9 of "Pavement Recycling Guidelines for State and Local Governments Participant's Reference Book", Publication No. FHWA-SA-98-042 published December 1997 by the U.S. Department of Transportation Federal Highway Administration, the entire contents of which is hereby incorporated by reference herein. Virtually all pavement heating employed in this re-construction/maintenance method utilizes an LPG or NO energy source. In LPG or NO energy source heating processes, the gas is mixed with air and ignited within an outer shroud. The mixing and ignition can be deployed as an open flame or controlled within a tube or ceramic blanket emitter. Whether open flame or within a controlled chamber, the surface temperature is generally above 1500° F. and emits an electromagnetic bandwidth which is less than 2000 nm (2.0 microns). Where the combustion is retarded by a catalyst, the emitter temperature(s) can drop to as low as 600° F. and exhibit a bandwidth as long as 100 microns. While the use of a catalyzed flame with a longer wavelength would be beneficial to more effectively warming aged asphalt, fumes from the process will quickly contaminate the chemistry of the catalyst; rendering it ineffective.

While gas fired technology (GFT) and the diesel-generator-driven electric heat from emitter expend nearly equivalent btu's in fuel consumption per unit of wattage output, the tangible, emitter frequency control of the emitter system maximizes energy absorption by the heated surface; thereby resulting in up to a five-fold reduction in btu's consumed, as compared to gas fired emitters, to achieve the same mass unit/temperature rise.

Low-to-no smoke is associated with the emitter operation during the pavement heating cycle, since the temperature of the pavement surface can be carefully regulated to not exceed a 'blue smoke' temperature. In contrast, the GFT must overheat the surface temperature (often >300° F.—well in excess of a 'blue smoke' threshold) to drive energy sufficiently deep (1.5"-2.0") to achieve at least a 200° F., sub-surface softening temperature; thereby facilitating the HIR scarifying and/or planing of the upper pavement surface. Turning the GST on and off as a method of regulating temperature overrun for the pavement surface is one commercial method of minimizing the occurrence of 'blue smoke' emissions, but the continual ramping back up from the 'off' mode substantially increases fuel consumption costs and $CO_2$ generation from the heating unit.

This air emission advantage relating to generation of' 'blue smoke', coupled with the extra fuel used to warm the pavement with indiscreet, reduced radiant energy absorption, results in at least an eight fold increase in $CO_2$ emissions by GFT, as compared to the emitter technology of the embodiments.

Burns to operators are less likely with the emitter technology of the embodiments than with the gas fired technology. Explosions are non-existent with emitter technology of the embodiments, but are always a significant threat when operating with flammable gas as in a GFT process. State-of-art, electrical equipment employed in the emitter system prevents workers exposure to electrical shock.

GHT/HIR processes and/or other short wavelength IR electrical devices inevitably overheat and accelerate the oxidation of surface asphalt during the process of repairing the old road surface by disturbing it, mixing it with new material and covering it. The emitter technology of the embodiments results in 'gentle', regulated heating that prevents such accelerated oxidation from occurring. A more thorough surface preparation eliminates the adulterating effect of dirt and organic debris, thereby substantially reducing the need for any scarifying of the old road surface as the vibratory compaction of the new overlay material adequately 'mixes' these two substrates in a uniform, high performance, fused monolith.

A newly applied lift of composite material comprising AROS™ or other ground tire rubber, bio-resin enriched, high carbon pitch and stone, installed as a cold process slurry or cold mix asphalt, can be fully fused to the thermally activated existing road surface without the damaging effects of excessive temperatures to the binder chemistry. Materials added to the GFT are inevitably exposed to higher, often difficult to regulate temperatures which prematurely oxidize the chemistry. Therefore the final surface and underlying road surface restoration can be expected to last significantly longer.

Characteristics of Treated Pavement in the Field

Fatigue life and stress life are properties of asphalt pavements. Stress is a unit of force per area. Strain is deformation caused by stress. Fatigue life is the number of stress cycles of specified character before a specimen or system sustains failure of a specified nature. Stress life curve plots the interrelationship between a system's specific stress quanta and range, and the strain product thereupon imparted; resulting in a predicted time to system failure. Accordingly, these measurements are of interest in determining useful life or service life of pavement.

The Federal Highway Administration (FHWA) has established that good highway design practices shall utilize aggregate that conforms to gradation bands and at percentages prescribed by the "0.45 Power Curve", and that four specific categories of tests shall be performed on those gradations. Those tests evaluate the stone for: 1) toughness and abrasion resistance, 2) durability and soundness, 3) angularity and 4) presence of minerals not otherwise considered aggregate singularities aka "sand equivalencies". Aggregate nomenclature divides rock which will not pass through a #8 sieve as coarse and that which will pass as "fines". By mass, for dense graded, hot mix pavement the 0.45 Power Curve shows that about 50% of the aggregate are fines and 50% are coarse aggregate. Coarse aggregate typically has made it through the crushing process because it is much tougher than the fines. It is much tougher because it doesn't have many micro-fissures or tiny cracks which lead to fracturing under the high pressures associated with rock pit crushing operations.

The requirement that aggregate be tested for durability and soundness is targeting the detection of micro-fissures in the aggregate as a weak point in road durability. Water which works its way into such fissures during the service life of the road will chemically weaken the stone or freeze and break it open. Typically the coarse stone is not subjected to the test. The test for durability and soundness consists of soaking the aggregate 'fines' in a dilute solution of either sodium sulfate or magnesium sulfate. The sulfate salt, upon entering the micro-fissure, expands, producing a similar effect to ice, thereby enlarging the micro-fissure. After rinsing the soaked stone in fresh water a percentage of the stone is flushed. If too much stone is lost in this process then the stone is disqualified for use. The presence of micro-fissures in the pavement mixture is a principal contributing factor to moisture sensitivity and premature fatigue degradation of the road. The homogenization process, to a great extent, corrects the presence of this weak link.

Asphalt is composed of two phases. The continuous phase comprises maltenes and the suspended phase comprises asphaltenes. Maltenes are usually low in carbon by mass and linear in molecular arrangement with molecular weights of less than 500. Maltenes have large areas of free molecular space in proportion to their hydrocarbon chain volume. Asphaltenes are much higher in carbon content and most generally are of a molecular weight ranging between 5,000 and 45,000. Asphaltenes are tightly wound with low free molecular space relative to their molecular volume.

It has been discovered that asphaltenes have a propensity to behave like a capacitor, surface storing electrons. Particularly during the high temperature, short IR wavelength excursion that the asphalt is subjected to in the preparation of hot mix asphalt in the 350° F. to 400° F. region. This electron storage creates repelling polarity between similar, highly charged asphaltene particles. This polarity induces a partial, artificial phase segregation of these high molecular weight particles. As the partial, artificial phase segregated asphalt is coated on the aggregate at the hot mix asphalt plant, this segregated condition becomes fixed within the shoreline of the rough stone surface. This imbalance within the two phases of the asphalt created in the conventional hot mix plant becomes a permanent obstacle to optimal compaction and long term durability of the thermoplastic binder. Phase segregation is an obstacle to compaction. A homogeneous asphalt behaves like a lubricant allowing the stone matrix to slide into maximum compaction whereas a stratified asphalt behaves like a contaminated (e.g., grit filled) lubricant and resists the slipping action needed to allow the rigid surfaces to easily glide to full embedment. Years of testing have verified that as little as a one percent air void density reduction in dense graded asphalt concrete can improve rutting resistance by over 100%.

Phase segregation is also an obstacle to long term resistance to oxidation as atmospheric moisture and electromagnetic energy perpetually work to strip and replace the most weakly bound hydrogen atoms from the hydrocarbon chains of the maltene structure. As hydrogen atoms are stripped both the ductility and cohesive strength of the asphalt is diminished; leading to embrittlement. A uniform dispersion of the very robust asphaltenes acts to attenuate this stripping action as it will, by its capacitive nature, attract and store much of the energy bias delivered from the combined effect of rolling loads, sun loads and water. The technology of various embodiments can be employed to re-homogenize this hot-mix-plant-induced phase segregation to a high level of uniformity. This restored phase uniformity halts accelerated fatigue degradation due to excessive, void-induced structural integrity and electro-chemical dehydrogenation.

Asphalt is typically strengthened by melting rubber and other thermoplastic polymer modifiers into the bitumen at the hot mix plant prior to coating the aggregate. This polymer modification is usually accompanied by some form of crosslinking within the polymer modifier to more fully develop, upon cooling, an interconnected, crystalline grid within which the amorphous bitumen may be stabilized.

The binder coating on the stone in a hot mix plant setting is in the 3-5 mil range. Typically, once the coated stone is placed and compacted, the crosslink exists only within the coating on each singularity. Little to no post placement crosslinking between the individual coated particles takes place. The inter-crosslinking performs its task of stabilizing the bitumen but since the potential for intra-crosslinking between the coated surface of the compacted aggregate is disrupted by: 1) the loss of mobility as the binder cools while 2) being simultaneously sheared into new, relative positions, the probability that any stabilizing crystallinity can be formed is low. This condition leaves the interstitial load transference between coated moieties at a diminished optimal quanta. Emitter heating and dielectric stirring provides an environment to at least partially correct this condition with a resultant improved resistance to fatigue degradation.

Asphalt concrete fails as its flexibility gives way to embrittlement. Embrittlement results when hydrocarbon chains in the continuous maltene phase are de-hydrogenated through oxidative cleavage. It is the combination of atmospheric moisture in the form of rain, fog, and snow multiplied by the presence of surges of electro-magnetic energy accompanying solar and mechanical loads that drives this destruction. Embrittlement fatigue in the upper one-half inch of pavement occurs more rapidly; often at two to ten times the fatigue rate below that surface depth. Not only are the oxidative forces more concentrated by the tearing action of tires, snow removal equipment and surface debris but direct solar load in the form of sunlight and wind places stress upon the surface which result in rapidly developing cracks leading to the formation of potholes, long fissures and block cracking, also referred to as "alligatoring".

The emitter wavelength can be adjusted to effectively and rapidly penetrate this upper crust region, disrupting the effects of these surface stressors and thereby extending the accepted stress life curve for surface deterioration. Cross-sections of pavement below this upper half-inch crust undergo a slower but often more persistent oxidative process. Moisture, which might quickly evaporate at the surface thus terminating its oxidative threat, becomes trapped in lower pavement voids for long periods. This encapsulation allows it to slowly but persistently attack the interstitial binder flexibility. However, of greater fatigue consequence by moisture is the attack at the binder-stone interface where direct contact between water and the plethora of reactive hydroxyl sites resident in all aggregate results in a rapid binder delamination.

Often "near new" pavement (pavement still in its first three years from installation), will have a superior driving surface but began to spall and break apart at between 1 to 3 inches deep. This is caused by the delaminating effect of trapped moisture finding its way to the binder-stone interface and reacting with the hydroxyl groups on the aggregate surface. The emitter's adjustable, deep pavement penetrating wavelength can, non-invasively, interrupt this accelerated fatigue degradation process; significantly extending the useful life of the pavement.

Thermal pumping is a term which describes the in-situ movement of fluidized, hot asphalt (as it expands under an outside heat source) from the confines of micro-fissures within the fine aggregate in pavement. This cavity dwelling binder was first absorbed during the hot mix plant blending but is coaxed out into the interstitial air voids of the pavement matrix. This asphalt, as well as the asphalt coating the first 100 microns thickness from the stone surface, have been shown to be unchanged from the original installed chemistry. Warming and stirring, plus re-introducing, these virgin reservoirs of ductile, highly cohesive binder, through the use of selective bandwidths of energy which optimize a dipolar response, significantly improves the flexibility of asphalt concrete.

Phase segregated binder throughout the aged asphalt concrete matrix is bathed with an emitter supplied bandwidth of energy which is between 1,000× to 100,000× longer than the near IR emitted bandwidth of the open flame heating used in conventional hot mix plants. This long wavelength, 'gentle' heating causes a dielectric relaxation of the asphaltenes allowing them to re-integrate into a uniform homogeneity. Once this homogeneity is restored the binder becomes: 1) more oxidation resistant and 2) a much superior lubricant to the slippage of rock under a re-compacting effort.

Vibratory compaction of a properly emitter treated road cross-section can reliably reduce air void densities from a typical 7% to an improved 4.5-5% range. Between 1" and 3", the core temperatures accompanying these homogenization changes is in the 240-300° F. range. Without this lubricating effect, heavy vibratory compaction attempts have proven to only break rock and damage the pavement. Re-heating aged pavement to similar pavement core temperatures with short wavelength, IR heaters do not result in this significant beneficial response. Air void density reduction not only improves the pavements resistance to mechanical rutting but it also tightens the voids into which moisture can migrate. The fluidization at the rock surface improves a re-wetting of the binder upon the rock surface as a result of the dual action from the increase of interstitial pressure upon compaction and the dipole reaction of the electromagnetic field.

Hot mix asphalt (HMA) pavement preparation is a HEAT+MIX+INSTALL dynamic. The methods of certain embodiments follow a MIX+INSTALL+HEAT dynamic. This difference has a dramatic, positive effect on fatigue life extension in addition to the improvements above referenced through the use of the technology of various embodiments on the underlying, aged asphalt. Use of adhesive systems multiplies system effectiveness in delaying fatigue degradation of new, virgin material and/or a mixture of old milled pavement augmented by mixing with new, virgin material.

Adhesive can be provided in a waterborne emulsion form. Numerous versions of the chemistry are commercially available from Coe Polymer, Inc., of San Jose, Calif. Compounding the liquid onto virgin aggregate is preferably achieved by belt or augur feeding a metered flow of graded stone into a conventional dual shaft, counter rotating pug mill, whereupon the liquid adhesive is sprayed at a pre-determined rate. As the damp, coated stone exits the pug mill it may be fed directly: 1) into a conventional paving machine and thereby placed upon the receiving surface of the road, 2) into a short term storage bin for transfer to a job site, 3) onto a stockpile for storage or air drying or 4) through a drying device which eliminates the moisture. The binder chemistry may be adjusted to accommodate a successful processing under any of these four methods of stone coating; however, method 4) is generally preferred.

Superior asphalt adhesive performance can be achieved with a binder chemistry that: 1) fully wets the irregularities of the stone surface, 2) covalently bonds to all naturally occurring, surface —OH groups, 3) upon water evaporation inter-crosslinks to absolute insolubility, 4) remains a heat flowable thermoplastic but only becomes plastic at temperatures higher than 200° F., 5) can be applied to stone then subjected to dehydration but thereafter retain sufficient functionality for future intra-crosslinking when tightly packed together with other similarly processed stone, 6) after placement through a paving device, to achieve a double crosslink by thermal or chemical activation and 7) remains flexible to 0° F. while still retaining thermoplastic behavior within the temperature performance range specified. To achieve these seven characteristics, a two coat process has been devised. Adhesive Part 1, at approximately 60% solids content, is applied onto the virgin stone surface at a wet film thickness of about two mils as it passes through a pug mill; then immediately flash dried and cross-linked onto the inorganic surface of the aggregate. In a continuous operation the now dried, thin coated moiety receives adhesive Part 2, also approximately 60% solids, in a similar application and drying manner; whereupon it is then transferred to storage. Part 1 adhesive maintains reactive functionality, which immediately self-crosslinks upon contact with Part 2 adhesive. Part 1 adhesive achieves performance characteristics 1), 2), 3), and 4). Part 2 adhesive continues to achieve performance characteristic 4), but is the principal provider of performance characteristics 5), 6), 7), and 8).

After implementation of the above process, the coated stone may be stored in bulk stockpiles indefinitely without self-adhering at ambient temperature. Thereafter it may be shipped by any conventional means to be placed and compacted onto the receiving surface. Once partially compacted, the emitter device is rolled over the surface whereupon the emitter wavelength is tuned to activate the functionality of the reactive groups within Part 2 adhesive, thereby completing a double crosslink. The pavement cross-section, when activated by the emitter during the second crosslink typically achieves a temperature in the range of 325° F. to 350° F. As it cools to about 275° F. it is compacted to final density.

The deployment of the technology, beyond the prescriptive preparation of the coated stone, is manifold. For example, old pavement, after removal of surface debris and dirt embedded in open cracks, may be homogenized, thereby warming the pavement to a temperature of up to 300° F. at a depth of up to 3". Once the pavement is warmed and the binder therein has been stirred, a sprayable binder and stone slurry may be injected or calendered into surface cracks of the pavement. While still warm above 250° F., the pavement may be vibratory compacted to a uniform, defect free, weather resistant surface. A rough, buckled or rutted pavement profile may require surface milling to achieve a desired ride quality. Once the emitter has rolled over the surface and achieved a minimum pavement temperature of 250° F. in the region to be milled the removal may commence without damage to the stone within the milled pavement matrix. Upon the removal of this milled material it may be then immediately re-mixed at the job site with a previously prepared binder coated stone and placed back onto the pavement surface through a paving machine for compaction and final crosslinking. This will save a lot of money by reducing the demand for imported material. Conventional cold milling damages stone but after grading out the recycled asphalt pavement (RAP) it may be mix with a binder coated stone and reinstalled as outlined herein.

Whenever the utilization of old road grindings is preferred, after grading to the appropriate sieve spectrum, any combination of site coating of these grindings and blending with binder coated aggregate may be initiated with improved results over conventional methods; but the final installed pavement mat must be heat activated with the emitter prior to compacting to assure that the adhesive is fully developed.

A pre-manufactured ⅛"-½" thick road plating composition of graded stone and binder may be manufactured in long rolls or sheets at an offsite location. The sheets can be assembled into an elastomer binding of approximately 1 mm thickness then transferred to the point of application as, for example, 6'-0" wide sections which are paved upon a pre-prepared dilapidated road surface. Thereafter, the emitter rolls over the newly installed wearing surface and irradiate both the old road base and the new sheet such that a vibratory compaction can then fuse the structure together. A binder primer or levelling course can first be installed, in certain embodiments, to provide an improved surface.

TractionSeal Micro

TractionSeal Micro is a friction enhancing fog seal-seal coat. The technology is derived as a gel binder which is added to water then a pre-packaged stone (fog seal −150/325 or seal coat −50/200) is mixed therein. The gel may be mixed to create a fivefold increase in coating volume. This means that for every gallon of gel up to 5 gallons of ready to use sealer is made. The liquid compound is quick drying and provides a scuff tolerant, highly water and fuel resistant, permanently black, skid resistant surface. The high softening point binder retains an engineered, micro-stone composite, exhibiting aerospace derived, solid phase auto-regenerative cohesion. This means that when an oxidative, thermal or mechanical load damages the composite matrix it will, upon one cooling-heating cycle, self-repair the remaining internal binder. The binder technology wicks into the porous, brittle upper asphalt region of pavement, replenishing lost aromatic resins. This restores adhesive ductility and upon curing creates a shrink-wrapped, stone matric wearing shield; protecting the old pavement surface. The fog seal may be spray applied by distributor truck. The seal coat may be spray or squeegee applied with conventional equipment.

Hamburg Wheel Test

The Hamburg wheel test can be used as a screening tool for hot mix asphalt. The Hamburg Wheel Tracking Test originated in Germany in the mid-1970s. The test examines the susceptibility of the HMA to rutting and moisture damage. The Hamburg Wheel Tracking Test uses a steel wheel with weight that rolls over the sample in a heated water bath. A designated number of passes are performed on the sample, e.g., 20,000 passes or more. The rut depth is measured by the machine periodically, usually every 20, 50, 100 or 200 passes. 20,000 passes typically take around 8-10 hours. Several analytics are examined with the Hamburg Wheel Tracking Test including post-compaction consolidation, creep slope, stripping inflection point, and stripping slope. The Federal Highway Administration has published a report providing details of the test (see Publication Number: FHWA-RD-02-042 dated October 2000) and an evaluation of the Hamburg test for Caltrans was published by UC Davis (see Qing Lu and John T. Harvey, Research Report: UCPRC-RR-2005-15 dated November 2005). In practical terms, the test can be employed on any particular asphalt pavement, particularly a pavement to which a fresh wearing surface has been applied, to determine what, if any damage has occurred below the visible surface of the pavement. The Hamburg test can be employed to predict whether the resurfaced pavement will maintain a long service life or whether it will rapidly degrade.

Figure 5:
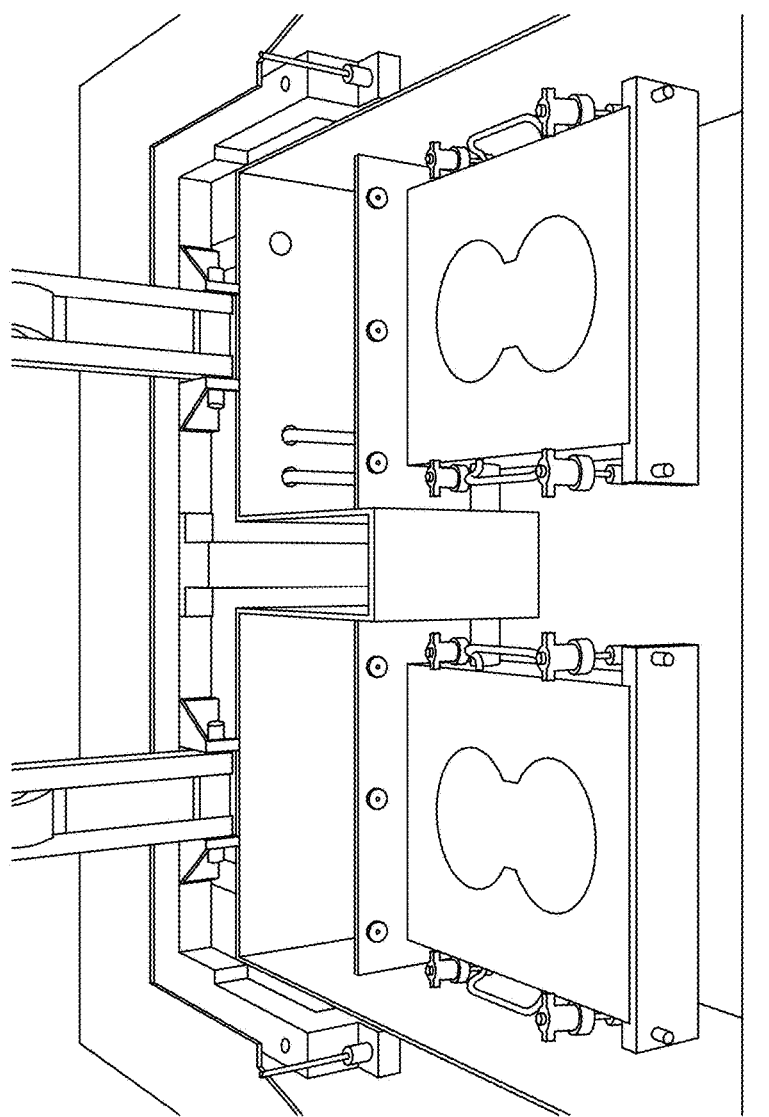
FIG. 5 depicts a Hamburg Wheel Test apparatus employed to test selected asphalt pavement cores.

FIG. 5 depicts a Hamburg Wheel Test apparatus employed to test selected asphalt pavement cores. The apparatus includes a left dock and a right dock, each dock holding a front and a back asphalt pavement core to be subject to testing. The core in the front left dock was designated L3, the core in the rear left dock was designated L9, the core in the front right dock was designated R3, and the core in the rear right dock was designated R9, as also referred to in FIGS. 5, 6, and 7. The L6 and R6 designations were used to refer to the center point between the L3 and L9, and the R3 and R9 cores, respectively. The cores subject to testing were laboratory prepared cores.

Figure 6:
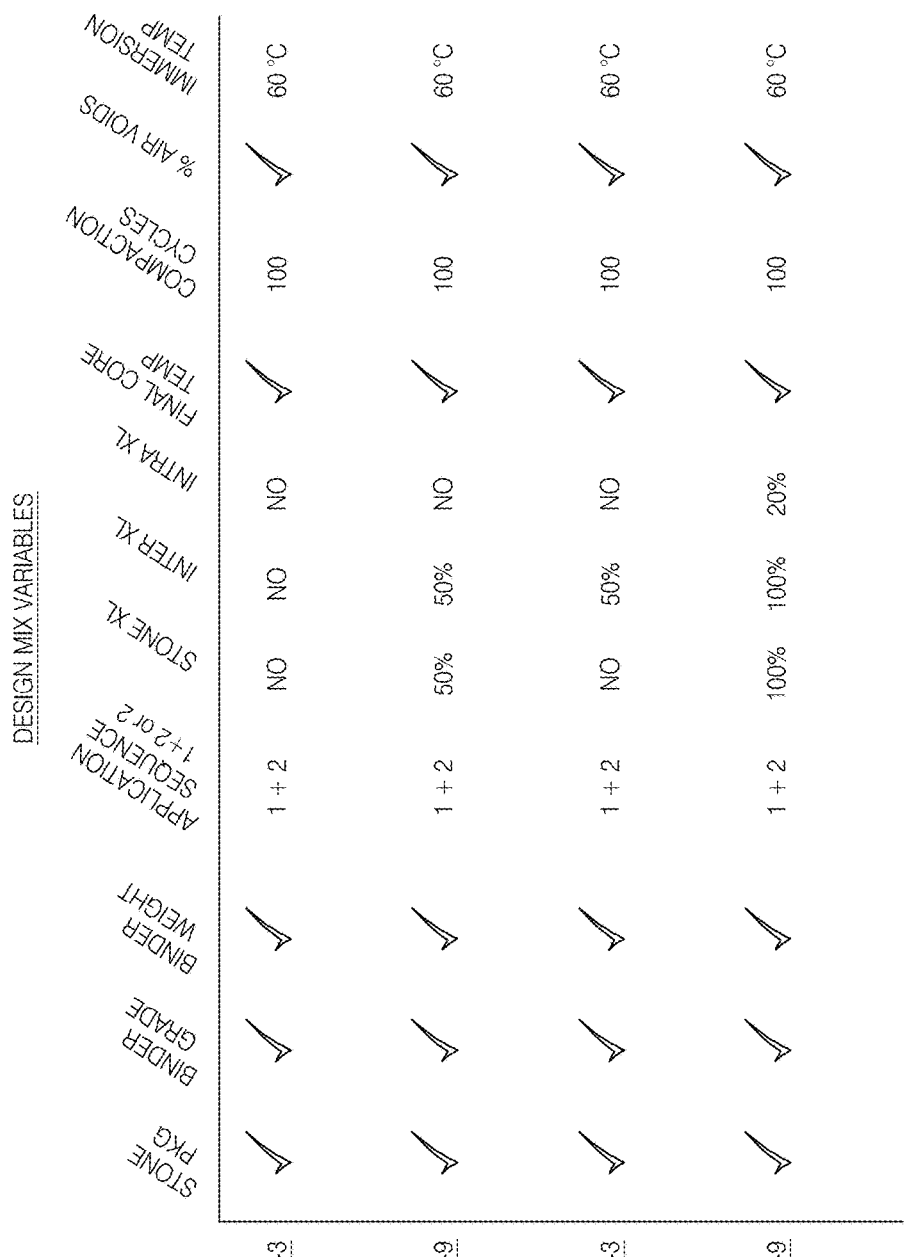
FIG. 6 provides a comparison of attributes of various cores tested.

FIG. 6 provides a comparison of attributes of various cores tested. Checkmarks indicate which design mix variables are identical for the cores tested (including stone package, binder grade, binder weight, final core temperature, and % air voids). Application Sequence 1+2 indicated that the stone was coated with a binder and then the coated stone was further coated with binder, whereas Application Sequence 2 indicated that uncoated stone was coated with binder in a single step. Stone XL indicated to what degree crosslinking in the binder applied directly to the stone (not bulk binder) occurred as induced by emitter technology, with "NO" indicating that emitter technology was not applied to the coated stone. Inter XL indicated to what degree crosslinking in the bulk binder prior to application to the stone occurred as induced by emitter technology, with "NO" indicating that emitter technology was not applied to the bulk binder. Intra XL indicated to what degree crosslinking between the binder on the coated stone and the bulk binder occurred as induced by emitter technology, with "NO" indicating that emitter technology was not applied. The amount of crosslinking induced was selected by controlling the amount of energy imparted to the core using emitter technology.

Figure 7A:
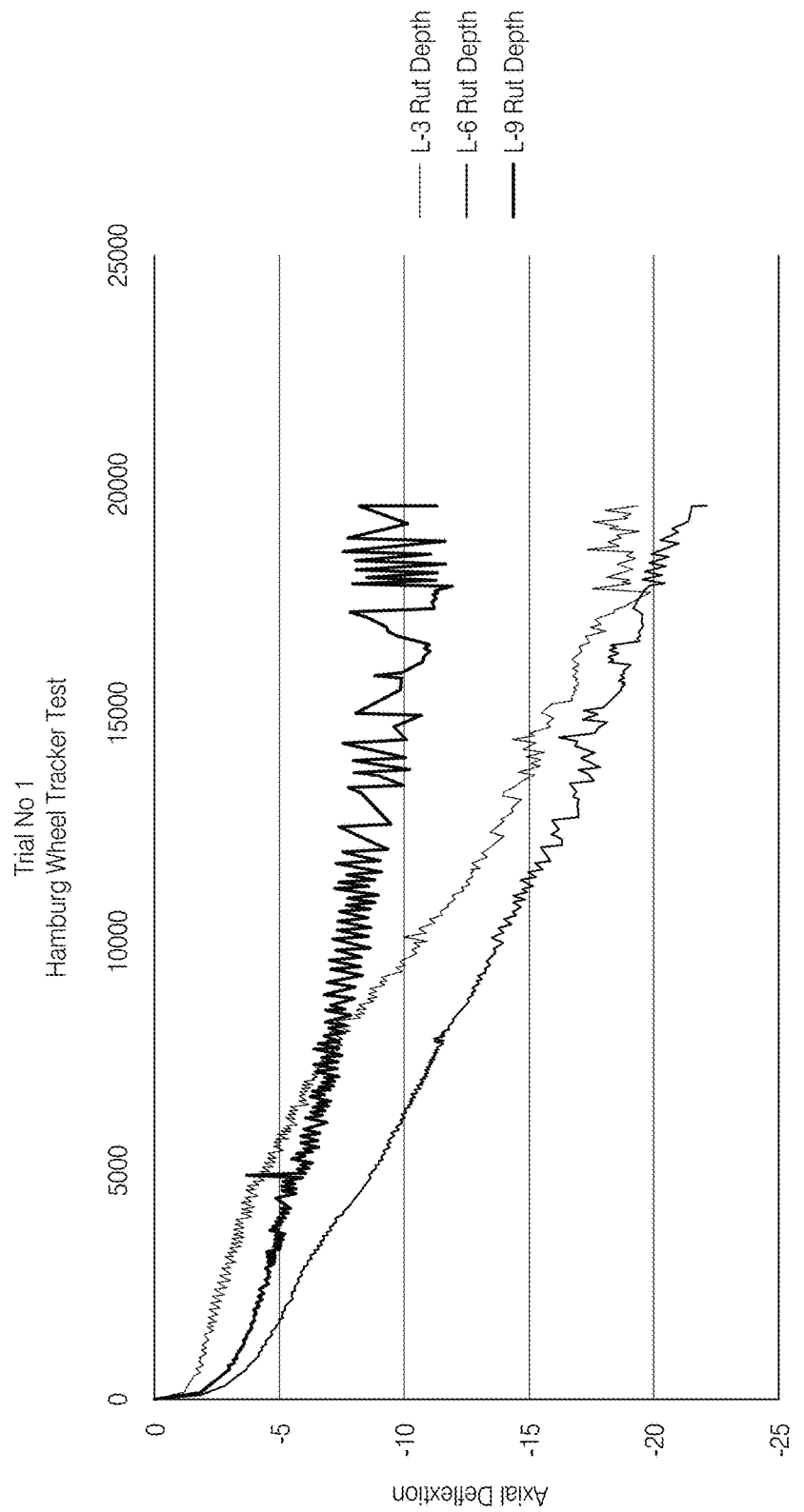
FIG. 7A provides results of a Hamburg Wheel Tracker test for left dock (L3, L6, L9) asphalt pavement cores.

FIG. 7A provides results of a Hamburg Wheel Tracker test for left dock (L3, L6, L9) asphalt pavement cores. The tests were conducted in a 60° C. water bath. The y-axis represented axial deflection in millimeters, while the x-axis represented the number of wheel passes the cores were subjected to. The L3 core exhibited poor performance—essentially a steady slope down with failure at almost a 45° angle on the graph. While the binder employed in preparing the tested cores was the same, the crosslinking was different. The L3 core was not subjected to any crosslinking. In contrast, the L9 core exhibited half as much rutting as the L3 core. In the L9 core crosslinking between the binder and stone, as well as crosslinking in the bulk binder, was induced by application of emitter technology.

Figure 7B:
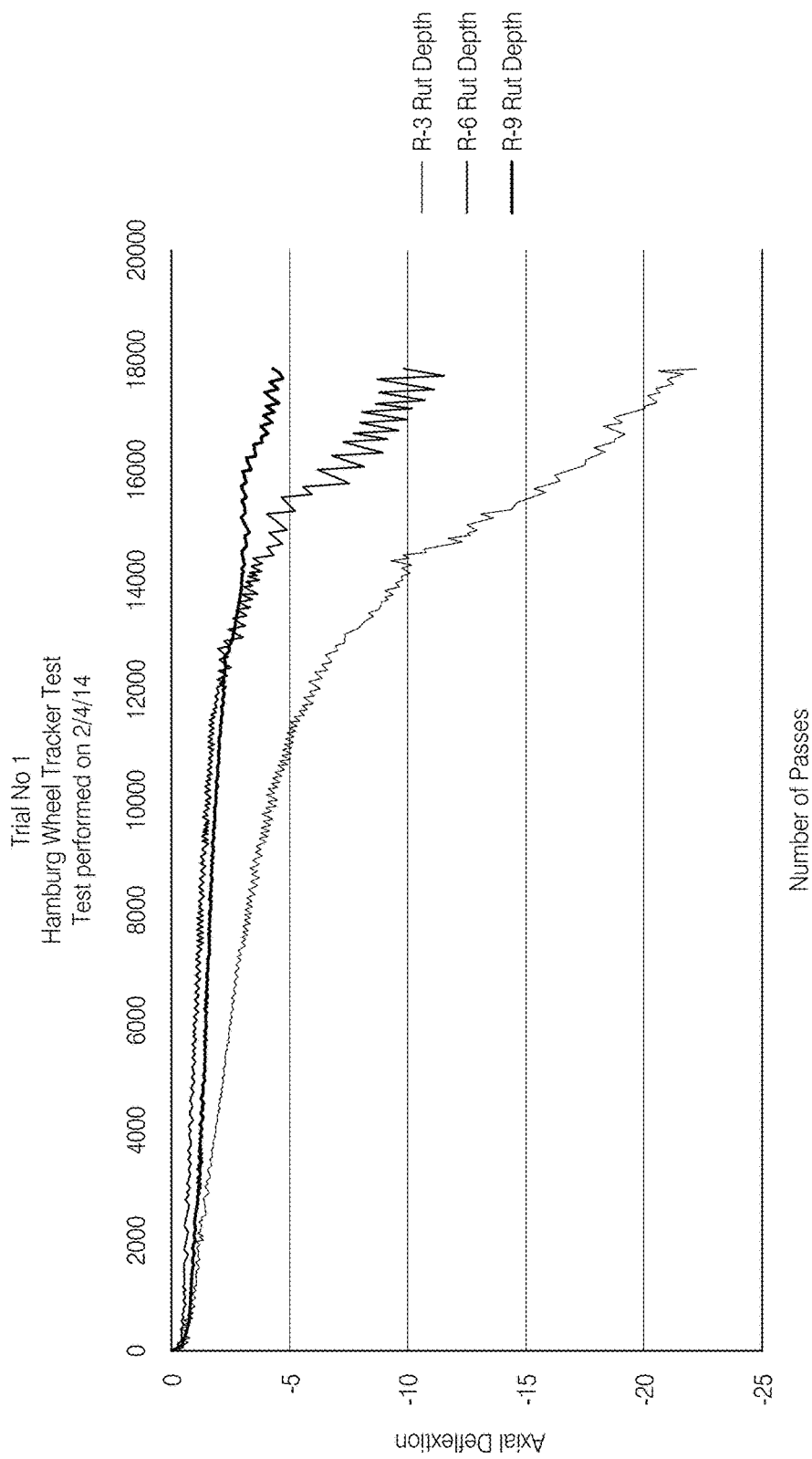
FIG. 7B provides results of a Hamburg Wheel Tracker test for right dock (R3, R6, R9) asphalt pavement cores.

FIG. 7B provides results of a Hamburg Wheel Tracker test for right dock (R3, R6, R9) asphalt pavement cores. The graph includes a region identified as "Stripping Inflection". This region illustrates that between about 9,000 and 11,000 cycles, the rate of rutting begins to accelerate.

It has been discovered that if one can crosslink binder to the stone using ambient cured crosslink technology, the moisture sensitivity of the road is substantially improved. For example, the R3 can be compared with the L3 core. The L3 core begins to fail at 5,000 to 6,000 cycles, with rutting down to 5 millimeters at 6,000 cycles. In contrast, the R3 core exhibits only half as much rutting as L3 at the same number of cycles. The binder in the R3 core exhibits more cohesive strength resulting in less moisture sensitivity. In the Hamburg test, the asphalt-moisture relationship dynamics typically do not manifest themselves in the early part of the test. The core typically requires a period of exposure to water under test conditions in order for water to work its way down into the core, similar to the process of exposing pavement to the elements under ambient conditions. Accordingly, a brand new road may exhibit satisfactory performance for a couple of seasons, and then suddenly begin to fall apart due to the moisture penetrating the core and inserting itself between the binder and the rock. Accordingly, the Hamburg test can be conveniently viewed in two parts: resistance to rutting up to about 10,000 cycles, and rut resistance after 10,000 cycles. Resistance to rutting up to about 10,000 cycles and beyond indicates that the stone and the binder are well-adhered to each other, so as to resist water breakdown. While intercrosslinking can improve rutting resistance in the first 10,000 cycles, it is stone crosslinking that improves the rut resistance long term, pushing the stripping inflection point out further. The R9 core exhibited the best performance of the cores tested. The R9 core was subjected to 100% crosslinking on the stone and 100% intercrosslinking. There was no significant loss of moisture resistance, and the intercrosslinking of 100% kept the material very stiff in terms of the overall rutting in the later stages of testing. Intracrosslinking for R9 was at 20%.

Figure 8A:
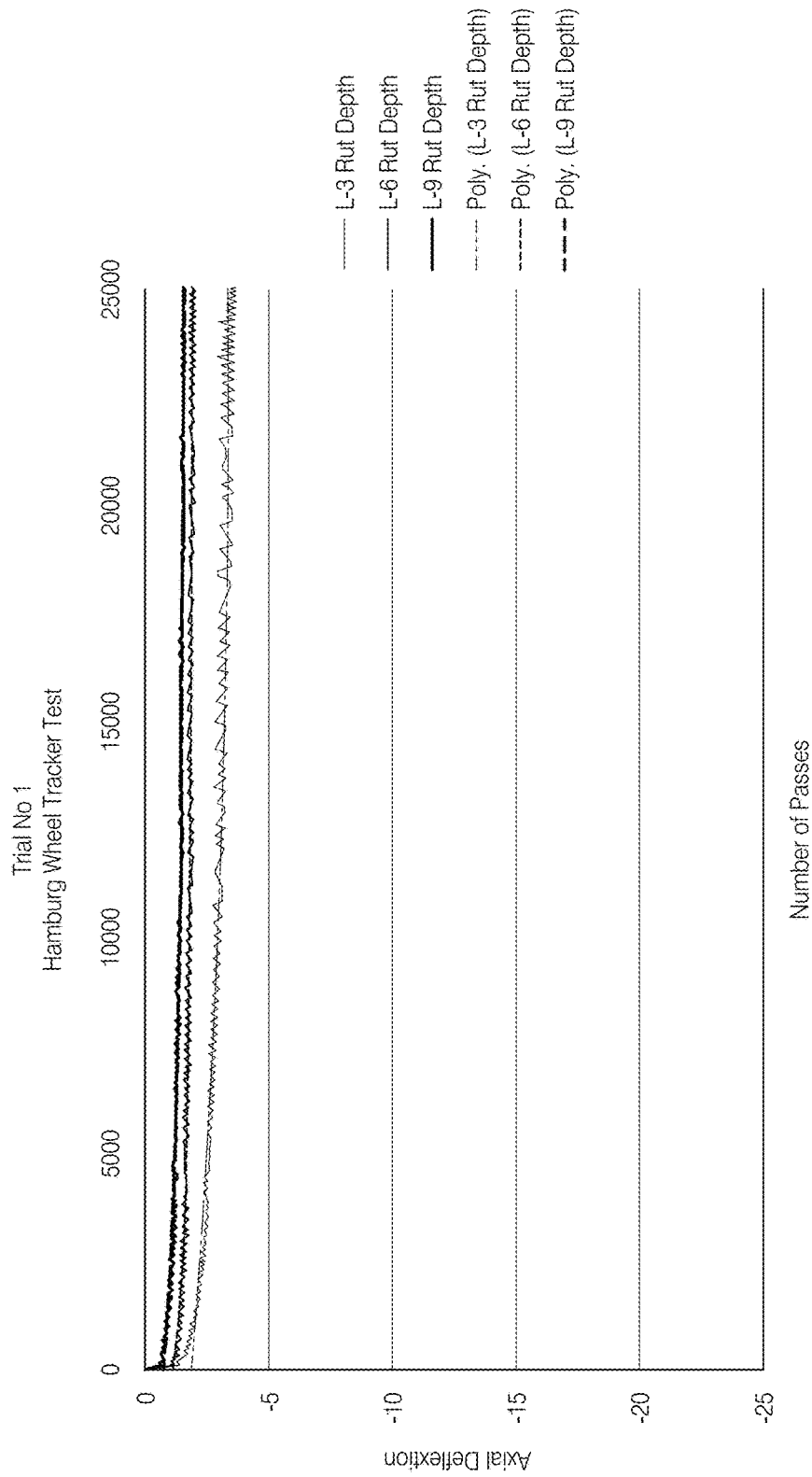
FIG. 8A provides results of a Hamburg Wheel Tracker test for left dock (L3, L6, L9) asphalt pavement cores prepared so as to achieve maximum cross-linking in all three aspects.

FIG. 8A provides results of a Hamburg Wheel Tracker test for right dock (L3, L6, L9) asphalt pavement cores prepared to maximize stone crosslinking, intra-crosslinking, and inter-crosslinking. The tests were performed in a 60° C. water bath. The cores exhibited a maximum rut of 3.6 mm in the middle of the core and an average of 2.4 mm from readings in the middle of cores and a reading at the joint. A second Hamburg Wheel Tracker test was repeated on the same set of cores that had previously been subjected to testing (first Hamburg Wheel Tracker test results provided in FIG. 8A, and second, subsequent Hamburg Wheel Tracker test results provided in FIG. 8B). For the second test, the cores were set in high strength plaster so that the lower original pavement would be fully contained. The second test resulted in a maximum rut of 2.1 mm in the middle of the core and an average of 1.5 mm from the readings in the middle of the cores and a reading at the joint. The cores so tested survived 50,000 cycles with less than 4 mm of total rutting.

The cores were prepared as follows. A stone matrix was provided that was ¾" graded along a Federal Highway Administration (FHWA) 0.45 power curve. Coatings were provided that comprised 60% polymer modified emulsions that were applied cold to the dry stone of the stone matrix. A coating, referred to herein as "Application Sequence 1 Coating" was prepared as follows. A mixture of HCP Asphalt Emulsion from Delta Trading, LLC of Bakersfield, Calif. and AFO 9837 Bioresin from Coe Polymer, Inc. of Sacramento, Calif. was prepared. The ratio of HCP Asphalt Emulsion to AFO 0837 Bioresin was 96.00 to 4.00 (units of weight). To this mixture, MDI PM200 Crosslink available from Tri-Iso Inc., Los Angeles, Calif. was added. The ratio of mixture to MDI PM200 Crosslink was 100.00 to 5.00 (units of weight). The amount of solids in the Application Sequence 1 Coating was 64.68 (units of weight, based on total units of weight of 105.00). The specified amount of croslinking agent (MDI PM200 Crosslink) resulted in 100% crosslinking. Reduced levels of crosslinking (e.g., Stone XL, Inter XL, or Intra XL as referred to in FIG. 6) were achieved by reducing the amount of crosslinking agent in the Application Sequence 1. A coating, referred to herein as "Application Sequence 2 Coating" was prepared as follows. A mixture of HCP Asphalt Emulsion from Delta Trading, LLC of Bakersfield, Calif. and BER 2937 Bioresin Modified Isoprene-SBR Terpolymer was prepared. The Isoprene-SBR was obtained from BASF North America of Florham Park, N.J., and the BER 2937 Bioresin employed to convert the Isoprene-SBR into a Terpolymer was obtained from Coe Polymer, Inc. of Sacramento, Calif. The ratio of HCP Asphalt Emulsion to BER 2937 Bioresin Modified Isoprene-SBR Terpolymer was 85.00 to 15.00 (units of weight). The amount of solids in the Application Sequence 2 Coating was 60.55 (units of weight, based on total units of weight of 100.00). The combined cured binders were evaluated according to guidelines set forth in ASTM G154 QUV Accelerated Ageing Test—5,000 hrs. including cyclic moisture at 300-400 nm. The results were no chalking, cracking or hardening detected. The cured binder was also evaluated according to the guidelines set forth in ASTM D6521-13 Accelerated aging of Asphalt Binder—300 psi at 250° F. for 30 days. The results were no loss of ductility, no formation of carbonyl or sulfoxide groups detected.

In Application Sequence 1, the coating was applied to the stone in an amount of 4% neat resin (relative to stone weight), and then air dried with ambient temperature crosslinking of the coating to virgin stone surface. In Application Sequence 2, the coating was applied to the pre-coated stone in an amount of 3.5% neat resin (relative to stone weight). The second coating was applied over the air cured first coating layer, and then air dried. No crosslinking of the second coat occurred under ambient conditions (crosslinking is only initiated when the stone-binder matrix is subjected to temperatures of 250° F. or greater within a compacted cross-section). Loose, already coated stone was placed in gyratory compactor cylinder already containing a core sample from an aged pavement in the bottom. The cold compact stone-binder matrix was compacted to 5-6% air void density. The resulting total compacted core thickness was 60 mm with a lower one-half (30 mm) consisting of the aged pavement cross-section and the upper one-half (30 mm) consisting of new coated material. The compacted core was then irradiated with 10,000 nm wavelength radiation to a core temperature of 300° F. The test section upon compaction and irradiation curing simulated a one inch overlay repair system. Hamburg Wheel Test results for the baseline aged pavement taken from the same area as the aged pavement core samples referred to above showed in excess of 20 mm rutting, thereby failing the standard at approximately 5,000 cycles. Irradiating the entire core to a temperature of 300° F. for a minimum of ten minutes completely crosslinked the Application Sequence 1 to the Application Sequence 2 binder within its own matrix as well as inter-crosslinked the Application Sequence 1 and the Application Sequence 2 into a monolithic polymer at the mechanical touchpoint of each coated stone moiety.

A core subjected to 100% stone crosslinking, 100% intercrosslinking and 100% intracrosslinking would exhibit virtually no rutting, resulting in significantly longer service life than any conventional asphalt. In certain embodiments a high degree of intracrosslinking is desirable. A gap-created road has voids between the stone that leaves room for water to percolate through and move horizontally to keep the road from puddling. Such a configuration helps avoid hydroplaning, and is referred to as an open grade friction course. Such a configuration is employed in portions of Interstate 10 that run along the Gulf Coast to avoid standing water due to heavy rain. While in a dense graded structure there is substantial rock contact, in a gap-graded road there is substantially less rock contact, therefore the road cross section experiences substantially greater mechanical loads at the contact points. A high degree of intracrosslinking can compensate for the greater loads. Intercrosslinking is a greater factor in such gap-graded roads, because the stones touch in fewer spots as opposed to being nested very tightly. Emitter technology can advantageously be employed to engineer the binder to compensate for what would be considered a substandard stone configuration, as in gap-graded roads, resulting in longer pavement life than can be achieved using conventional technologies.

Figure 9:
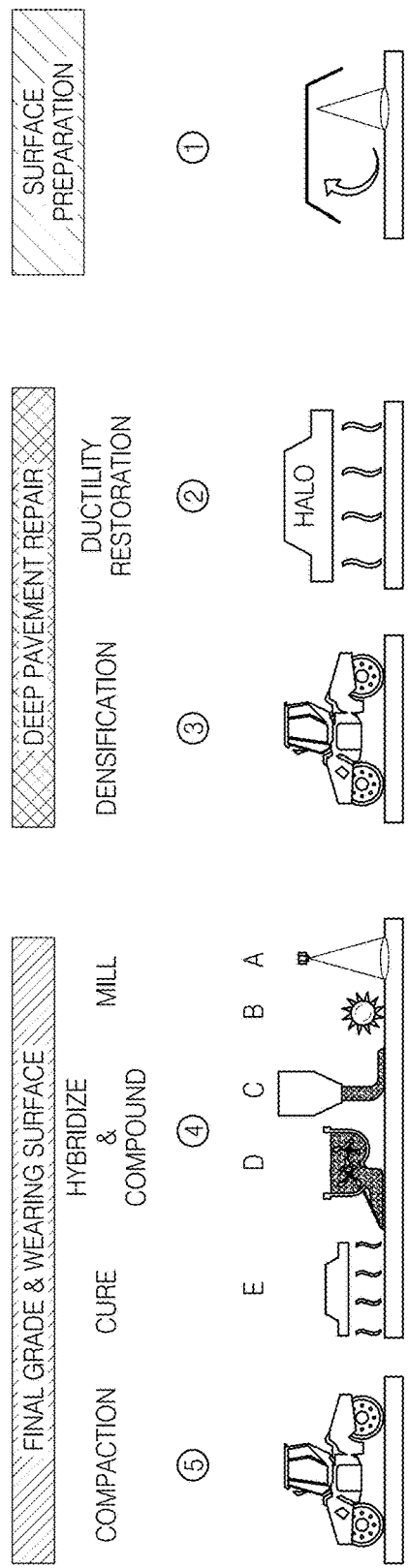
FIG. 9 provides a schematic depicting steps involved in reconstruction of damaged or aged pavement using emitter technology of an embodiment.

FIG. 9 provides a schematic depicting steps involved in reconstruction of damaged or aged pavement using emitter technology. The first step typically involves surface preparation, if necessary (e.g., removing debris and pavement markers, high pressure washing and vacuum). Deep pavement repair is achieved by the second and third steps. The second step involves ductility restoration by applying emitter technology to the road surface, followed by a third step of densification of the pavement, e.g., using high impact vibratory compaction or other conventional compaction technologies, depending upon any overlay to be applied. If desired, these steps can be followed by a final grade and wearing surface process involving as step 4 the application of a warm micromill and injection of high performance adhesive (a first crosslinking), gravity feeding a pre-coated new stone matrix, mixing new and warm milled aggregate and adhesive then paving, followed by application of emitter technology to the upper substrate (a second crosslinking). Step 5 involves a final compaction and fusion of the wearing surface.

Figure 4:
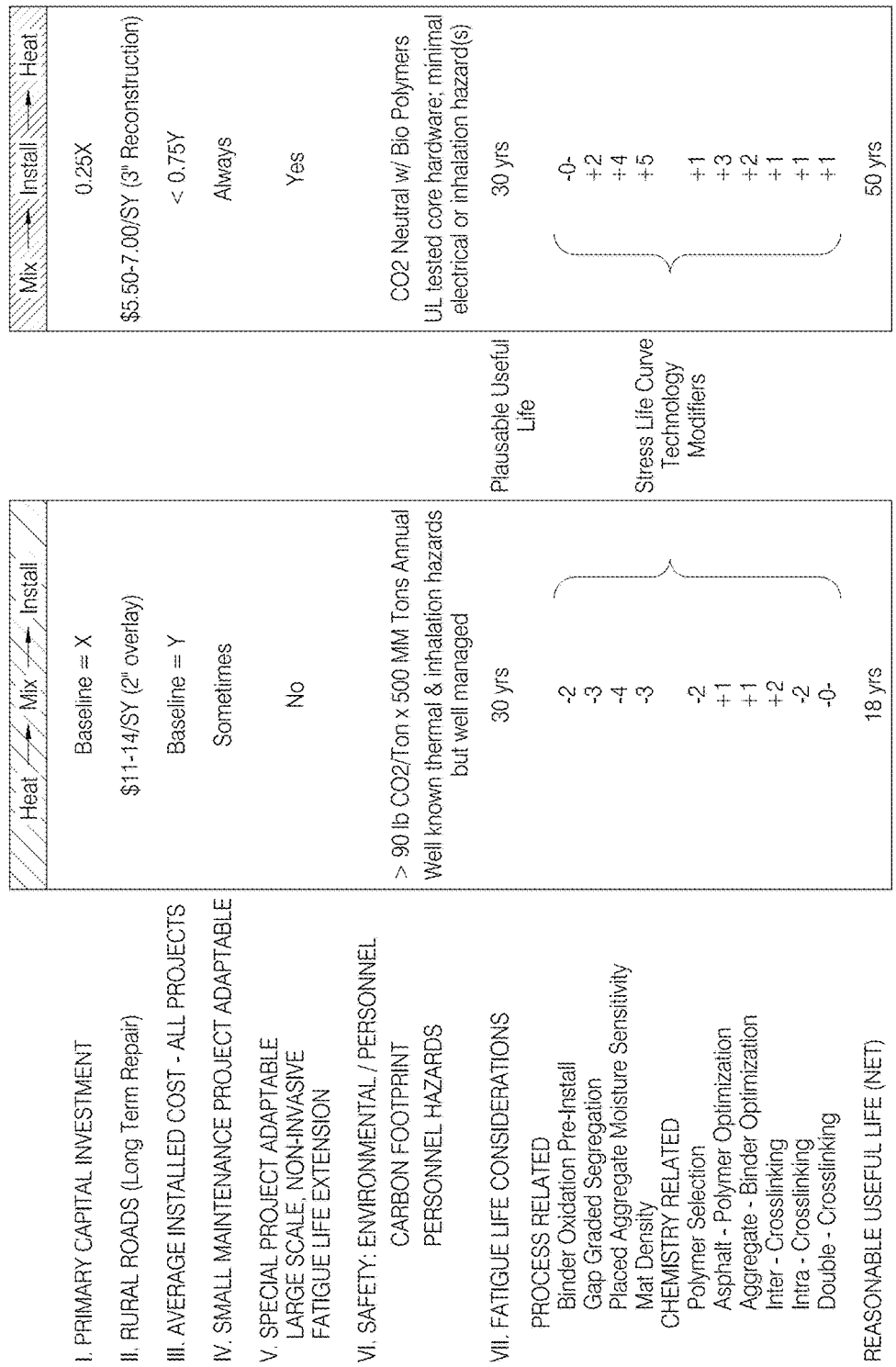
FIG. 4 illustrates various fatigue life considerations and their impact on plausible useful life.

For conventional asphalt paving technologies, 30 years on average is typically considered the plausible usable life, i.e., the life of the road without major maintenance. In contrast, the actual useful life is typically considered only 18 years as an average with the best pavement that is currently in use, namely conventional hot mix pavement. One of skill in the art understands that while a high toughness is desirable in asphalt paving, if too much polymer is included in the asphalt coated on rock to improve toughness, the material becomes so stiff that it cannot be laid using conventional paver equipment and exhibits stripping problems. The emitter technology of the embodiments enables a higher degree of crosslinking in any polymer present to be achieved versus conventional hot mix technology, so as to improve pavement toughness in situ, thereby theoretically extending actual useful life to 50 years or more for pavement using emitter technology. FIG. 4 illustrates various fatigue life considerations and their impact on plausible useful life. The considerations are divided into process related and chemical related factors. In conventional hot mix asphalt, a process related factor that reduces life is oxidation of the binder prior to installation. The binder is typically subjected to heating for hours prior to installation (reduction of approx. 2 years of life). In contrast, the emitter technology warms the pavement in place for only a few minutes (zero net effect on plausible useful life). Gap graded segregation, where smaller and larger rocks in the aggregate separate during handling (transport, storage, transfer, etc.) can cause approx. 3 years reduction in life. In contrast, in the emitter technology the aggregate is mixed and laid on site, resulting in superior homogeneity (a benefit of approx. 2 years in life).

Moisture sensitivity of the placed aggregate is a significant factor in life reduction in conventional hot mix. Hot mix is typically a very high viscosity material due to the presence of rubberized asphalts. The high viscosity rubberized asphalt material "smooths out" the surface of dry rock while exhibiting a tendency to bridge the microstructure of the rock surface. Accordingly, in conventional hot mix there is much surface area that is left unwetted by the high viscosity rubberized asphalt material. In contrast, a water-based material as is advantageously employed in the technology of certain embodiments has a tendency to wet out substantially more of the microstructure of the rock surface, and typically will coat 10 times more of the rock surface area than a conventional hot mix high viscosity rubberized asphalt material. This results in a greater intimacy between the chemistry of a water-based system than in a hot melt system, resulting in reduced moisture sensitivity. Processes related to moisture sensitivity result in approx. 4 years reduction in life for hot mix, versus a gain of approx. 4 years for emitter technology.

Mat density is a factor relating to stiffness of the hot mix. As discussed above, bituminous materials comprise two phases: a continuous phase comprising maltenes and a suspended phase comprising asphaltenes. Subjecting the material to short wavelengths of energy as in conventional hot mix results in dehydrogenation and grafting, causing islands to be formed that takes away from the homogeneity of the asphalt. This reduction in homogeneity can impact the compaction process, in that the asphalt acts like a "dirty lubricant", causing the pavement to move laterally instead of compacting vertically into a tighter mass at a certain point. If the asphalt is cooled to the point where it will not move sideways, then it becomes too stiff to compact vertically. This results in a 6% void density content in conventional hot mix, resulting in a loss of 3 years off the plausible useful life. In contrast, a higher density down to 5% or even 4% or less void density can be achieved with emitter technology, resulting in an improvement of approx. 5 years. This is because a longer wavelength of energy can be employed so lubricity between the binder on the rock and the stone when the final compaction is performed is improved, resulting in higher density. Applying emitter technology and compaction to an aged roadbed that has stratification can typically reduce void density content of the hot mix by a percentage point (e.g., 6% void density content is reduced to 5% void density content).

Chemistry-related fatigue life configuration can include polymer selection. For example, the emitter technology can employ polymer technologies not conventionally used in conventional hot mix, e.g., certain glycol technologies. Aggregate binder optimization includes processes related to achieving better wetting of the rock surface by using crosslinking agents and stripping agents (e.g., amine bases such as isocyanurates exhibit a weak acid chemistry and bind to the hydroxyls on the stone surface) that add significant resistance to moisture susceptibility. Buffered isocyanurate can be particularly advantageous in conjunction with emitter technology in that it will mix into the aqueous binder system and improve wetting of the stone surface by a factor of 10 compared to conventional hot mix, and also create bonds that are not susceptible to be broken down by polar materials like water. The aggregate-binder selection can also be employed to enable poor quality aggregate, e.g., rock that is porous or not as structurally sound as is typically preferred, to be used in road building with satisfactory useful life. The technology of the embodiments allows one to compensate for such irregularities in the actual hardness or the toughness of stone. The final chemistry related factors identified in FIG. 5 include intercrosslinking, intracrosslinking, and double crosslinking. Double crosslinking is used to describe a process wherein there is a first crosslinking takes place at an approximately 3 to 5,000 nanometer peak wavelength, and then a second level of crosslinking that takes place as the road system cools. The second phase of crosslinking that takes place creates a resistance to the loads that the first crosslinking will endure first. The combination of crosslinking that takes place at different temperatures essentially creates tension between crosslinks wherein the first phase crosslinks under compression create tension in the second crosslinks, and vice versa. This facilitates the pavement coming back to stasis after application of compression by a rolling load by using a tension and compression crystalline structure.

Figure 10:
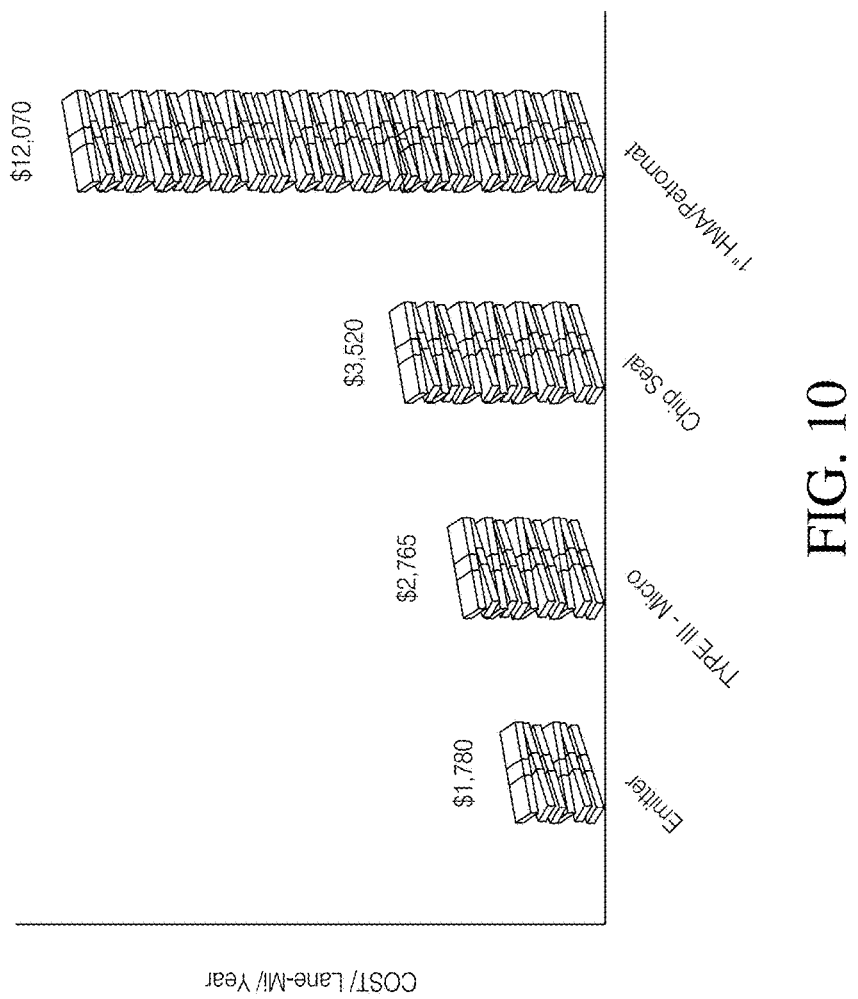
FIG. 10 provides a cost per lane miles per year comparison of emitter technology of an embodiment versus conventional pavement rejuvenation technologies.

FIG. 10 provides a cost per lane miles per year comparison of emitter technology versus conventional pavement rejuvenation technologies. Notably, emitter technology can provide superior results to conventional chip seal technology, type III microslurry, and 1" overlay with Petromat at significant cost savings. FIG. 11 provides a comparison of attributes of emitter technology versus conventional pavement rejuvenation technologies.

Figure 12:
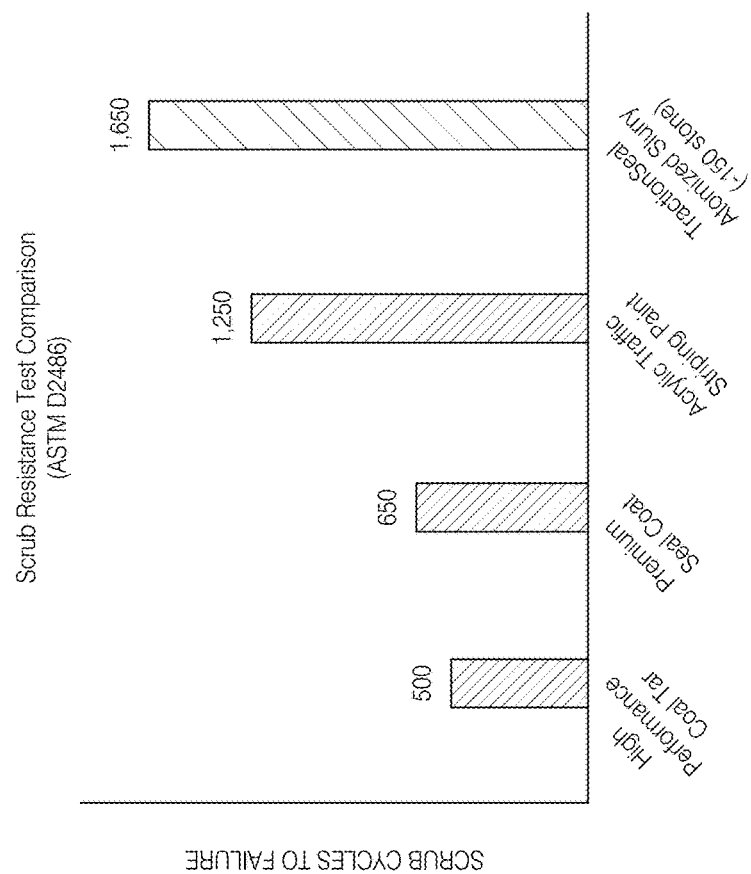
FIG. 12 provides a comparison of ASTM D2486 scrub resistance test results for conventional pavement coatings versus TractionSeal Atomized Slurry (−150 stone).
Figure 13A:
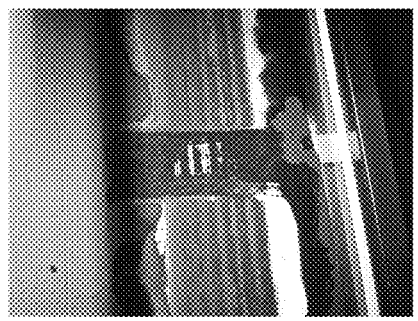
FIG. 13A through FIG. 13D are photographs of the coatings subjected to the ASTM D2486 scrub resistance test of FIG. 11. They include a high performance coal tar at 500 cycles (FIG. 13A), a premium seal coat at 650 cycles (FIG. 13B), an acrylic traffic striping paint at 1250 cycles (FIG. 13C), and a TractionSeal atomized slurry at 1650 cycles (FIG. 13D).
Figure 13B:
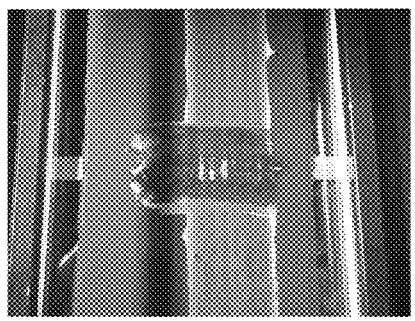
Figure 13C:
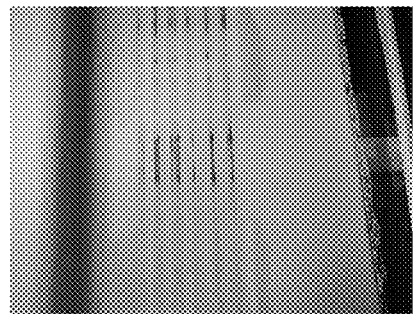
Figure 13D:
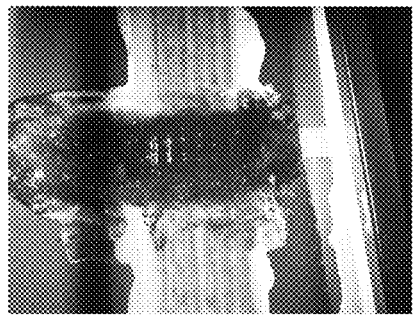

FIG. 12 provides a comparison of ASTM D2486 scrub resistance test results for conventional pavement coatings versus binder enhanced TractionSeal Atomized Slurry (−150 stone). FIG. 13A through FIG. 13D are photographs of the coatings subjected to the ASTM D2486 scrub resistance test of FIG. 12. They include a high performance coal tar at 500 cycles (FIG. 13A), a premium seal coat at 650 cycles (FIG. 13B), an acrylic traffic striping paint at 1250 cycles (FIG. 13C), and a TractionSeal atomized slurry at 1650 cycles (FIG. 13D).

Coating Applications

Elastomer suitable for use in selected embodiments includes a high viscosity material that is a thermoplastic, not a thermotrope, such that it can be applied under ambient conditions. It can exhibit superior adhesive qualities that are tuned to the substrate onto which it is applied, whether it is wood, a pitted rust, white metal, a rusty surface, self-priming, marine coatings, agri-coatings, or the like (e.g., coating for pipes that are to be placed underground). By manipulating the components of the elastomer, a coating tailored to a particular application can be obtained. Such coatings, once applied, can be cured using the emitter system methodology to yield a coating with superior qualities. An advantage of such a system is that it can be employed to apply coatings under ambient conditions as are present in the field.

The elastomers can be employed as house paints or other similar structural coatings for use on, e.g., wood, stucco, concrete, aluminum siding, or the like. For breathable substrates, such as wood, moisture can penetrate from other locations, so the wood must be permitted to breathe such that water does not accumulate. Breathing can be engineered into a paint, and it can also be engineered to have a much higher resistance to solar energy so as to minimize chalking and some of the other problems exhibited by house paint exposed to the elements. Whether it is in a marine environment or just extremely cold temperatures and then high intense heat, the elastomer can be engineered to provide a coating that can be applied to a side wall or other surface, and can then be cured using, e.g., a hand-held emitter. Spraying is a desirable method of application; however, rolling or other methods of application can also be employed. On, e.g., a wood surface, such a cured coating exhibits a much longer useful life than does a conventional house paint.

There are many different types of house paint, and most fall into one of two categories: oil and water. Oil-based house paint is referred to as alkyd, while the water-based type is commonly called latex or acrylic. The main differences between the two are their drying processes, their finishes, and the ease or difficulty of clean up. Oil-based house paint takes longer to dry than the water-based variety, but it contains additives to help speed up the drying process. Oil paints also create a harder, glossier finish, and require special chemicals for cleanup. Water based paints, on the other hand, dry quickly as moisture evaporates. Their finish is not as shiny or as durable, but the ease of clean up makes them a popular choice. They can be cleaned up with warm water and a bit of mild detergent. Within these categories are many different types, starting with primer. While primer may not technically be considered paint, it is a necessary step in most painting projects. Primer is also available in oil-based and water-based formulas. It is wise to select an oil-based primer when using alkyd house paints, and a water-based primer when using latex. Specialty house paints include anti-condensation or mold and mildew resistant options. These are generally used in kitchens, baths, basements, and any other area that may be damp. While this type cannot completely prevent condensation, mold, or mildew, it can greatly lessen their effects. Another specialty variety is heat resistant or fire-retardant house paint. While these cannot completely prevent fire, they do withstand much higher temperatures and slow the spread of fire. They are often used for radiators and fireplace surrounds. Coatings using elastomer technology as described herein can be cured using terahertz radiation produced by an emitter as described herein.

Fiber-reinforced polymer (FRP) linings have long been accepted for the rehabilitation of pipelines that have deteriorated through decades of service, but they can also be used to correct design or construction deficiencies in new pipelines. As the water distribution infrastructure continues to deteriorate across North America, there is a continued need to develop pipeline rehabilitation methods that are cost effective and minimally disruptive, while also minimizing the time a pipe must be taken out of service. Spray-on linings that satisfy the requirements of NSF 61 are one such emerging class of rehabilitation methods for pipes and conduits subjected to internal pressure. Spray-on linings currently used in waterline rehabilitation are either cement-based or conventional polymer-based. Pipe liners prepared using elastomer and emitter technology for curing provide long lasting coatings that are easy to apply and cure in place. The emitter technology can be readily adapted to use in the interior of pipes of various sizes, e.g., residential sewer lines of a few inches in diameter or less, to large concrete or metal pipes of several feet in diameter or more.

Mid IR to near microwave terahertz radiation can also be employed to rapidly cure coatings using selected conventional elastomeric or polymeric materials as well. Accordingly, in certain embodiments, an emitter as in certain embodiments can be employed to rapidly cure a conventional coating. However, cured coatings employing elastomer technology are generally preferred, as they exhibit superior properties in terms of durability, flexibility, and resistance to the elements (water, temperature change, physical contact, etc.).

Similarly, the elastomer as described herein for asphalt pavement applications can be employed for use in marine coatings (e.g., piers, sides of a ship, holding tanks, holds of a ship, tankers, or other structures exposed to freshwater or seawater). A layer of elastomer from 1-2 inches thick can be applied to such a steel frame and then subject to curing. Such a cured elastomer essentially forms a secondary container that has properties of structural integrity that would far exceed those of a similar steel frame. Such methodology can be employed to retrofit aging tankers, e.g., petroleum tankers, so as to prevent leaks. A double hull liner employing an elastomer can provide a high degree of structural integrity in marine applications. Extrusion methodology can be employed with elastomers of certain embodiments fabricated as a thermoplastic, e.g., 20,000 centistokes, to permit fabrication of thick sheets and layers exhibiting desirable properties.

Bridge and Building Foundation Applications

An elastomer coating can be placed on a foundation wall of a new construction or can be used to repair an area where low grade concrete has been employed, or the concrete has been exposed to water, e.g., inside a parking garage, in a cistern or a power transformer box, or the like. The system is desirable for use on concrete that is configured to stay waterproof on the inside while exposed to sources of water. For fixing leaks, silicon sealants are conventionally used. However, for new construction such sealants are not practical for use over large areas. The elastomer offers the advantage that it can be sprayed onto, e.g., floors, walls, ceilings, support beams, or the like, and when cured using the emitter system has excellent flexibility through a broad range of temperatures, tremendous adhesion to the surface, and self-heals, such that a loss of structural integrity under normal conditions is not observed.

In such applications in the construction industry, materials such as recycled tires can be added to the elastomer composition to provide good energy absorbance when cured using emitter technology. An inexpensive energy adsorber such as rubber, included in the elastomer at high concentrations, can greatly aid in obtaining a more rapid finish.

In the case of foundation walls, a coating of elastomer can be sprayed on that cures to a protective coating. The elastomer can include water based bioresins or other materials in desired amounts to create viscoelastic properties enabling a thick layer to be sprayed onto vertical or overhead surfaces, which stays in place without creeping before and during the curing process. In some embodiments, a reinforcing membrane or fabric can be used in conjunction with the elastomer, e.g., applied over the top of the uncured elastomer layer, which acts as an adhesive for the membrane and/or which penetrates into the membrane. For example, a elastomer can be prepared that includes a bioresin suspending agent that enables layers up to ⅛ inch or more in thickness to be sprayed in place, then a reinforcing fabric can be applied, and the layer cured. Multiple layers of elastomer and/or fabric can be built up, with curing conducted as a final step or after one or more layers of elastomer are applied.

The cure rate as well as the amount of energy required for cure and at what density can be adjusted, so as to avoid blistering of the cured layer. In conventional materials, fast exit of water during the curing process can result in blistering. If conditions are such that the water does not rapidly exit the material, the water can act as a catalyst while it is in a highly energized state, trapped in the material, without the water dissociating.

The amount of energy put in a water molecule trapped in an elastomer can be calculated, and this information can be used to manipulate the characteristics of the coating so as to avoid blistering while placing a large amount of energy in the coating.

The methods as described above for coating a concrete structure, such as a vertical wall, can be adapted to concrete structures present in bridges. Bridges, e.g., highway bridges, can employ an asphalt cap, but are primarily constructed of concrete and steel. These bridges can be paved, but are primarily concrete-clad steel. In such embodiments, waterproofing properties are highly desired, e.g., to prevent incursion of seawater. Cracks and fissures from the shrinkage of the concrete can occur, so it is desirable to compensate for this with a coating exhibiting stretch and give. A bridge will have a wearing surface over the top, which must float and give in different directions. In a high-rise building, it is typical to have dirt being backfilled or gravel with drain tiles or drainpipes that are put in to carry water away from the footings of the building. In contrast, on a horizontal bridge, you have the shearing action of the pavement that is put over the top, e.g., concrete with asphalt paving atop, subjected to stretching in two different directions. This pairing action doubles or triples the amount of elastic recovery that the material needs. When there is simultaneous motion in the X, Y, and Z plane, as in bridges, special materials are conventionally employed for waterproofing. These materials penetrate down to about a quarter of an inch thick and are typically ureas or urethanes. Such materials suffer from blistering due to moisture in the bridge deck, and will eventually tear due to the motion they are subjected to. In contrast, the elastomers described herein exhibit excellent stiffness and tensile strength, and can heal itself even at subzero temperatures. They can also be injected into the substrate to be coated.

The elastomers are desirable for use, e.g., in concrete structures where fractures have opened up and water drips onto the structure (e.g., transported in by cars). Salts in such water (e.g., road salt) can further attack any boundary between cement and steel, causing the steel to corrode.

Conventionally, a membrane can be placed over the top of the concrete; however, the membrane may still allow water to migrate beneath its surface. Epoxies and urethanes can be used as sealants; however, while they are tough enough to withstand traffic and are taken up by the concrete well, they compromise the ability to flex, and if they flex too much, they will break. Such materials are not aerospace materials. In contrast, the elastomer of certain embodiments can meet the physical properties of epoxy on a driving surface for a parking garage, but will also self-heal and continue to repair itself. It can also be used to inject down into cracks and fissures and actually bring the water up beside the interface between the elastomer and the cement, so as to become a completely reactive material that has 1,000% elongation. This enables the concrete to move, e.g., by heating and cooling of the structure through the summer and winter) while the elastomer undergoes self-heal. The elastomer and emitter curing method bridges a large gap and meet a significant market need where exotic (and expensive) materials have previously been employed, whether for remediation or in new construction.

Light Blocks

The majority of regular concrete produced is in the density range of 150 pounds per cubic foot (pcf). The last decade has seen great strides in the realm of dense concrete and fantastic compressive strengths (up to 20,000 psi) which mix designers have achieved. Yet regular concrete has some drawbacks. It is heavy, hard to work with, and after it sets, one cannot cut or nail into it without some difficulty or use of special tools. Some complaints about it include the perception that it is cold and damp. Still, it is a remarkable building material—fluid, strong, relatively cheap, and environmentally innocuous. And, it is available in almost every part of the world.

Regular concrete with microscopic air bubbles added up to 7% is called air entrained concrete. It is generally used for increasing the workability of wet concrete and reducing the freeze-thaw damage by making it less permeable to water absorption. Conventional air entrainment admixtures, while providing relatively stable air in small quantities, have a limited range of application and aren't well suited for specialty lightweight mix designs.

Lightweight concrete begins in the density range of less than 120 pcf. It has traditionally been made using such aggregates as expanded shale, clay, vermiculite, pumice, and scoria among others. Each have their peculiarities in handling, especially the volcanic aggregates which need careful moisture monitoring and are difficult to pump. Decreasing the weight and density produces significant changes which improves many properties of concrete, both in placement and application. Although this has been accomplished primarily through the use of lightweight aggregates, preformed foams have been added to mixes, further reducing weight. The very lightest mixes (from 20 to 60 pcf) are often made using only foam as the aggregate, and are referred to as cellular concrete. The entrapped air takes the form of small, macroscopic, spherically shaped bubbles uniformly dispersed in the concrete mix. Today foams are available which have a high degree of compatibility with many of the admixtures currently used in modern concrete mix designs.

Foam used with either lightweight aggregates and/or admixtures such as fly ash, silica fume, synthetic fiber reinforcement, and high range water reducers (e.g., superplasticizers), has produced a new hybrid of concrete called lightweight composite concrete.

Lightweight concrete blocks ("light blocks") can be prepared using elastomer technology. The sand and aggregate employed in a light block can be microcoated with elastomer, then subject it to emitter curing as it comes out of an extruder. The resulting light block exhibits a high degree of strength and shatter resistance, making it desirable for use in areas subject to earthquakes. Such technology can also be employed to prepare other strong, flexible cement structures, e.g., extruded pipes, sheets, or even structures conventionally prepared using cement (e.g., pavement, sidewalks, steps, etc.) A road constructed using elastomer technology as described herein would be extremely durable, with high resistance to loss of fine particles off the surface, a high stiffness modulus, and other desirable properties. Such elastomer technology can be used in any application where it would be desirable to form a solid structure by adhering small particles together (e.g., rock, lightweight composite beads, any combination of fibrous materials and stone), e.g., construction of building trusses, structural members for building, and the like.

Aerated autoclaved concrete block is a lightweight building material. An H-block, or double open-end unit, is open on both ends which increases the space available for rebar and grout. A mortarless masonry wall system is made from dry-stacked units that can be subsequently grouted, partially grouted, or surface bonded. Lightweight aerated concrete, also known as foamed concrete or cellular concrete, is not an autoclaved aerated concrete (AAC) product, it is conventional concrete with a wide range of densities, choice of aggregates and mix designs. It is widely used in the manufacture of single skin lightweight concrete wall panels, employing tilt-up construction. This is an ideal situation for the manufacture of light commercial structures and factories as well as residential housing. Aerated lightweight concrete blocks and lightweight tilt-up panels, foamed concrete floor screeds, sound and thermal insulation, geotechnical and ornamental concrete applications are all applications where the elastomer can be employed. Aerated lightweight concrete lends itself to tilt-up construction methods, and panels can be poured even on site, saving transportation and handling costs. Casting of lightweight concrete panels is very similar to producing regular panels and most commercially available additives used with concrete can be used with aerated lightweight concrete too. Amongst a range of lightweight masonry blocks which can be produced from elastomer include mortarless, interlocking lightweight blocks which save on construction time, which can be produced in various densities. They feature high insulation values, is fireproof and can be made in several sizes. Architectural Ornamentation can be fabricated from elastomer with foamed concrete. Fireplaces in natural stone are often too heavy for some structures, especially if they are retrofitted. Moreover, cellular concrete provides excellent insulation, reducing the risk of fire. Lightweight aerated concrete ornamentation products can be produced in a wide range of finishes, such as marble, sandstone, slate of any color. The product range includes columns, bench tops, ledges, arches, tiles, and the like—anything which can be cast in molds. For sculpting, large blocks of our aerated concrete can be cast and sculpted, using woodworking tools. Low Cost Housing projects the world over are generally very competitive, large in volume but low in margin for the developer. On-site stack-casting of panels is employed, using ready mix trucks which are charged with sand, cement and water before the foam is added. The trucks discharge the lightweight concrete directly into the molds. In certain parts of the world, cast-in-place (in situ casting) is preferred, in particular in seismic zones where a column-and-beam structure is required. This can be incorporated in the structure. The elastomer light block products are lightweight materials produced by blending a cementitious slurry containing elastomer into a stable, three-dimensional pre-form. The foam is produced by diluting a liquid concentrate with water, then pressurizing it with air and forcing it through a conditioning nozzle. The foam is then blended with a base mix consisting of cement, fly ash, water and sometimes aggregate. This causes the base mix to expand and become lighter. The air bubbles hold their shape until the cement hydrates permanently trapping the air in the material. The material is then cured using terahertz radiation using emitter technology as described herein. The materials are low density, light weight, can be made permeable to air and water or nonpermeable, and have a high bearing capacity.

Engineered, open-cell lightweight material can also be fabricated that is capable of reducing loads without disturbing or re-directing natural water flow, and can be used for applications where drainage is needed in combination with a lightweight material.

Shapes of light block that can be prepared include the following: stretchers, solid block, half block, corner block, bond beam, bull nose, chimney block, footer pads, post block, scored block, open end pier, split face (e.g., 4", 6", or 8" split face), split ribbed, and any other suitable shape for the desired construction, landscaping, or other application.

Fire-Resistant Materials

Elastomer as described herein for certain pavement applications can also be desirable for use in fireproofing applications. Fire retardant elastomers can be prepared by incorporating fireproofing components as are known in the art, e.g., phosphorous based or halogen based compounds, or other materials, e.g., ceramic based materials, intumescent materials, vapor-producing materials and the like. The elastomer can be sprayed or otherwise applied to a surface to be rendered fire-resistant, e.g., metal structural beams, ceiling panels, interior spaces of walls, attic spaces, interior spaces in vehicles, ships, aircraft, shipping containers, pallets, etc. The elastomer can be cured in place using the emitter technology for generating terahertz radiation as described herein.

Brominated compounds suitable for incorporation into the fire-resistant elastomers include brominated azido compounds, e.g., brominated linoleyl azidoformate containing an average of four bromines, tetrabromohexanesulfonylazide, tribromoneopentyl azidoformate, brominated nonane-1, 9-disulfonylazide containing an average of four bromines, brominated poly(ethylene sulfonylazide) containing approximately 40% by weight of bromine and an average of 20 sulfonylazide groups, 2,4,6-tribromocyclohexyl azidoformate, brominated bicyclo[4.4.2]dodecane sulfonylazide containing an average of four bromines, tribromocyclopentyl azidoformate, 2-(tribromocyclohexyl)acetylazide, 1,4-bis-azidoformyloxymethyl)tetrabromocyclohexane, 2,4,6-tribromophenyl azidoformate, 2,4,6-tribromophenyl sulfonylazide, 2,4,6-tribromobenzoylazide, 2,3,4,5,6-pentabromophenyl azidoformate, brominated naphthyl azidoformate containing an average of four bromines, brominated biphenyl-bis-sulfonylazide containing an average of six bromines, 2,2-bis(4-azidoformyl-3,5-dibromophenyl)propane, 2,4,6-tribromobenzylazidoformate, 1,4(bis-azidoformyloxymethyl)tetrabromobenzene, brominated poly(sulfonylazido styrene) containing approximately 38% bromine, an average of four sulfonylazide groups and having a molecular weight of approximately 500, beta,beta,beta-tribromoethoxyethyl azidoformate, 4-(2,3-dibromopropyloxy)-2,3-dibromobutyl sulfonylazide, copolymer of glycidol and epibromohydrin where the hydroxyl groups have been converted to azidoformate groups and having a molecular weight of approximately 700, beta-(2,3,4,5,6-pentabromophenoxy)ethyl azidoformate, 3-(2,4,6-tribromophenoxy)-propionylazide, 3-(2,4,6-tribromocyclohexyloxy)propyl sulfonylazide, brominated dicyclohexyl ether sulfonylazide containing an average of seven bromines, brominated bis-azidoformate of the tetramer of cyclohexanediol containing 16 bromines, 3-(2,3,4,5,6-pentabromocyclohexyloyx)-benzene sulfonylazide, 4,4'-diazidoformyl-2,2'-3,3'-, 5,5'-,6,6'-octabromodiphenylether, brominated bis-azidoformate of polyphenyleneoxide tetramer containing 16 bromines, the tribromoacetyl ester of pentaerythritol azidoformate, the tribromobenzoyl ester of pentaerythritol azidoformate, bis(2,3-dibromopropyl)-2-azidoformyloxymalonate, bis(3,4,6-tribromophenyl)-2-azidoformyloxymalonate, 2,4,6-tribromophenylazidosulfonylmethyl ketone, the sulfonylazide of brominated dicyclohexyl ketone containing an average of six bromines, brominated 4-azidoformyloxy-3-methyl-2-butanone containing an average of three bromines, 4,4'-azidoformyloxy-2,2'-3,3'-5,5'-6,6'-octabromobenzophenone, bis[beta-azidoformyloxyethyl] tetrabromophthalate, 4-azidoformyloxy-2,3-d ibromobutyltribromoacetate, 3-azidoformyloxy-2,2-dibromomethylpropyltribromoacetate, beta,beta,beta-tribromoethyl-3-azidoformyloxypropionate, brominated glyceryl tri (azidoformyloxystearate) containing an average of five bromines and substituted with approximately one phosphate group per molecule, the azidoformate of the ethylene oxide adduct of 2,4,6-tribromophenol containing on the average two ethylene oxide groups, the azidoformate of the epibromohydrin adduct of 2,4,6-tribromophenol containing on the average three epibromohydrin groups, beta,beta,beta-tribromoethyl-4-azidosulfonylphenylcarbamate, N-(azidoformyloxymethyl)-2,2,2-tribromoacetamide, and N-(azidoformyloxyethyl)-2,2,2-tribromoacetamide.

Phosphorous-based materials suitable for incorporation into the fire-resistant elastomers include diammonium phosphate, monoammonium phosphate, or simple or complex mixtures of such phosphates. Particularly suitable fire retardants of this variety are prepared by reacting aqueous phosphoric acid with an alkylene oxide, such as ethylene oxide, propylene oxide or butylene oxide. See U.S. Pat. No. 3,900,327, which describes fire retardants formed by reacting 0.5 to 1.5 parts of ethylene oxide by weight of orthophosphoric acid. An improved fire retardant of this variety is disclosed in U.S. Pat. No. 4,383,858 wherein an alkylene oxide of 2 to 4 carbon atoms is reacted with aqueous phosphoric acid, with the weight ratio of oxide to acid being in the range of from about 0.01:1 to about 0.25:1.

Inorganic fire-retardants are well-known in the art and include, without limitation, certain phosphate salts such as ammonium polyphosphate, metal oxides, borates, and the like. In one implementation of the invention, the inorganic fire-retardant is one which undergoes an endothermic reaction in the presence of heat or flame (an "endothermic inorganic fire-retardant"). Crystalline materials having water of hydration are one example of endothermic inorganic fire-retardants. Suitable inorganic materials comprising water of hydration include, for example, crystalline oxides such as alumina trihydrate, hydrated magnesium oxide, and hydrated zinc borate, including but not limited to $2ZnO.3B_2O_3.3\frac{1}{2}H_2O$, $4ZnO.B_2 2O_3.H_2O$, $4ZnO.6B_2O_3 7H_2O$, $2ZnO.2B_2O_3 3H_2O$, and alumina trihydrate. It will be understood that the term "oxide," as used herein, refers to inorganic substances comprising at least one atom which forms at least one double bond to oxygen, and includes substances having one atom double bonded to oxygen, for example MgO, and substances having two or more atoms double bonded to oxygen, for example zinc borate. The term "hydrated" refers to any substance which includes water in the crystalline state, i.e., water of crystallization, and is used synonymously herein with the term "water of hydration."

Intumescent materials suitable for incorporation into the fire-resistant elastomers include are materials that react in the presence of heat or flame to produce incombustible residues which expand to cellular foam having good insulation properties. Generally, intumescent materials include a polyhydric substance, such as a latex, a sugar or polyol, and an intumescent catalyst which can be a dehydrating agent, such as phosphoric acid, usually introduced as a salt or ester. Upon heating, the acid catalyzes the dehydration of the polyol to polyolefinic compounds which are subsequently converted to carbon char. Blowing agents which release nonflammable gases upon heating can be employed to facilitate formation of the cellular foam. The most commonly used intumescent coatings contain four basic components, sometimes called "reactive pigments", dispersed in a binder matrix. The reactive pigments include (1) an inorganic acid or a material which yields an acid at temperatures between 100° C. and 250° C., such as for example, ammonium polyphosphate which yields phosphoric acid; (2) a carbon source such as a polyhydric material rich in carbon, also referred to as a carbon hydrate, for example, pentaerythritol or dipentaerythritol; (3) an organic amine or amide, such as for example, a melamine; and optionally (4) a halogenated material which releases hydrochloric acid gas on decomposition.

The basic intumescent mechanism is proposed to involve the formation of a carbonaceous char by the dehydration reaction of the generated acid with the polyhydric material. The amine may participate in char formation, but is described primarily as a blowing agent for insulating char foam formation. Because the insulating char stops fire and remains on the substrate, it offers better fire and thermal protection under severe fire conditions than non-flammable type coatings.

Numerous patents and publications have disclosed intumescent compositions containing one or more polymeric materials in combination with phosphate containing materials and carbonific or carbonic yielding materials. In European Patent 0 902 062, the intumescent coating compositions can comprise vinyltoluene/acrylate copolymers or styrene/acrylate polymers as a film-forming binder. In U.S. Pat. No. 3,654,190, the intumescent coating contains a solid vinyltoluene/butadiene copolymer associated to a chlorinated natural rubber acting as a char former. In European Patent 0 342 001, a polymeric binder for intumescent coatings comprise copolymers formed of a first monomer in a predominant amount and of a second monomer in a minor amount, said second monomer being a thermally labile co-monomer which is preferably a monomeric aldehyde such as acroleine. In PCT Publication No. WO 01/05886, a polymeric binder in an emulsion form is operative to form a film when the composition is allowed to dry. The polymeric binder described in PCT Publication No. WO 01/05886 is a styrene/acrylate copolymer. The coatings industry seeks fire retardant coatings which not only meet fire retardancy requirements, but which also possess desirable coating properties.

Materials suitable for use in fire-retardant coatings of various embodiments, such as various elastomers, are described, for example, in U.S. Pat. Nos. 5,989,706; 5,925,457; 5,645,926; 5,603,990; 5,064,710; 4,635,025; 4,345,002; 4,339,357; 4,265,791; 4,241,145; 4,226,907; 4,221,837; 4,210,452; 4,205,022; 4,201,677; 4,201,593; 4,137,849; 4,028,333; 3,955,987; 3,934,066; 6,207,085; 5,997,758; 5,882,541; 5,626,787; 5,165,904; 4,744,965; 4,632,813; 4,595,414; 4,588,510; 4,216,261; 4,166,840; 3,969,291 and 3,513,114.

While the disclosure has been illustrated and described in detail in the drawings and foregoing description, such illustration and description are to be considered illustrative or exemplary and not restrictive. The disclosure is not limited to the disclosed embodiments. Variations to the disclosed embodiments can be understood and effected by those skilled in the art in practicing the claimed disclosure, from a study of the drawings, the disclosure and the appended claims.

All references cited herein are incorporated herein by reference in their entirety. To the extent publications and patents or patent applications incorporated by reference contradict the disclosure contained in the specification, the specification is intended to supersede and/or take precedence over any such contradictory material.

Unless otherwise defined, all terms (including technical and scientific terms) are to be given their ordinary and customary meaning to a person of ordinary skill in the art, and are not to be limited to a special or customized meaning unless expressly so defined herein. It should be noted that the use of particular terminology when describing certain features or aspects of the disclosure should not be taken to imply that the terminology is being re-defined herein to be restricted to include any specific characteristics of the features or aspects of the disclosure with which that terminology is associated. Terms and phrases used in this application, and variations thereof, especially in the appended claims, unless otherwise expressly stated, should be construed as open ended as opposed to limiting. As examples of the foregoing, the term 'including' should be read to mean 'including, without limitation,' 'including but not limited to,' or the like; the term 'comprising' as used herein is synonymous with 'including,' 'containing,' or 'characterized by,' and is inclusive or open-ended and does not exclude additional, unrecited elements or method steps; the term 'having' should be interpreted as 'having at least;' the term 'includes' should be interpreted as 'includes but is not limited to;' the term 'example' is used to provide exemplary instances of the item in discussion, not an exhaustive or limiting list thereof; adjectives such as 'known', 'normal', 'standard', and terms of similar meaning should not be construed as limiting the item described to a given time period or to an item available as of a given time, but instead should be read to encompass known, normal, or standard technologies that may be available or known now or at any time in the future; and use of terms like 'preferably,' 'preferred,' 'desired,' or 'desirable,' and words of similar meaning should not be understood as implying that certain features are critical, essential, or even important to the structure or function of the invention, but instead as merely intended to highlight alternative or additional features that may or may not be utilized in a particular embodiment of the invention. Likewise, a group of items linked with the conjunction 'and' should not be read as requiring that each and every one of those items be present in the grouping, but rather should be read as 'and/or' unless expressly stated otherwise. Similarly, a group of items linked with the conjunction 'or' should not be read as requiring mutual exclusivity among that group, but rather should be read as 'and/or' unless expressly stated otherwise.

Where a range of values is provided, it is understood that the upper and lower limit, and each intervening value between the upper and lower limit of the range is encompassed within the embodiments.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity. The indefinite article "a" or "an" does not exclude a plurality. A single processor or other unit may fulfill the functions of several items recited in the claims. The mere fact that certain measures are recited in mutually different dependent claims does not indicate that a combination of these measures cannot be used to advantage. Any reference signs in the claims should not be construed as limiting the scope.

It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

All numbers expressing quantities of ingredients, reaction conditions, and so forth used in the specification are to be understood as being modified in all instances by the term 'about.' Accordingly, unless indicated to the contrary, the numerical parameters set forth herein are approximations that may vary depending upon the desired properties sought to be obtained. At the very least, and not as an attempt to limit the application of the doctrine of equivalents to the scope of any claims in any application claiming priority to the present application, each numerical parameter should be construed in light of the number of significant digits and ordinary rounding approaches.

Furthermore, although the foregoing has been described in some detail by way of illustrations and examples for purposes of clarity and understanding, it is apparent to those skilled in the art that certain changes and modifications may be practiced. Therefore, the description and examples should not be construed as limiting the scope of the invention to the specific embodiments and examples described herein, but rather to also cover all modification and alternatives coming with the true scope and spirit of the invention.

What is claimed is:

1. A method for providing an elastomer coating, comprising:
   applying an elastomer composition to a substrate; and
   irradiating the elastomer composition with radiation having a preselected peak wavelength of from 1 nm to 5 mm, whereby the elastomer composition is cured to yield a protective and self-healing elastomer coating.

2. The method of claim 1, wherein the elastomer composition comprises rubber.

3. The method of claim 2, wherein the rubber is ground tire rubber.

4. The method of claim 1, wherein a reinforcing membrane or a reinforcing fabric is applied over a top of the elastomer composition.

5. The method of claim 1, wherein the elastomer composition is configured to act as adhesive for a reinforcing membrane or a reinforcing fabric and/or is configured to penetrate into a reinforcing membrane or a reinforcing fabric.

6. The method of claim 1, wherein the protective elastomer coating comprises multiple layers of elastomer composition and fabric.

7. The method of claim 1, wherein the elastomer composition is applied to the substrate in a layer of up to ⅛ inch in thickness.

8. The method of claim 1, wherein the substrate comprises a concrete structure.

9. The method of claim 8, wherein the concrete structure is configured for exposure to water and is selected from the group consisting of a foundation wall, a surface in a parking garage, a cistern, and a power transformer box.

10. The method of claim 1, wherein the substrate is selected from the group consisting of a floor, a wall, a ceiling, and a support beam.

11. The method of claim 1, wherein the applying the elastomer composition to the substrate comprises spraying the elastomer composition onto the substrate.

12. The method of claim 1, wherein the elastomer composition comprises a water based bioresin, and wherein the substrate is a vertical or an overhead surface.

13. The method of claim 1, wherein the substrate comprises a component of a bridge.

14. The method of claim 1, wherein the bridge is constructed of concrete and steel.

15. The method of claim 1, wherein the substrate comprises concrete-clad steel, and wherein the protective elastomer coating is configured to prevent attack by salts at a boundary between the cement and the steel, thereby preventing corrosion of the steel.

16. The method of claim 1, wherein the applying the elastomer composition to the substrate comprises injecting the elastomer composition into cracks or fissures in a structure.

17. The method of claim 1, wherein the structure is a concrete structure.

18. The method of claim 1, wherein the substrate is a surface of a building.

19. The method of claim 1, wherein the preselected peak wavelength is from 1,000 nm to 10,000 nm.

20. The method of claim 1, wherein the preselected peak wavelength is from 1 nm to 10,000 nm.

21. The method of claim 20, further comprising irradiating the elastomer composition with a second radiation having a second preselected peak wavelength of from 1 mm to 5 mm.

22. The method of claim 1, wherein the elastomer composition is a polymer modified asphalt.

23. The method of claim 1, wherein the radiation is generated by at least one emitter, wherein each emitter comprises an emitter panel comprising a birefringent material through which an electromagnetic radiation generated by the emitter passes, wherein the birefringent material exhibits biaxial birefringence.

* * * * *

UNITED STATES PATENT AND TRADEMARK OFFICE
CERTIFICATE OF CORRECTION

Page 1 of 2

PATENT NO. : 10,364,534 B2
APPLICATION NO. : 15/490434
DATED : July 30, 2019
INVENTOR(S) : William B. Coe It is certified that error appears in the above-identified patent and that said Letters Patent is hereby corrected as shown below:

In the Drawings

In sheet 5 of 16, FIG. 4, Line 9 (approx.), delete "CO2" and insert -- $CO_2$ --, therefor.

In sheet 5 of 16, FIG. 4, Line 9 (approx.), delete "CO2" and insert -- $CO_2$ --, therefor.

In sheet 5 of 16, FIG. 4, Line 12 (approx.), delete "Plausable" and insert -- Plausible --, therefor.

In sheet 8 of 16, FIG. 7A, Line 1, y-axis, delete "Deflextion" and insert -- Deflection --, therefor.

In sheet 9 of 16, FIG. 7B, Line 1, y-axis, delete "Deflextion" and insert -- Deflection --, therefor.

In sheet 10 of 16, FIG. 8A, Line 1, y-axis, delete "Deflextion" and insert -- Deflection --, therefor.

Figure 8B:
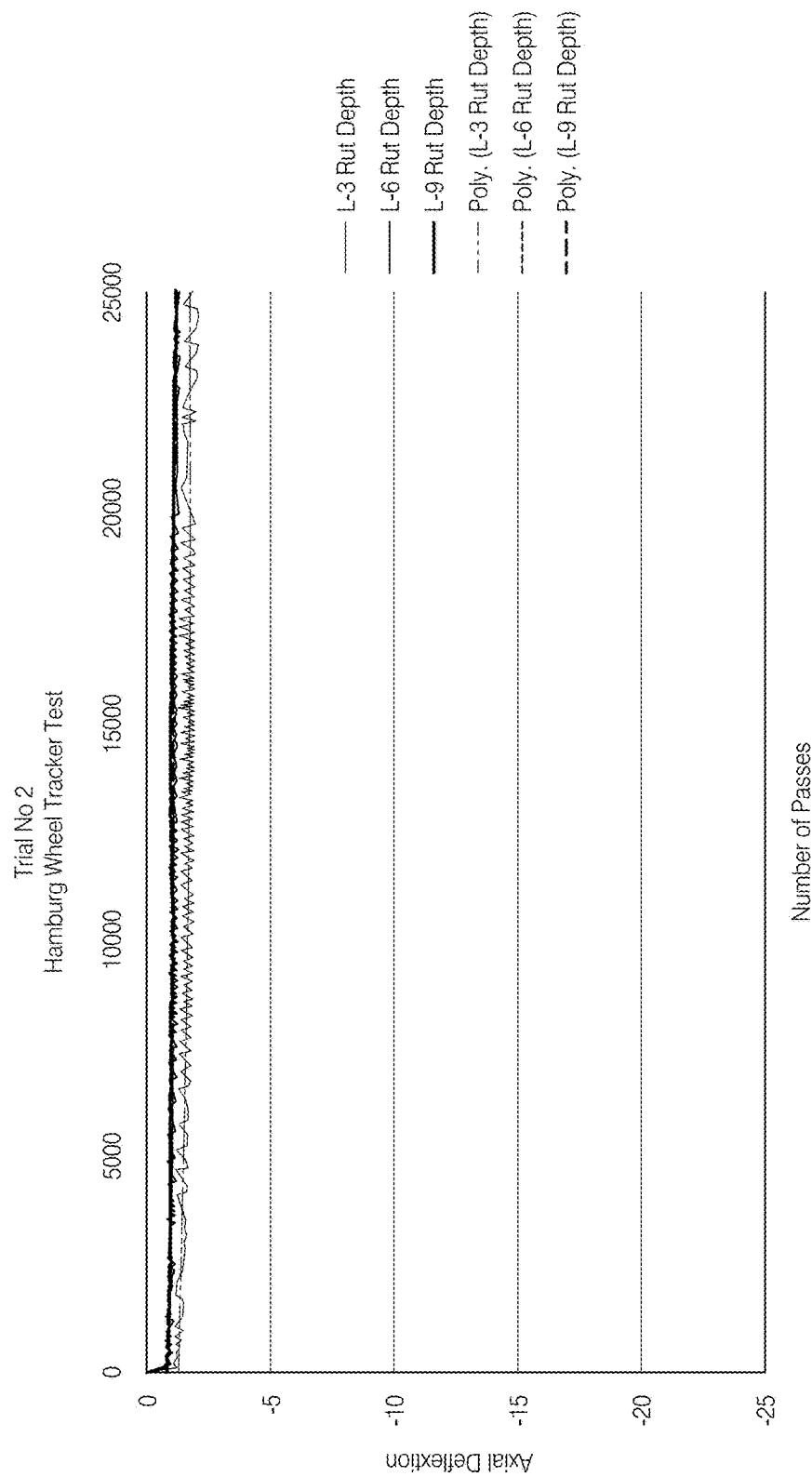
FIG. 8B provides results of a Hamburg Wheel Tracker test conducted on the same L3, L6, and L9 asphalt pavement cores of FIG. 7A that had already been subjected to 25,000 cycles.

In sheet 11 of 16, FIG. 8B, Line 1, y-axis, delete "Deflextion" and insert -- Deflection --, therefor.

In the Specification

In Column 7, Line 30, delete "perflurocarbons" and insert -- perfluorocarbons --, therefor.

In Column 10, Line 19, delete "perflurocarbons" and insert -- perfluorocarbons --, therefor.

In Column 13, Line 23, delete "Techol." and insert -- Technol. --, therefor.

In Column 16, Line 16, delete "perflurocarbons" and insert -- perfluorocarbons --, therefor.

In Column 45, Line 21, delete "croslinking" and insert -- crosslinking --, therefor.

In Column 52, Line 5, delete "winter)" and insert -- winter --, therefor.

Signed and Sealed this
Twenty-sixth Day of November, 2019

Andrei Iancu
*Director of the United States Patent and Trademark Office*

CERTIFICATE OF CORRECTION (continued)
U.S. Pat. No. 10,364,534 B2

In Column 54, Line 42, delete "methyl)" and insert -- methyl --, therefor.

In Column 54, Line 49, delete "tribromobenzylazidoformate," and insert -- tribromobenzyl azidoformate, --, therefor.

In Column 54, Lines 64-65, delete "pentabromocyclohexyloyx)" and insert -- pentabromocyclohexyloxy) --, therefor.

In Column 55, Lines 11-12, delete "d ibromobutyltribromoacetate," and insert -- dibromobutyltribromoacetate, --, therefor.

In Column 56, Line 45, delete "acroleine." and insert -- acrolein. --, therefor.